United States Patent
Sato

(10) Patent No.: US 6,851,492 B2
(45) Date of Patent: Feb. 8, 2005

(54) FASTENER, HAMMERING JIG FOR INSTALLING THE FASTENER, AND DRILL BIT FOR WORKING UNDERCUT HOLE

(75) Inventor: Yoshinori Sato, Tokyo (JP)

(73) Assignee: Kabushiki Kaisha Zen Kenchiku Sekkei Jimusho, Tokyo (JP)

( * ) Notice: Subject to any disclaimer, the term of this patent is extended or adjusted under 35 U.S.C. 154(b) by 0 days.

(21) Appl. No.: 10/217,696

(22) Filed: Aug. 12, 2002

(65) Prior Publication Data

US 2002/0189866 A1 Dec. 19, 2002

Related U.S. Application Data

(62) Division of application No. 09/763,716, filed as application No. PCT/JP00/04643 on Jul. 12, 2003, now abandoned.

(30) Foreign Application Priority Data

Jul. 21, 1999 (JP) .......................................... 11-205629
Aug. 10, 1999 (JP) .......................................... 11-225954

(51) Int. Cl.[7] .............................................. E21B 10/32
(52) U.S. Cl. ........................ 175/273; 175/286; 408/153
(58) Field of Search ................................ 175/284, 202, 175/263, 273, 274, 279, 286; 408/147, 153, 157, 158, 159, 152

(56) References Cited

U.S. PATENT DOCUMENTS

| | | | | |
|---|---|---|---|---|
| 530,510 A | * | 12/1894 | Elliott et al. ................. | 175/273 |
| 564,510 A | * | 7/1896 | Elliott ......................... | 175/173 |
| 570,513 A | * | 11/1896 | Smith ......................... | 175/272 |
| 994,307 A | * | 6/1911 | Evans et al. ................. | 175/202 |
| 1,360,328 A | * | 11/1920 | Stokes ......................... | 175/260 |
| 1,386,249 A | * | 8/1921 | Gander ..................... | 15/104.09 |
| 1,472,182 A | * | 10/1923 | McCracken ................. | 175/272 |
| 1,589,508 A | * | 6/1926 | Boynton ....................... | 175/267 |
| 1,614,368 A | * | 1/1927 | Kergan ....................... | 175/202 |
| 4,307,636 A | | 12/1981 | Lacey | |
| 4,431,065 A | * | 2/1984 | Andrews ..................... | 175/269 |
| 4,992,010 A | | 2/1991 | Fischer | |
| 4,998,981 A | * | 3/1991 | Miyanaga ................... | 175/286 |
| 5,402,856 A | * | 4/1995 | Warren et al. ................ | 175/57 |
| 5,810,523 A | | 9/1998 | Miyanaga | |

FOREIGN PATENT DOCUMENTS

| EP | 0 722 801 | | 7/1996 | |
|---|---|---|---|---|
| EP | 795368 A2 | * | 9/1997 | ........... B23B/51/00 |

* cited by examiner

*Primary Examiner*—David Bagnell
*Assistant Examiner*—Daniel P Stephenson
(74) *Attorney, Agent, or Firm*—Bachman & LaPointe, P.C.

(57) ABSTRACT

In a fastener of a post-installation type which is embedded after a drilled hole is provided at concrete structure, a sleeve (2) and a plug (3) press-fitted to the sleeve are positioned by convexoconcave engagement between a projecting portion at an inner periphery of an expansion portion (6) and a recess groove (11) at a tip end of the plug (3) before installation, and therefore the separation therebetween is prevented. After installation, the projection portion at the inner periphery of the expansion portion (6) expanded is again engaged with the recess groove (12) of the tip end of the plug (3). By this positioning effect, the fastener performs an effect for preventing a loosening between the sleeve and the plug against the vibrations.

4 Claims, 50 Drawing Sheets

FASTENER, HAMMERING JIG FOR INSTALLING THE FASTENER, AND DRILL BIT FOR WORKING UNDERCUT HOLE

This application is a divisional of Ser. No. 09/763,716 filed Feb. 23, 2001, now abandoned which is a 371 of PCT/JP00/04643, filed Jul. 12, 2000.

TECHNICAL FIELD

The present invention relates to improvements in a fastener of a post-installation anchor type which is hammered into a hole drilled to a pre-built concrete structure, a hammering jig for installing the fastener, and a drill bit for working an undercut hole. More particularly, the present invention relates to a fastener structure which improves a working ability of the fastener so that a sleeve is not detached even when the fastener is installed upwardly and which largely improves a tensile strength by performing a loosening preventing effect in a manner of engaging the sleeve and a plug with each other by convexoconcave engagement after the expansion in the installation operation is executed, a hammering jig suitable for the installation, and a drill bit suitable for drilling an undercut hole which is enlarged into a taper shape in the vicinity of a hole bottom portion of a prepared hole for installing the post-installation anchor.

BACKGROUND ART

The most popular conventional fastener of a post-installation type is constituted by a sleeve having an expansion portion and a plug (expanding member) having a taper portion for expanding the expansion portion by being inserted into the sleeve, and is basically arranged to fix the sleeve as an anchor to a concrete structure by hammering the plug or sleeve upon installing the fastener into a prepared hole and by expanding the expansion portion by a relative displacement therebetween.

In a structure of such a conventional fastener, since the sleeve and the plug are merely press-fitted under a non-expanded condition of the expansion portion, they tend to be separated. Specifically, when it is installed upwardly, there is a possibility that the operation ability during the installation is degraded by the detaching of the sleeve. Further, since there is no means for restricting a relative position between the expansion portion and the plug even under a condition that the expansion portion is expanded, slipping out of the plug from the sleeve or detaching of the sleeve from the prepared hole tends to be generated by the generation of the loosening between the sleeve and the plug in the case that it receives earthquake or mechanical vibration energy. This degrades the anchor effect and is not suitable.

On the other hand, as a method for working an undercut hole acting as a prepared hole prior to the installation of the post-installation anchor of an undercut type, there are a one-step method and a two-step method.

The former one-step method is, as shown in FIG. 65, a method for working an undercut hole 224 by first working a straight prepared hole 222 using a dedicated drill bit 220 installing a stopper 221, and by enlarging a hole bottom portion of the straight prepared hole 222 into a taper shape in a manner of executing a planetary operation for swinging and rotating the drill bit 220 at the stepper 221 as a fulcrum by several rotations after a depth of the prepared hole 222 reaches a predetermined depth and the stopper 221 is contacted with a concrete surface 223.

The latter two-step method is, as shown in FIG. 66, a method for enlarging a portion near a hole bottom of a straight prepared hole 225 into a taper shape by first working the straight prepared hole 225 by means of a known working method, by seating a special drill bit 226 for diameter-enlarging operation, and by enlarging a tip end of a cutter 227 of the drill bit 226 utilizing a reaction force from the hole bottom against the drill pressing while putting the drill bit 226 at the hole bottom.

However, although the former method can drill an undercut hole by one step, it requires a special operation of executing a planetary operation of the drill bit 220 integrally with an electric drill main body. Therefore, this requires a skill in this drilling operation. If a builder is not skilled in this operation, there will be obliged to degrade an accuracy of a hole working and to generate a breakage of the drill bit. Particularly, there is a drawback that a dispersion as to hole working accuracy is large due to individual differences.

Further, the latter method requires two steps as called, and requires to change the drill bit 226 or to change the handling of an electric drill. Therefore, there is a drawback that the steps for working the hole and the operation time are dully elongated.

DISCLOSURE OF INVENTION

The present invention is invented by observing the above-mentioned problems. It is an object of the present invention to provide a fastener which is arranged to prevent a detaching between a sleeve and a plug under a non-expanded condition of an expansion portion and to prevent a loosening between the sleeve and the plug by executing a relative positioning between the expansion portion and the plug after the expansion, and a hammering jig structure suitable for the installation of the fastener, and simultaneously to provide an undercut working drill bit which is capable of working an undercut hole in high accuracy as a prepared hole with a feeling substantially the same as that in a straight hole working without requiring a special operation in the installation of a post-installation anchor (fastener) of an undercut type.

An invention is a fastener of a post-installation anchor type comprising a sleeve having an expansion portion and a plug having a taper portion for expanding the expansion portion by being installed in the sleeve, and is characterized in that the sleeve and the plug are engaged with each other by the convexoconcave engagement so as to prevent a mutual detachment between the sleeve and the plug under the non-expanded condition of the expansion portion, and that an inner peripheral surface of the expansion portion and an outer peripheral surface of the plug are again engaged by the convexoconcave engagement when the expansion portion is expanded by a predetermined quantity by hammering the sleeve or the plug.

Accordingly, since the sleeve and the plug are engaged with each other by the convexoconcave engagement under a non-expanded condition of the expansion portion, both are not separated. Particularly, when it is installed upwardly, the detaching of the sleeve is prevented, and therefore the operation ability thereof is largely improved. Further, by expanding the expansion portion through the hammering of the sleeve or plug upon inserting the fastener in a predetermined prepared hole, the inner peripheral surface of the expansion portion and the outer peripheral surface of the plug are again engaged by the convexoconcave engagement and substantially the relative position therebetween is executed to prevent the detaching of the sleeve. Therefore, even if it receives earthquake or mechanical vibration energy after the installation, no loosening causes between the sleeve and the plug, and the anchor effect is stably maintained for a long term.

The invention as further defined is characterized in that the fastener is of an inner cone hammering type in which the plug having a length shorter than that of the sleeve is previously inserted within a range of the length of the sleeve, a flange portion press-fitted into a prepared hole of an opposite member is formed at an outer periphery of an end portion opposite to the expansion portion in the sleeve, and the plug is hammered by utilizing a friction force between the flange portion and an inner peripheral surface of the prepared hole.

Accordingly, it is adapted to a case that a thickness of a concrete structure to which an prepared hole is formed is not sufficient, and it is difficult to receive the hammering force at a hole bottom surface by seating the sleeve or the plug at the hole bottom surface of the prepared hole. That is, first the sleeve is hammered to the prepared hole, and at this time the flange portion is also hammered to the prepared hole while deforming the flange portion of the sleeve end portion. With this arrangement, a sufficient friction resistance force is generated between an inner peripheral surface of the prepared hole and the sleeve. Under this condition, when the plug in the sleeve is hammered by using the hammering jig, the relative movement between the prepared hole and the sleeve is prevented by the friction resistance force. As a result, the expansion portion is expanded by hammering the plug with respect to the sleeve, and functions as same as those of the previous embodiment are performed.

Particularly, when the circumferential groove is formed from an end surface in the flange portion in the invention, an easy deformability of the flange portion at an end portion of the sleeve is further promoted by the existence of this circumferential groove. With this arrangement, for example, even when an opening periphery of the prepared hole is not a complete round, the flange portion is deformed following a shape of the hole and is firmly fitted with an inner periphery of the prepared hole. Therefore, the friction resistance force between the prepared hole and the sleeve, which force is necessary for the plug hammering, is equivalently distributed without offset, and simultaneously this prevents invasion of rain water into the prepared hole.

The invention in another embodiment is a fastener of a post-installation anchor type comprising a sleeve having an expansion portion and an anchor main body portion having a taper portion for expanding the expansion portion by being installed in the sleeve, and is characterized in that the anchor main body portion is formed into a stepped-shaft shape member by the plug having a taper portion and a large diameter portion greater in diameter than that of the plug, the plug having an outer diameter generally the same as that of the sleeve has a predetermined relative movement stroke to a step portion of the anchor main body portion and an inner periphery of the expansion portion and an outer peripheral portion of the plug are previously engaged by the convexoconcave engagement so as to prevent the detachment therebetween under a non-expanded condition of the expansion portion, and by hammering the anchor main body portion by the relative movement stroke under the condition that the sleeve is seated to the prepared hole, the large diameter portion of the anchor main body portion is press-fitted to the prepared hole, the expansion portion of the sleeve is expanded, and the inner periphery of the expansion portion is engaged with the outer periphery by the convexoconcave engagement under the expansion condition of the expansion portion.

Accordingly, the expansion portion of the sleeve is expanded by hammering the anchor main body portion until the sleeve is contacted with the stepped portion of the anchor main body portion after inserting the fastener to the prepared hole. In this case, when the sleeve and the stepped portion are in contact with each other, it becomes impossible to hammer the anchor main body portion further. Therefore, it is possible to recognize that the expansion portion is sufficiently expanded from the feeling of this contact. Simultaneously, when the anchor main body portion is hammered, the large diameter portion of the anchor main body portion is positively press-fitted to the prepared hole. Therefore, by setting the length of the large diameter portion at a long length in some degree and by setting so that a necessary strength is obtained by press fitting the large diameter portion by a minimum necessary quantity, it is not necessary to strictly control the depth of the prepared hole. That is, even if the projecting length of the large diameter portion projecting from the prepared hole is dispersed after the completion of the installation, no problem causes in the strength as an anchor. Further, since the relative movement between the sleeve and the anchor main body portion is prevented by the contact between the sleeve and the stepped portion of the anchor main body portion, the anchor main body portion is not excessively hammered, and this arrangement performs the effect that a dispersion of the installation condition among individuals of builders is suppressed.

The invention in another embodiment is a fastener of a post-installation anchor type comprising a sleeve having an expansion portion and an anchor main body portion having a taper portion for expanding the expansion portion by being installed in the sleeve, and is characterized in that the anchor main body portion is formed into a stepped-shaft shape member by the plug having a taper portion and a large diameter portion greater in diameter than that of the plug, the plug having an outer diameter generally the same as that of the sleeve has a predetermined relative movement stroke to a step portion of the anchor main body portion and an inner periphery of the expansion portion and an outer peripheral portion of the plug are previously engaged by the convexoconcave engagement so as to prevent the detachment therebetween under a non-expanded condition of the expansion portion, the inner peripheral surface of the expansion portion and the outer peripheral surface of the plug are engaged by the convexoconcave engagement and the engagement generates a connection feeling when the previous convexoconcave engagement is disengaged according to the hammering of the anchor main body portion by the relative movement stroke and the expansion portion is expanded by a predetermined quantity after the sleeve is inserted to the prepared hole.

That is, this embodiment differs from the previous embodiment at the point that the large diameter portion of the anchor main body portion is not positively press fitted to the prepared hole, and during the hammering of the anchor main body portion to the sleeve, an installation feeling due to the convexoconcave engagement between the expansion portion and the plug is obtained by the contact between the sleeve and the stepped portion of the anchor main body portion resulting from that both reach the stroke ends thereof.

Accordingly, with this embodiment it becomes possible to easily and actually feel the sufficient expansion of the expansion portion by the predetermined hammering of the anchor main body portion through a completed feeling due to the convexoconcave engagement. It is possible to improve the stability of the installation condition by canceling the dispersion of the installed condition due to the individual difference of builders.

The invention as further defined is characterized in that the prepared hole is of an undercut type in which a portion near a hole bottom portion of the prepared hole is enlarged in diameter into a taper shape.

Accordingly, since the expansion portion of the sleeve is further largely expanded into a skirt shape so as to follow the shape of the prepared hole of the undercut type, the strength of the anchor is further improved by a strong anchor effect due to the undercut shape and the multiplier effect due to the convexoconcave engagement between the expansion portion and the plug at the expansion completed time. Particularly, even if cracks are generated in the concrete structure, the sleeve is not detached and performs the extremely strong anchor effect.

Particularly, if a female screw portion or male screw portion is formed at the large diameter portion, a predetermined structure is fixed by using the female screw portion or the male screw portion as a tightening portion.

The invention is further characterized in that a deformed reinforcing bar for reinforced concrete is integrally formed with the large diameter portion of the anchor main body portion of the invention in the form of extending therefrom, and a male screw portion is formed at an intermediate portion between the large diameter portion and the deformed reinforcing bar, and a lock nut is previously tightened to the male screw portion.

Accordingly, by tightening the lock nut in addition to the anchor effect by the expansion of the expansion portion of the sleeve, the expansion portion and the lock nut substantially press-tighten the concrete structure. Therefore, in case that a deformed reinforcing bar is employed as an insertion bar for earthquake-proof reinforcement, the fastener performs an extremely strong strength (proof stress) against load input in both of the tensile direction and the compressing direction.

The invention in another embodiment is a resin fastener comprising a sleeve having an expansion portion and a plug having a taper portion for expanding the expansion portion by being installed in the sleeve, and is characterized in that the sleeve and the plug are engaged with each other by convexoconcave engagement so as to prevent a mutual detachment between the sleeve and the plug under the non-expanded condition of the expansion portion, and the inner peripheral surface of the expansion portion and the outer peripheral surface of the plug are engaged by the convexoconcave engagement and the engagement generates a connection feeling when the previous convexoconcave engagement is disengaged according to the hammering of the plug by the relative movement stroke and the expansion portion is expanded by a predetermined quantity after the sleeve is inserted to the prepared hole.

Accordingly, with the invention, in case that it is employed for fixing a circuit card of electric product and various electronic devices or for installing interior members of an automotive vehicle, a relative positioning between the sleeve and the plug is executed by the convexoconcave engagement between the inner peripheral surface of the expansion portion and the outer peripheral surface simultaneously with expanding the expansion portion of the sleeve. Therefore, even if the fastener receives vibrations after the installation thereof, it is difficult to generate loosening between the expansion portion and the plug, and it is possible to keep the anchor effect for long term. On the other hand, since it is superior in a self reversion property as a property of the resin fastener, in case of disengaging the anchor engagement for repairing or recycle, the plug is hammered in the inverse direction to the expansion period to cancel the expansion of the sleeve, and the fastener is easily removed.

The invention in another embodiment is a jig for hammering a sleeve or a plug in an installation of a fastener of a post installation type which is constituted by the sleeve having an expansion portion and the plug having a taper portion for expanding the expansion portion by being installed in the sleeve, and is characterized in that the hammering jig comprises a rod constituted by integrally forming a punch portion inserted into a hole of an opposite and a shank portion in a longitudinal direction, and an adjustable adapter installed so as to be slidable to the rod in an axial direction by a predetermined quantity, a deformed flange portion is integrally formed at a longitudinally center portion of the fastener installation, two engagement grooves, which are engageable with the deformed flange portion and have different in depth with each other, are formed inside of the adjust adapter with 90° offset in phase, and a projecting length of the punch portion from the adjuster adapter is selectable from two stages by selectively switching an engaged groove to be engaged with the deformed flange portion.

Accordingly, in case that it is employed in hammering a plug of a fastener of an inner cone hammering type, by alternatively selecting a projection length of a punch portion directly relating to the hammering of the sleeve or plug though it is a dedicated jig, it is commonly used in the hammering of the sleeve and the plug which are different in the necessary projection length of the punch portion. Further, in some cases, it is possible to commonly use the jig in the hammering of sleeves or plugs of at least two kinds of fasteners having different hammering length, that is, two kinds of fasteners of different sizes. As a result, it becomes possible to decrease the tool control manhour and to improve the flexibility of the jig.

The invention in another embodiment is a drill bit which is installed at a rotating portion of a drilling machine and finishes an undercut type hole by enlarging a portion near a hole bottom portion into a taper shape when a straight hole is drilled to a structure of a drill object by a rotating motion of the drill bit and when a depth of the drilled hole reaches a predetermined depth, and is characterized to comprise a cutter body providing at least a cutter blade for straight hole working at its tip end, a cutter blade for undercut working that is installed at a tip end portion of the cutter body so as to be swingable and projectable in the diametrical direction and that enlarges a portion near a hole bottom portion of a straight hole into a taper shape by projecting into the diametrical direction through swinging motion, a stopper sleeve that is installed to the cutter body so as to be relatively rotatable and relatively movable in the axial direction and that is contacted with a structure when a drilled depth of a straight hole to the structure becomes a predetermined depth, a shank body supporting the cutter body so as not to be relatively rotatable, a cutter blade control means for projecting the cutter blade for undercut working into an enlarged direction of the cutter body according to a relative displacement in the axial direction between the cutter body and the stopper sleeve when the stopper sleeve is further pressed after the stopper sleeve is contacted with the structure.

Accordingly, until a depth of the hole during the drilling reaches a predetermined depth and the stopper sleeve is contacted with a surface of a structure of a drilled object, the cutter blade control means does not operate, and the cutter blades for undercut working are received in the cutter body.

Until this time, the prepared hole of a straight hole shape is drilled by at least a cutter blade for straight hole working.

On the other hand, when the cutter body is pressed after the depth of the straight hole in drilling reaches the predetermined depth and the stopper sleeve is contacted with the structure as the drilled object, a relative movement between the cutter body and the stopper sleeve is first started and the cutter blade control means operates. With this operation, the cutter blades for undercut working gradually project in the diametrical direction together with the rotational motion of the drill bit, and therefore, a portion near a hole bottom portion of the prepared hole of the straight hole shape previously worked is enlarged in diameter into a skirt shape and is finished into a undercut hole shape.

That is, it is possible to work a necessary undercut hole with a feeling completely the same as that in a normal straight hole drilling operation and by one step without executing complex operations of the drill bit.

The invention as further defined is characterized in that the cutter blade control means is constituted by a sector gear formed at an end portion position of the cutter blade for undercut working which portion is always positioned in the cutter body, a control rod slidably installed in the cutter body, a rack portion engaged with the sector gear being formed at a tip end portion of the control rod, a cam member that is received in the shank body and directly transmits a drilling press force applied to the shank body to the cutter body when drilling the straight hole, the cam member pressingly controlling the control rod excessive to the cutter body by a predetermined quantity by transmitting the drilling press force to the cutter body, by absorbing the relative displacement between the cutter body and the stopper sleeve, and by being swingably displaced after the stopper sleeve is contacted with the structure.

That is, the control rod installed in the cutter body and the cutter blades for undercut working are engaged with each other by the rack and pinion relationship, the control rod is slidably displaced according to the relative displacement between the stopper sleeve and the cutter body through the cam member, and the cutter blades for undercut is swingingly displaced.

Accordingly, when the cutter body is pressed after the depth of the straight hole in drilling reaches the predetermined depth and the stopper sleeve is contacted with the structure as the drilled object, a relative movement between the cutter body and the stopper sleeve is first started and the cutter blade control means operates, and the control rod is pushed out with respect to the cutter body through the cam member. Since the rack at the tip end of the control rod and the sector gear of the cutter blades for undercut working are engaged with each other, the cutter blades for undercut working swing according to the displacement of the control rod and project into the diametrically enlarged direction of the cutter blade. With this operation, together with the rotational motion of the drill bit, a portion near a hole bottom portion of the prepared hole of the straight hole shape previously worked is enlarged in diameter into a skirt shape and is finished into an undercut hole shape.

In this case, the portion near the hole bottom portion is enlarged but the hole depth of the straight hole is not kept at the predetermined depth. The drilling is executed so as to increase the hole depth of the straight hole reached the predetermined depth, and to increase the diameter into the undercut shape. That is, since the undercut working is executed while drilling the straight hole reached the predetermined depth, the drilling operation of the straight hole and the undercut working following thereto are accurately executed in complete synchronicity.

The invention is further defined characterized in that in the invention a dust collecting port for collecting chips is openingly formed at the tip end portion of the cutter body and is communicated with a dust collecting passage separately formed between the cutter body and the control rod, and further that the dust collecting passage together with the stopper sleeve is connected to a dust collecting machine through a dust collecting adapter installed to the cutter body so as to be relatively rotatable.

It is preferable in view of the dusts collecting efficiency that an opening position of the dust collecting port is provided at a tip end surface or a tip end portion outer periphery of the cutter body.

Accordingly, chips generated by drilling are rapidly sucked and discharged from the dust collecting port through a dust collecting passage and a dust collecting adapter in the cutter body to the dust collecting machine. In this case, since the dust collecting adapter attached to the cutter body is relatively rotatable with the cutter body and the rotational motion of the cutter body is smoothly allowed by this arrangement, the attachment of the dust collecting adapter never prevents the drilling operation.

The invention as further defined is characterized in that the cutter blade control means is constituted by a sector gear formed at an end portion position of the cutter blade for undercut working which portion is always positioned in the cutter body, a control rod slidably installed in the cutter body, a rack portion engaged with the sector gear being formed at a tip end portion of the control rod, a cam member that is received in the shank body and directly transmits a drilling press force applied to the shank body to the cutter body when drilling the straight hole, the cam member allowing the shank body to directly pressingly controlling the control rod by a predetermined quantity by transmitting the drilling press force to the cutter body, by absorbing the relative displacement between the cutter body and the stopper sleeve, and by being swingably displaced after the stopper sleeve is contacted with the structure.

Accordingly, the relative movement between the cutter body and stopper sleeve is started when the depth of the straight hole becomes the predetermined depth. At this time, the cutter body during rotation is stayed at the present position. Then, the shank body and the cutter body is relatively rotated, and the shank body pushes the control rod with respect to the cutter body. Therefore, the control rod slidingly displaces, the cutter blades for the undercut working are enlarged in diameter, and a portion near the hole bottom portion of the previously formed straight hole is worked into an undercut shape. That is, this aspect is different from the invention as previously described in view that the portion near the hole bottom portion of the previously formed straight hole is worked into an undercut shape while the depth of the straight hole is kept after it reaches the predetermined depth.

This method is particularly advantageous in the case that automatic dust collecting of chips is not executed. On condition that drilling with the generation of chips by the cutter blade for straight hole is not executed when the depth reaches the predetermined depth, only the working of the undercut is execute by enlarging the cuter blades for undercut working. The reason is that if both of the drilling work by the cutter blade for straight hole working and the drilling work by the cutter blades for undercut working are executed simultaneously, chips chipped by the cutter blade for straight hole working are jammed at the clearance of the cutter blades for undercut working put in the enlarged condition for working the undercut, and therefore it becomes impossible to return the cutter blades for undercut working into the housing condition and draw up from the undercut hole.

The invention as further defined is characterized in that the cutter body is provided at its cylindrical outer peripheral surface with a spiral groove portion.

Accordingly, even in the case that automatic dust collecting for ships, at least during the working of the straight hole by the cutter blade for straight hole working, chips chipped by the cutter blade for straight hole working are discharged through the spiral groove portion formed at the cutter body to the opening portion of the straight hole according to the rotation of the cutter body. With this arrangement, there is a merit of a cost down the drill bit as compared with the case of adopting a forcible dust collecting of chips by the dust collecting machine.

BEST MODE FOR CARRYING OUT THE INVENTION

FIGS. 1 to 7 are views showing a preferred embodiment (first embodiment) of a fastener according to the present invention, and show an example called as a metal post-installation anchor of an inner cone hammering type. In FIGS. 2 to 5, a left half portion shows a non-expanded condition of an expansion portion, and a right half portion shows an expanded condition.

Figure 1:
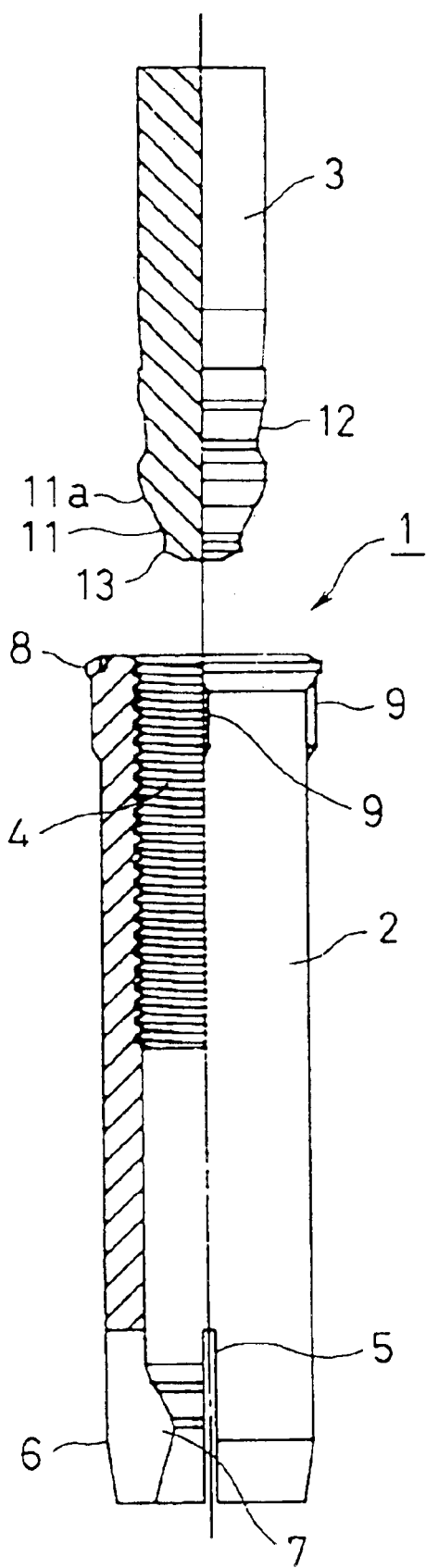
FIG. 1 is a view showing a preferred first embodiment of a fastener according to the present invention and an exploded view showing a sleeve and a plug which are shown by a half cross section view.
Figure 2:
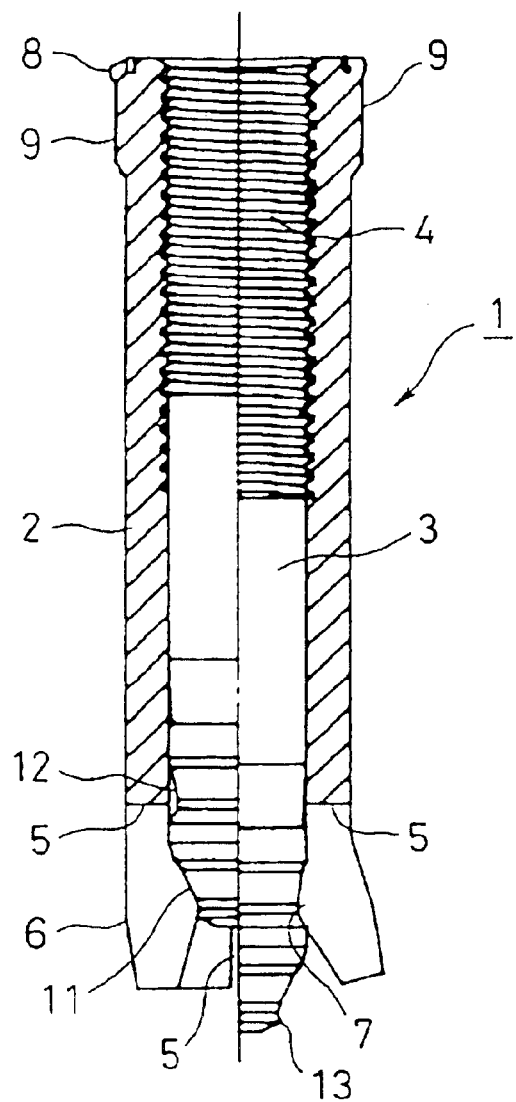
FIG. 2 is a cross-sectional explanatory view showing a connected condition between the sleeve and the plug shown in FIG. 1.
Figure 3:
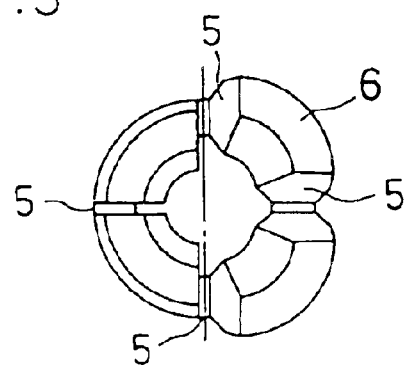
FIG. 3 is a bottom view of FIG. 2.

As shown in FIGS. 1 to 3, a fastener 1 is constituted by a hollow cylindrical shaped sleeve 2 and a stepped shaft shaped plug 3 press-fitted into the sleeve 2 as an expanding element.

A female screw portion 4 is formed on an inner periphery of an upper end portion of the sleeve 2, ranging in about half of the longitudinal dimension of the sleeve 2. Further, a lower end portion of the sleeve 2 is divided into a collet shape having four radially slotted grooves 5 and is formed into an expansion portion 6 expandable in a radial direction. As enlargedly shown in FIG. 4, a projecting portion 7 is provided at an inner peripheral surface of the expansion portion 6 so as to partially decrease a inner diameter thereof.

Figure 5:
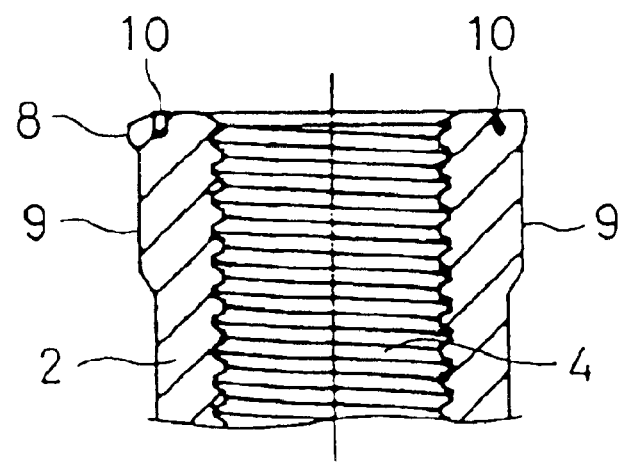
FIG. 5 is an essential enlarged view of a lower end portion of FIG. 2.

As enlargedly shown in FIG. 5, a flange portion 8 is provided at an outer periphery of an upper end portion at the female screw portion 4 of the sleeve 2 with a small protrusion. Further, a plurality of ribs 9 are projectedly provided so as to extend from the flange portion 8 to a general outer peripheral surface of the sleeve 2. Since the flange portion 8 and the ribs 9 are positively press-fitted to an opening edge portion of the prepared hole as mentioned later, a circumferential groove 10 is provided at an inner periphery of the flange portion 8 from the upper end surface thereof as a small annular groove so that the flange portion 8 has a property of easily deforming in the diametrical direction.

On the other hand, the longitudinal dimension of the plug 3 is set at about half of the longitudinal dimension of the sleeve 2, and a recess groove 11 including a taper surface 11a and a recess groove 12 acting as a neck portion and slightly greater than the recess groove 11 are provided at a tip end portion of the plug 3. The recess groove 11 is shaped into a form fitted with the projecting portion 7 formed on the inner periphery of the expansion portion 6 put in the non-expanded condition, and the other groove 12 is shaped into a form fitted with a shape of the projecting portion 7 on the inner periphery of the expansion portion 6 put in the expanded condition. Further, the maximum diameter of a tip end projection 13 of the plug 3 is formed so as to be slightly larger than the minimum inner diameter at a top portion of the projection portion 7 on the inner periphery of the expansion portion 6 put in the non-expanded condition.

Accordingly, by press-fitting the plug 3 into the sleeve 2 in order to assemble the sleeve 2 and the plug 3 by means of the interference fit connection, in addition that the general inner peripheral surface of the sleeve 2 and the general outer peripheral surface of the plug 3 are put in the interference fit condition, the recess groove 11 of the tip end of the plug 3 and the projecting portion 7 of the expansion portion 6 are engaged with each other by means of irregularity engagement so as to perform a detach preventing effect due to the relative positioning. Therefore, even if the fastener 1 in the pre-installation condition is put alone, the sleeve 2 and the plug 3 are not separated from each other.

Figure 6:
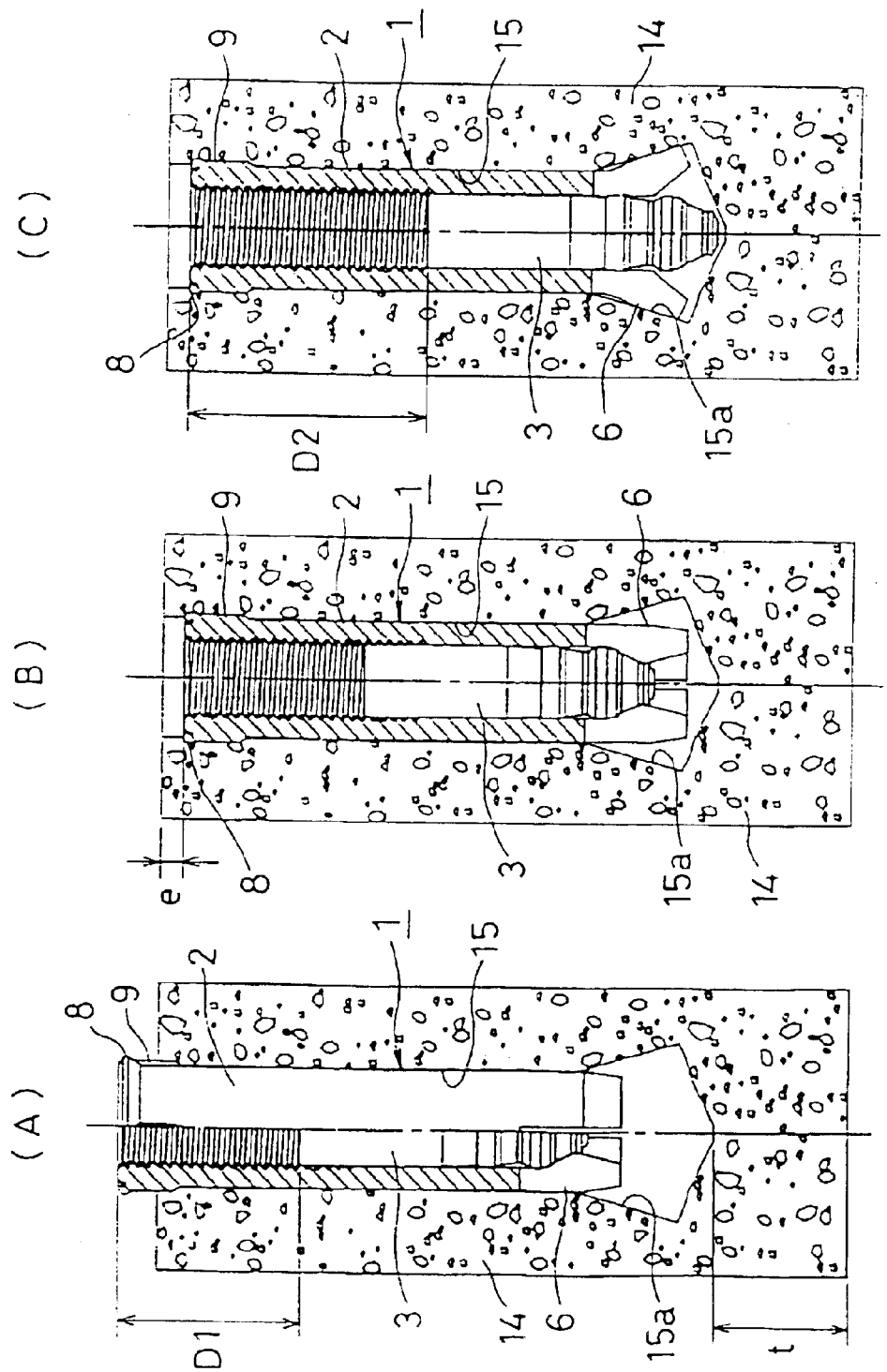
FIG. 6 is an explanatory view for a hammering procedure of the fastener shown in FIG. 2.

Next, the installation procedure of the fastener 1 will be explained as to a case that a prepared hole of an undercut type is also formed, with reference to FIGS. 6 and 7. In this example, it is assumed that a thickness dimension t remained at a bottom wall is small and that the bottom wall can not receive the hammering force of the fastener if an undercut type hole 15 is formed in a concrete structure 14 shown in FIG. 6. Further, it is arranged such that the friction resistance between the outer peripheral surface of the sleeve 2 and the inner peripheral surface of the prepared hole 15 receives the fastener hammering force.

Figure 13:
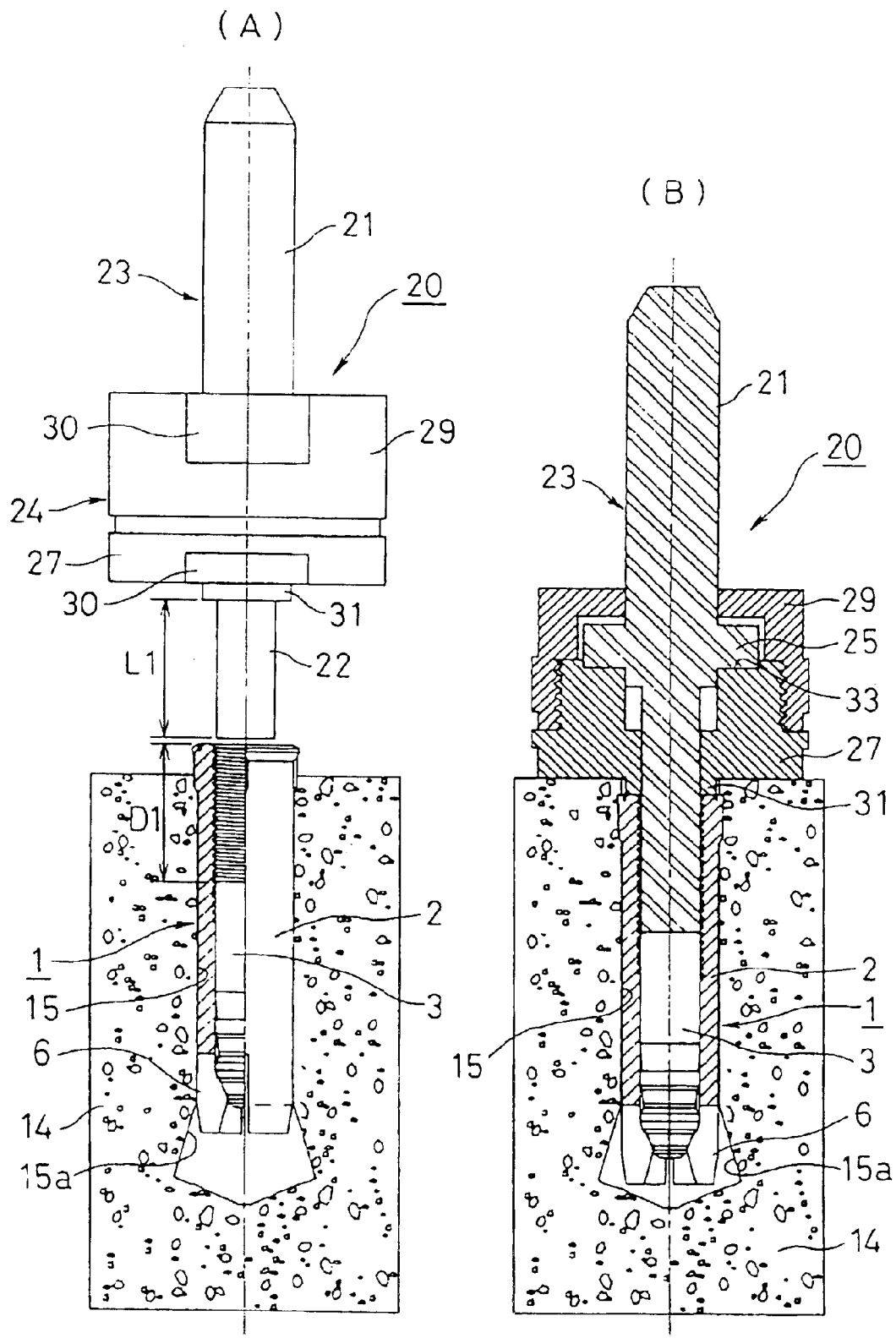
FIG. 13 is an operation explanatory view showing actual operation usage of the jig shown in FIGS. 8 to 12.

First, after the fastener 1 is inserted into the prepared hole 15 as shown in FIG. 6(A), the sleeve 23 is hammered by hammering operation through a dedicate hammering shaft (hammering jig) shown in FIG. 13 (the hammering jig 22 will be discussed later). At this time, the fastener 1 is hammered until the upper end portion of the sleeve 2 becomes lower in height level than the upper wall surface of the concrete structure 14 by a predetermined quantity e as shown in FIG. 6(B) so that the flange portion 8 and the ribs 9 located at the upper end portion of the sleeve 2 are completely press-fitted. Since the flange portion 8 is arranged to perform an easily deformable property by previously providing the circumferential groove 10 (Refer to FIGS. 2 and 5. In these Figures, the left half portion shows a condition that the flange portion is not yet deformed, and the right half portion shows a condition that the flange portion 8 has been deformed.), during the hammered process of the sleeve 2, the flange portion 8 is press-fitted to the prepared hole 15 while being deformed in the diametrical direction. With this manner, even if a portion near the upper end periphery of the prepared hole 15 is not a complete round, the flange portion 8 is deformed so as to follow the shape of the prepared hole 15 and equivalently fitted with the inner peripheral surface of the prepared hole 15. Therefore, it becomes possible to prevent any clearance from being generated between the prepared hole 15 and the sleeve after the installation operation and to prevent rain water and the like from infringing into a clearance therebetween.

Herein, if the prepared hole 15 is finished so that the depth of the prepared hole 15 corresponds to a specific dimension, by controlling the hammering degree of the sleeve 2 so that the above-described dimension e is set at the specific dimension, the tip end of the sleeve 2 does not reach the bottom wall surface of the prepared hole 15.

After the sleeve 2 is hammered by a specific quantity, the tip end of the expansion portion 6 of the sleeve 2 is expanded by hammering the plug 3 by means of the hammering jig 20 similar to that mentioned above as shown in FIG. 6(C) (the hammering jig 20 will be discussed later). At this time, although the sleeve 2 also tends to be hammered due to the friction force generated between the plug 3 and the sleeve 2 according to the hammering of the plug 3, as mentioned above, the flange portion 8 is engaged with the concrete structure 14 in addition that the general outer peripheral surface is fitted with the inner peripheral surface of the prepared hole 15. Therefore, the friction force between the inner peripheral surface of the prepared hole 15 and the sleeve 2 can sufficiently oppose the hammering force of the plug 3, and only the plug 3 is hammered with respect to the sleeve 2.

Figure 4:
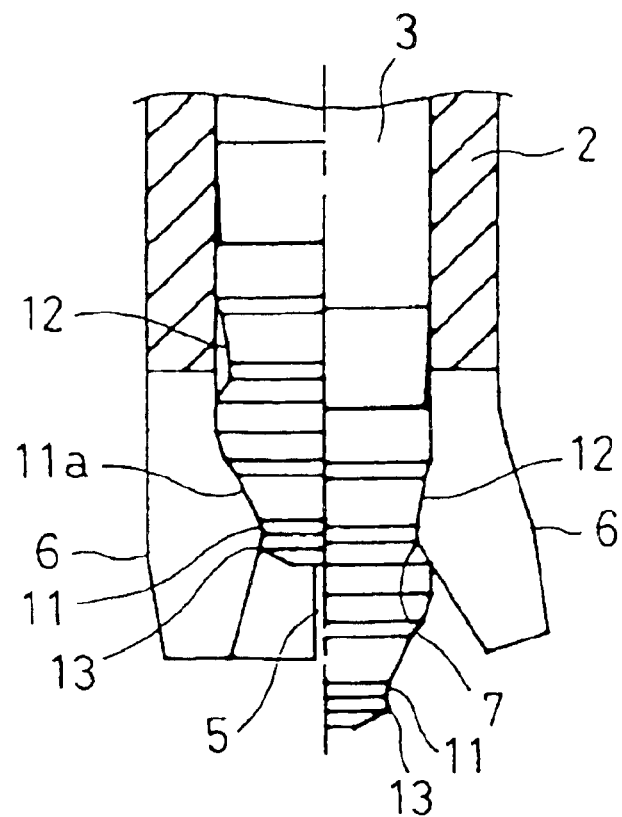
FIG. 4 is an essential enlarged view of an upper end portion of FIG. 2.

During a process that the plug 3 is hammered, the convexoconcave engagement between the recess groove 11 of the plug 3 and the projecting portion 7 of the expansion portion 6 is gradually disengaged as shown in FIG. 4, and according to this gradual disengagement, the expansion portion 6 is expanded into a skirt shape along a tapered surface 15a of the prepared hole 15. Then, the other recess groove 12 of the plug 3 is engaged with the projection portion 7 and therefore the relative positioning between the sleeve 2 and the plug 3 is executed. Therefore, the expansion of the expansion portion 6 is completed by reaching this condition. By the engagement between the recess groove 12 and the projecting portion 7, the expansion portion 6 once expanded to the maximum expanded state as shown in FIG. 6(C) is slightly returned due to a so-called spring back phenomenon and is put in the condition shown in FIG. 7(A). Therefore, a builder can momentarily feel that the recess groove 12 is engaged with the projecting portion 7 as an installation feeling, and the hammering operation of the plug 3 is terminated by obtaining the installation feeling regarded that the expansion portion 6 was expanded by the predetermined quantity. If the depth dimension of the prepared hole 15 corresponds to the specific dimension, the tip end of the plug 3 is not contacted with the bottom wall surface of the prepared hole 15 under the expanded condition of the expansion portion 6.

If the expansion of the expansion portion 6 is completed by the hammering of the plug 3, a predetermined fixing structure 16 is set on the concrete structure 15 as shown in FIG. 7(B), and a bolt 17 passing through the fixing structure 16 is screwed to the female screw portion 4 of the sleeve 2 to be fixed with the concrete structure 15. At this time, since the plurality of ribs 9 formed on the outer peripheral surface of the sleeve 3 are engaged with the concrete structure 14 as explained above, this arrangement prevents the sleeve 2 from being rotated together with the bolt 17. According to the tightening of the bolt 17, the sleeve 2 is relatively pulled up and therefore the upper end surface of the sleeve 23 is fitted with the fixing structure 16. Further, the expansion portion 6 previously expanded is fitted with the taper surface 15a of the prepared hole 15. As a result, the expansion portion 6 expanded into a skirt shape and the fixing structure 16 press-fittingly tighten the concrete structure 14. Therefore, it becomes possible to strongly fix the fixing structure 16 with a further strong anchor effect.

With the thus arranged embodiment, when the fastener 1 is put alone in the non-expanded condition, the sleeve 2 and the plug 3 are engaged with each other by the convexoconcave engagement so as to be relatively positioned with each other, in addition to the press-fitting of the plug 3 to the sleeve 3. Therefore, the sleeve 2 and the plug 3 are not separated and are easy to be handled. Further, even when the hammering force cannot be received at the bottom wall surface of the prepared hole 15, it is of course possible to execute the anchor hammering by receiving the hammering force in the friction force between the sleeve 2 and the inner peripheral surface of the prepared hole 15. Further, since the installation feeling caused by the convexoconcave engagement is obtained by expanding the expansion portion 6 through hammering the plug 3 to the specific position, the dispersion of the installation condition due to differences among builders is prevented, and the stable anchor effect is always ensured. Furthermore, by employing the prepared hole 15 of a so-called undercut type in addition to the fastener 1, the tensile strength is further improved.

Next, the detail of the jig 20 of FIG. 13 employed in the hammering of the fastener 1, that is, a preferred embodiment of the jig will be explained with reference to FIGS. 8 and 9. Herein, the jig 20 is characterized to be commonly adapted to the hammering of the sleeve 2 and the hammering of the plug 3 by changing an effective longitudinal dimension of a punch portion 22 inserted to the sleeve 2.

The jig 20 is generally constituted by a rod 23 integrated so that the punch portion 22 inserted into the sleeve 2 is located on the same axis with a shank portion 21 acting as a grip portion and a hammering input portion, and an adjustable adapter 24 attached to the rod 23.

The shank portion 21 and the punch portion 22 of the rod 23 are both solid cylindrical shapes, the rod 23 is formed into a stepped shaft shape as a whole, and a flange portion (deformed flange portion) 25 of a flat oval or oval shape taking a diameter of the shank portion 21 as a miner axis is integrally formed at the shank portion 21 near the punch portion 22.

On the other hand, the adjust adapter 24 is constituted by a compress-cylindrical case 27 having a male screw portion 26 at its outer peripheral surface and a cup-shaped cover 29 having a female screw portion 28 at its inner peripheral surface. The case 27 is attached to the rod 23 from the punch portion 22, and the cover 29 is attached to the rod 23 from the shank portion 21. Then, both of the case 27 and the cover 29 sandwich the flange portion 25 and are detachably connected with each other through screw portions 26 and 28 thereof. Width across flat portions 30 for tightening and loosening the screw portions 26 and 28 are formed on outer peripheral surfaces of the case 27 and the cover 29. Further, an annular projection 31, which is seated on the sleeve 2 when the sleeve 2 or the plug 3 is hammered, is formed at a lower surface of the case 27.

Different two engagement grooves 32 and 33, which the flange portion 25 is engageble with and detachable from, are formed at an upper surface of the case 27 so as to cross with each other in a plan view direction. More specifically, the first engagement groove 32 having the same shape with the flange portion 25 and a deeper depth and the second engagement groove 33 having the same shape with the flange portion 25 and a shallow depth are provided at the case 27 so that they are sifted by 90° in phase with each other so as to form a cross shape. By rightly rotating or inversely rotating the rod 23 and the adjust adapter 24, one of the two engagement grooves 32 and 33 is selectively engaged with the flange portion 25.

Figure 28:
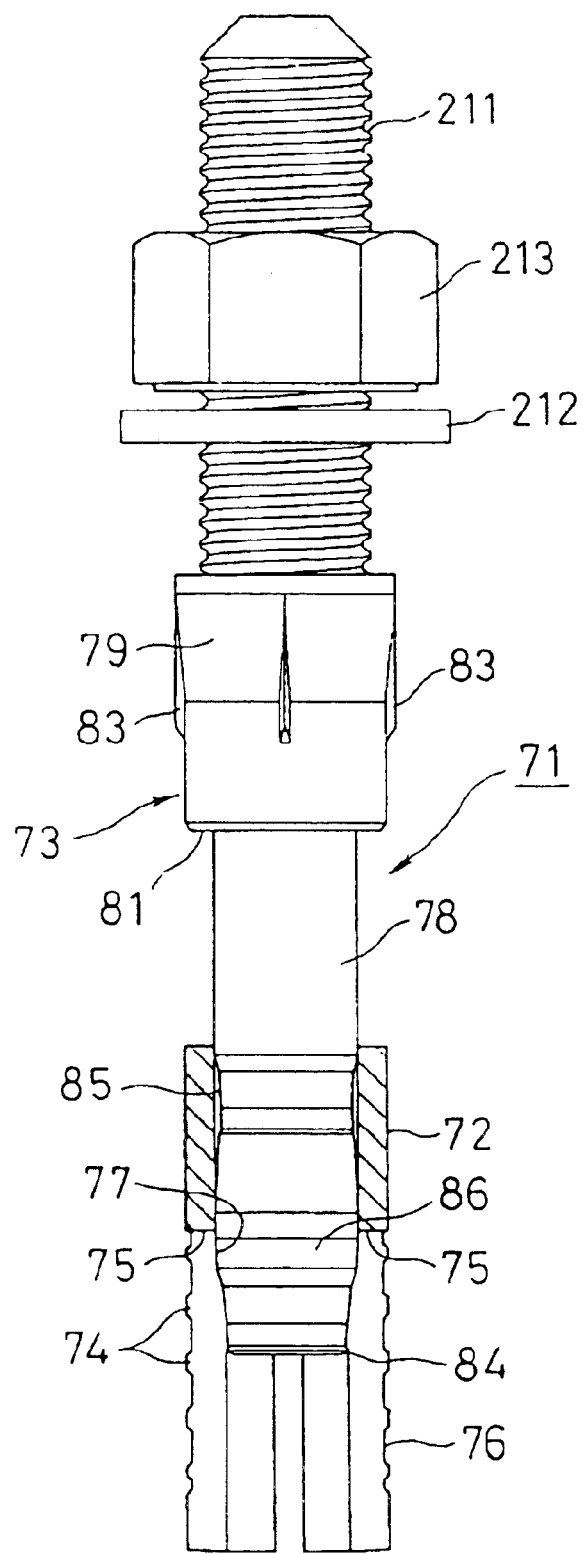
FIG. 28 is a structure explanatory view showing a modification of the fastener shown in FIG. 22.

That is, as shown in FIG. 28, when the flange portion 25 is engaged with the shallow depth second engagement groove 33, a distance L1 from the annular projection 31 to the tip end of the punch portion 22 is adjusted to the distance D1 from the upper end surface of the sleeve 2 of the non-expanded fastener 1 shown in FIG. 6(A) to the upper end surface of the plug 3. In this case, a clearance C necessary for releasing the engagement between the second engagement groove 33 and the flange portion 25 is ensured between the flange portion 25 engaged with the second engagement groove 33 and the cover 29. Accordingly, by using the jig 20 set at the condition shown in FIG. 8, the sleeve 2 can be hammered.

Figure 11:
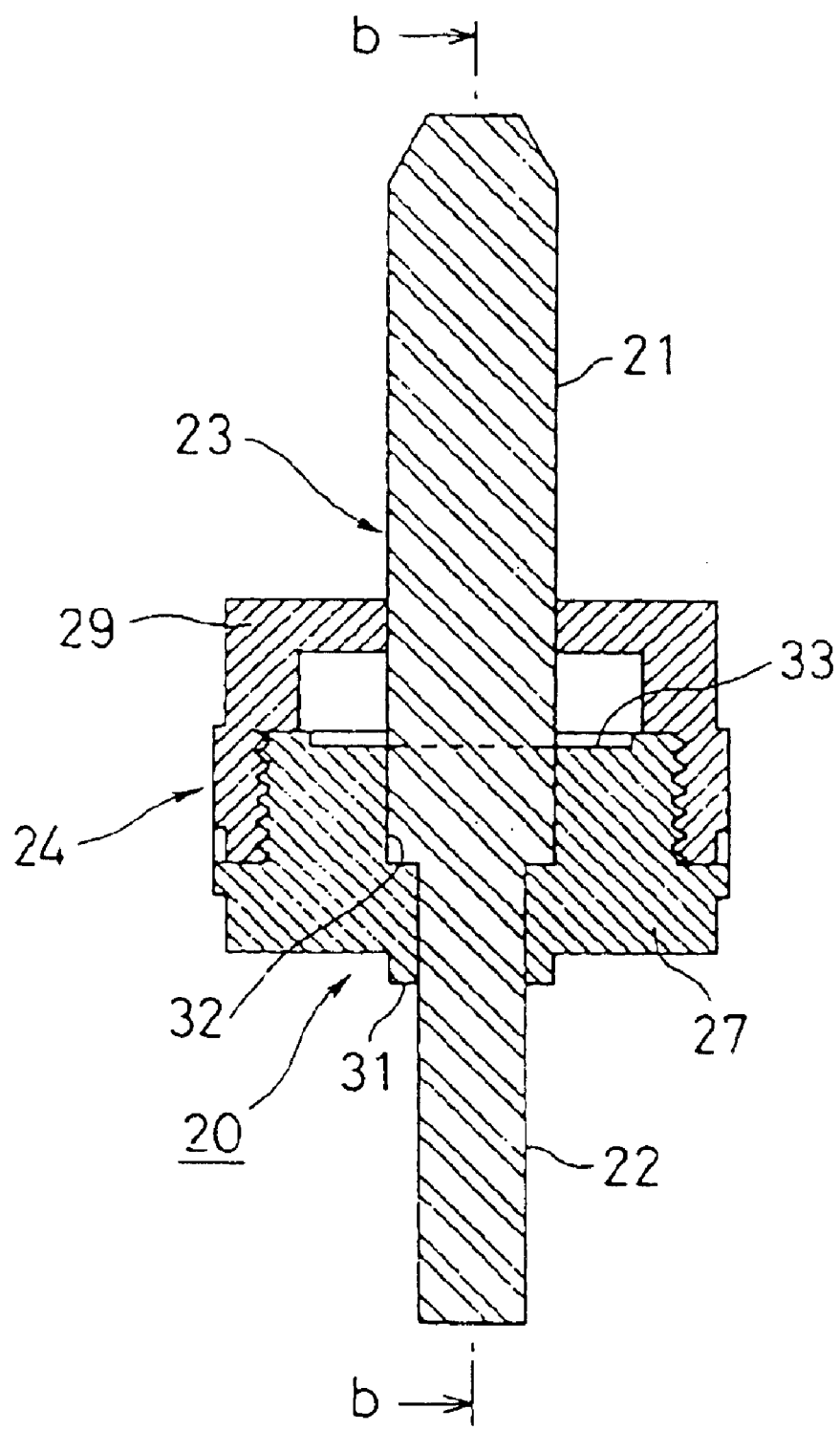
FIG. 11 is an operation explanatory view of the jig shown in FIG. 8.
Figure 12:
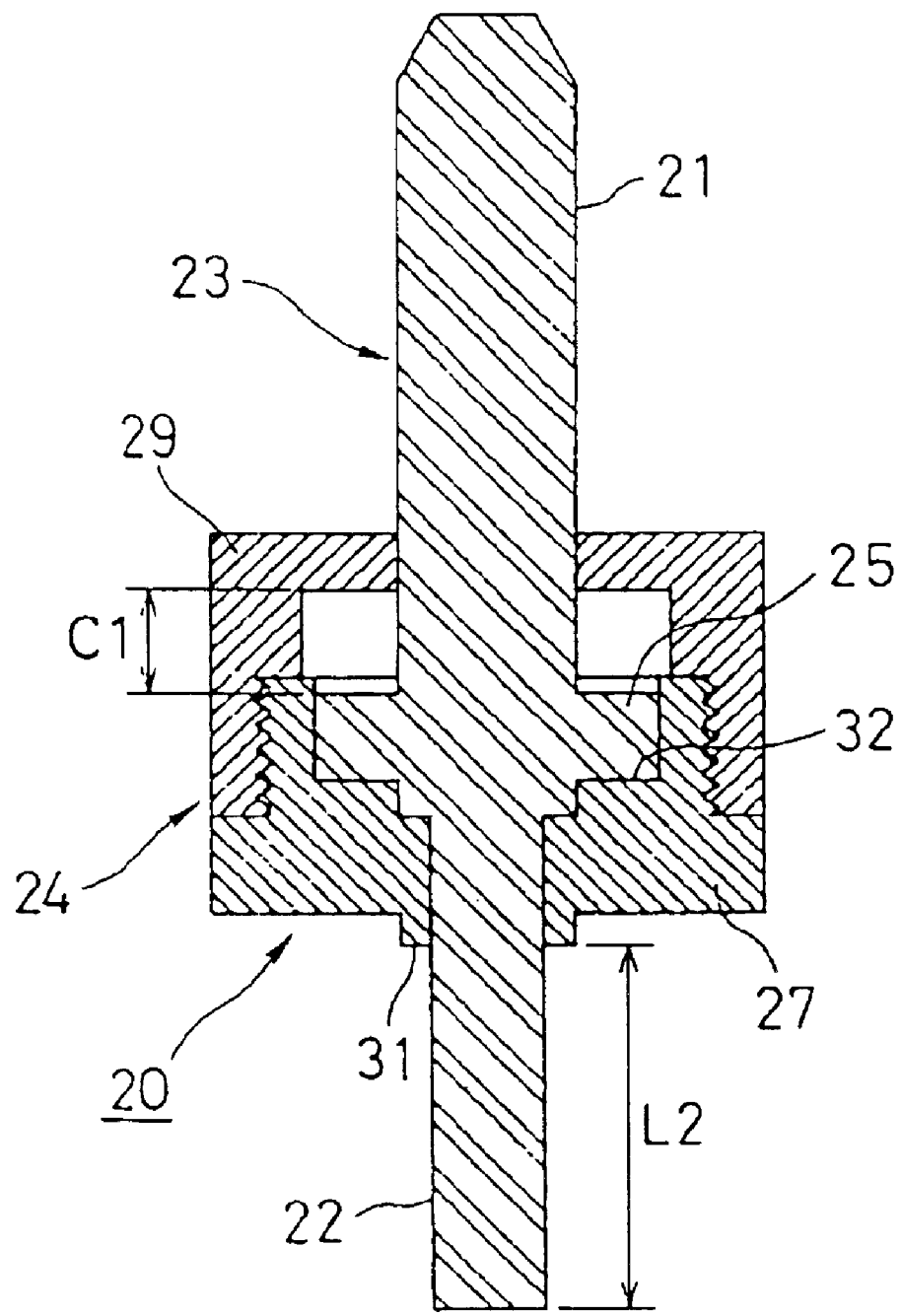
FIG. 12 is a cross-sectional explanatory view along the line b—b of FIG. 11.

As shown in FIGS. 11 and 12, when the flange portion 25 is engaged with the first engagement groove 32 having a deep depth, the distance between the annular projection 31 to the tip end portion of the punch portion 22 is set to correspond with the distance L2 (L1<L2) from the upper end surface of the sleeve 2 of the fastener 1 expanded as shown in FIG. 6(A) to the upper end surface of the plug 3. In this case, a clearance C1 necessary for releasing the engagement between the first engagement groove 32 and the flange portion 25 is ensured between the flange portion 25 engaged with the first engagement groove 32 and the cover 29. Accordingly, by using the jig 20 set at the condition shown in FIGS. 11 and 12, the plug 3 can be hammered with respect to the sleeve 2.

Figure 8:
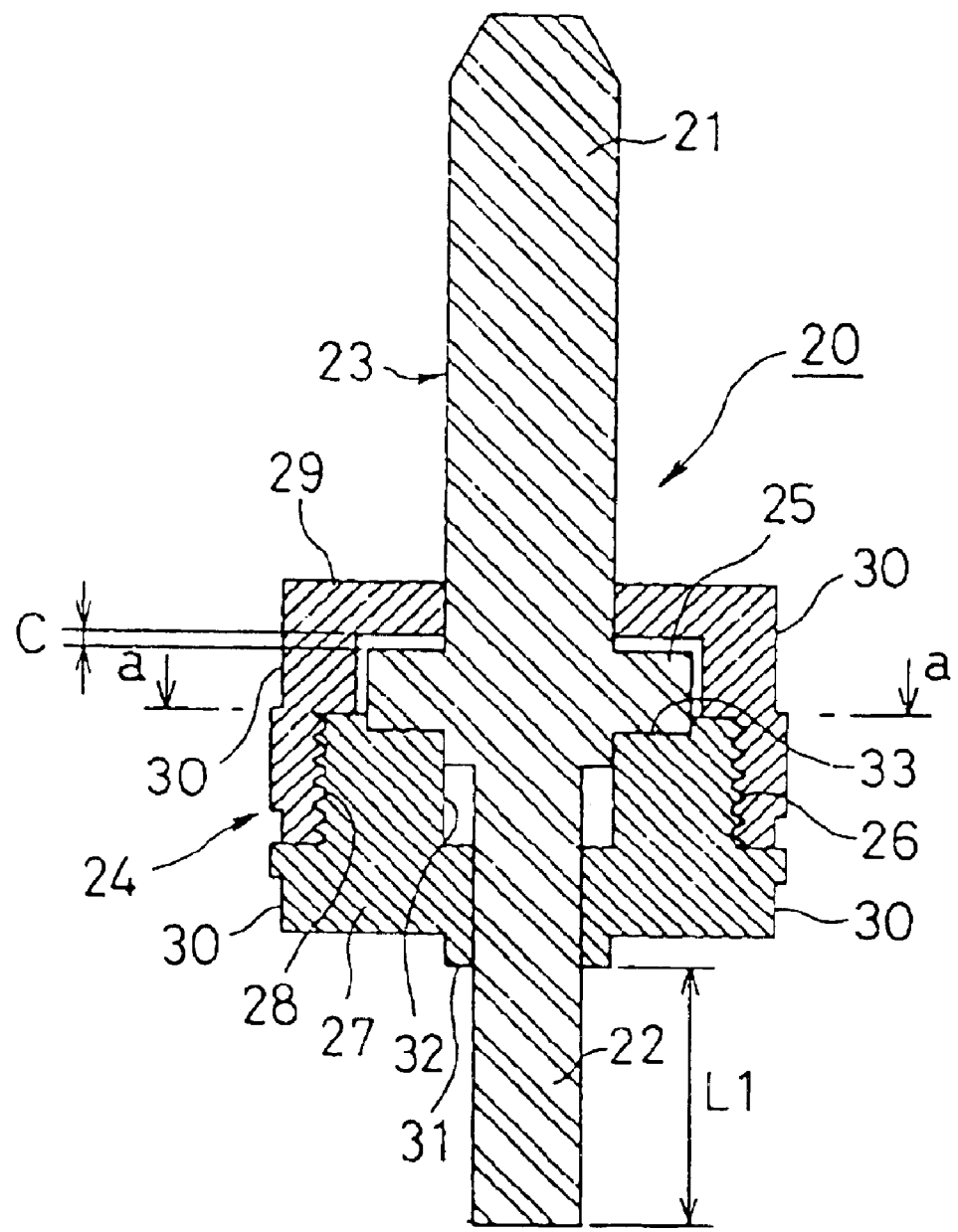
FIG. 8 is a cross-sectional explanatory view of a hammering jig employed in the hammering procedure of the fastener shown in FIG. 2.
Figure 9:
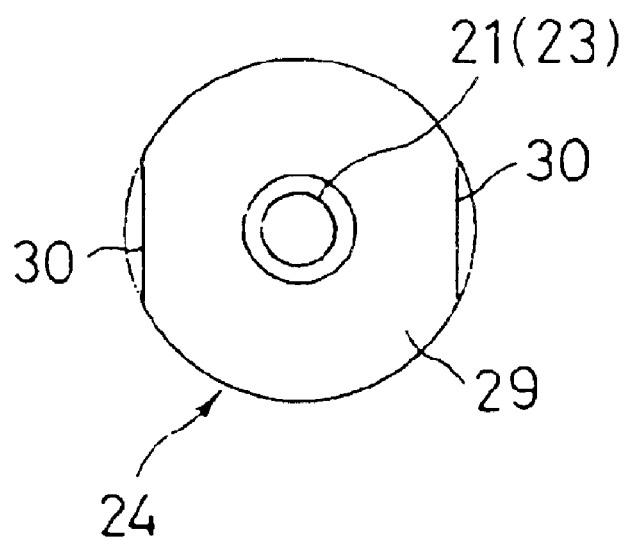
FIG. 9 is a plan explanatory view of FIG. 8.
Figure 10:
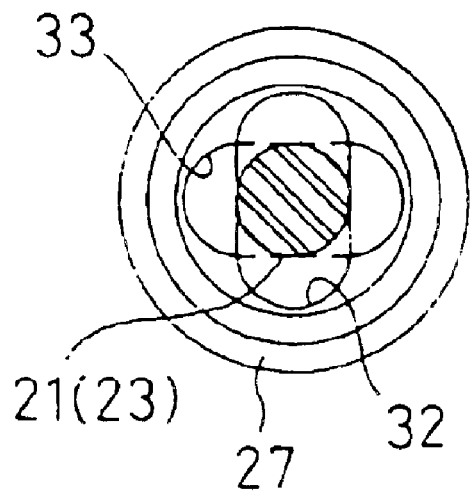
FIG. 10 is a cross-sectional explanatory view along the line a—a of FIG. 8.

Accordingly, when the sleeve 2 is hammered, the flange portion 25 of the jig 20 is engaged with the second engagement groove 33 having the small depth as shown in FIG. 8, and the punch portion 22 is inserted into the sleeve 2 preliminarily set in the prepared hole 15 until the annular projection 31 contacts with the upper end surface of the sleeve 2, as shown in FIGS. 13(A) and 13(B). Under this condition, the sleeve 2 is hammered until the case 27 is seated on the concrete structure 14 by applying the hammering strike to the shank portion 21. Since the hammered depth of the sleeve 2 can be controlled by monitoring the seated condition of the case 27, the hammered depth of the sleeve 2 is always maintained at a constant value.

Figure 14:
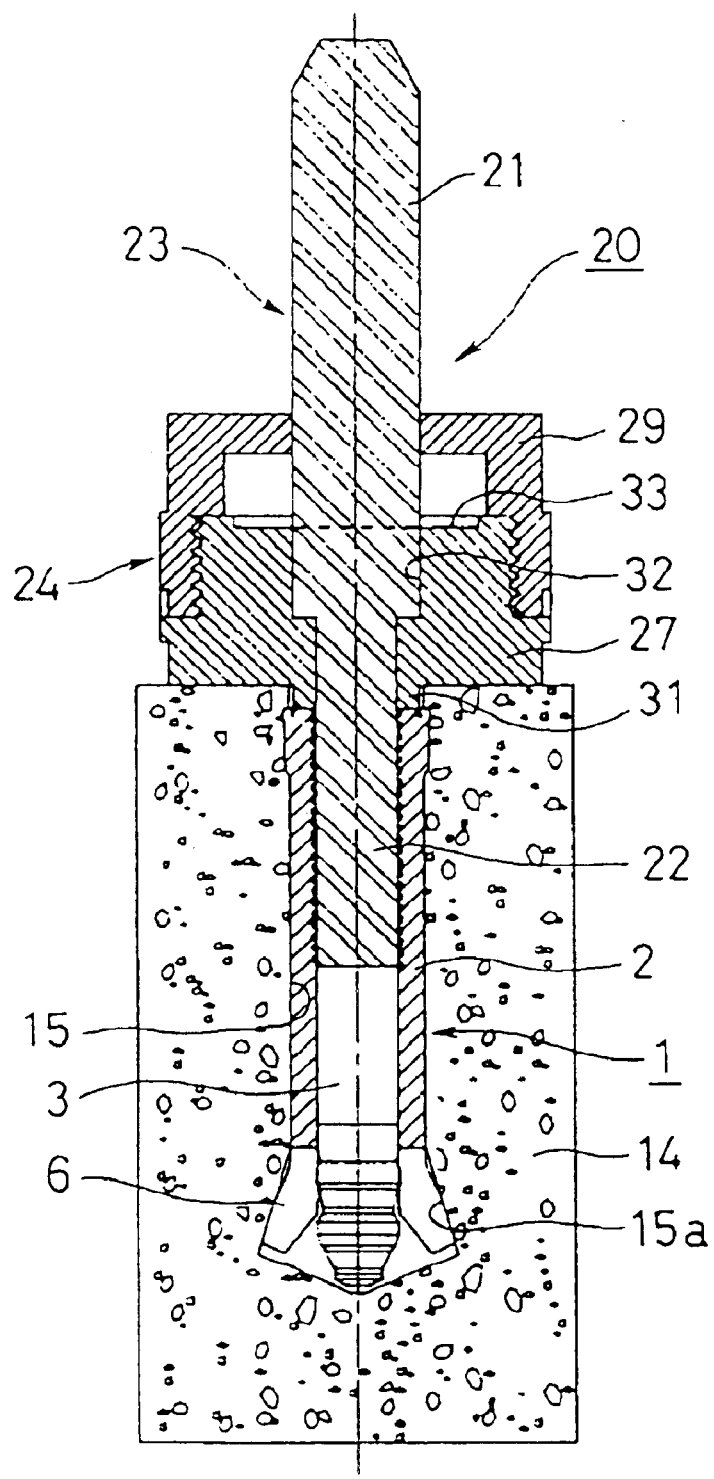
FIG. 14 is an operation explanatory view showing actual operation usage of the jig shown in FIGS. 8 to 12.

When the plug 3 is hammered following to the hammering of the sleeve 2, the rod 23 is lifted up with respect to the adjust adapter 24 by the clearance C from the condition of FIGS. 8 and 13(B), the engagement between the second engagement groove 33 and the flange portion 25 are released, and the flange portion 25 is slightly engaged with the first engagement groove 32 having the deep depth by relatively rotating between the adjust adapter 24 and the rod 23 by 90° (At this time, since the plug 3 is not yet hammered, the flange portion 25 is not put in the fully hammered condition with respect to the first engagement groove 21). After it is recognized that the case 27 is seated on the concrete structure 14, the hammering strike is applied to the shank portion 21 while the engaged condition between the first engagement groove 32 and the flange portion 25 is maintained. Until the flange portion 25 is put in the fully hammered condition with respect to the first engagement groove 32, that is, until the condition shown in FIG. 14, the plug 3 is hammered. In this case, on the basis of the condition that the case 27 is seated to the concrete structure 14 and the flange portion 25 is fully hammered to the first engagement groove 32, the control of the hammering depth of the plug 3 can be executed. Therefore, the hammering depth of the plug 3 and the expanded condition of the expansion portion 6 is always set constant, and the installation condition is further stabilized.

The jig 20 of the embodiment has been shown so as to be commonly employed in the hammering of the sleeve 2 and the hammering of the plug 3, herein. However, since it is possible to properly set the difference of the projection dimensions of the punch portion 22 based on the difference between the depth dimensions of the first and second engagement grooves 32 and 33, it is possible, for example, that as to two kinds of fasteners having different sizes, different sleeves 2 having two kinds of D1 dimensions (refer to FIG. 6(A)) may be commonly employed for the hammering or different plugs 3 having two kinds of D2 dimensions (refer to FIG. 6(C)) may be employed for the hammering.

Figure 16:
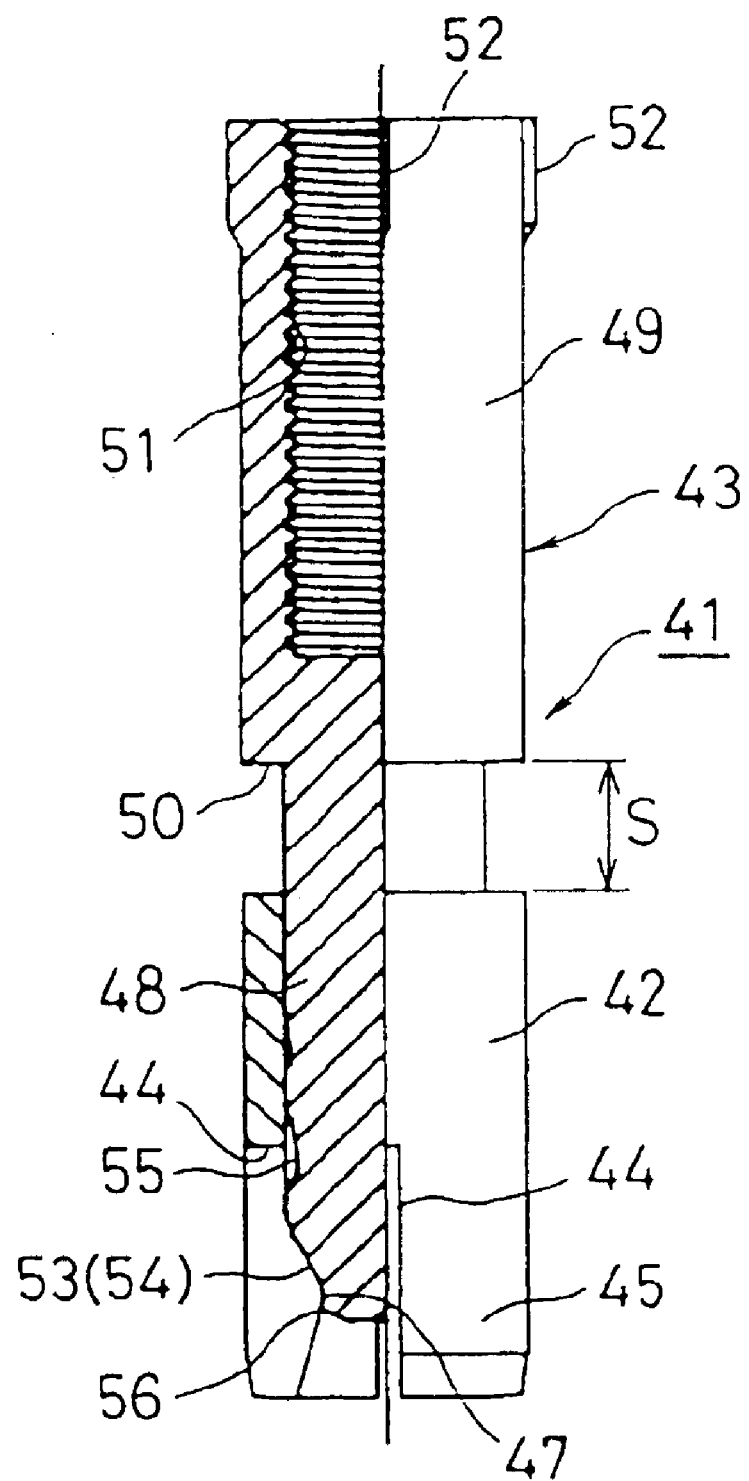
FIG. 16 is a cross-sectional explanatory view showing a connected condition between the sleeve and the anchor main body portion shown in FIG. 15.
Figure 17:
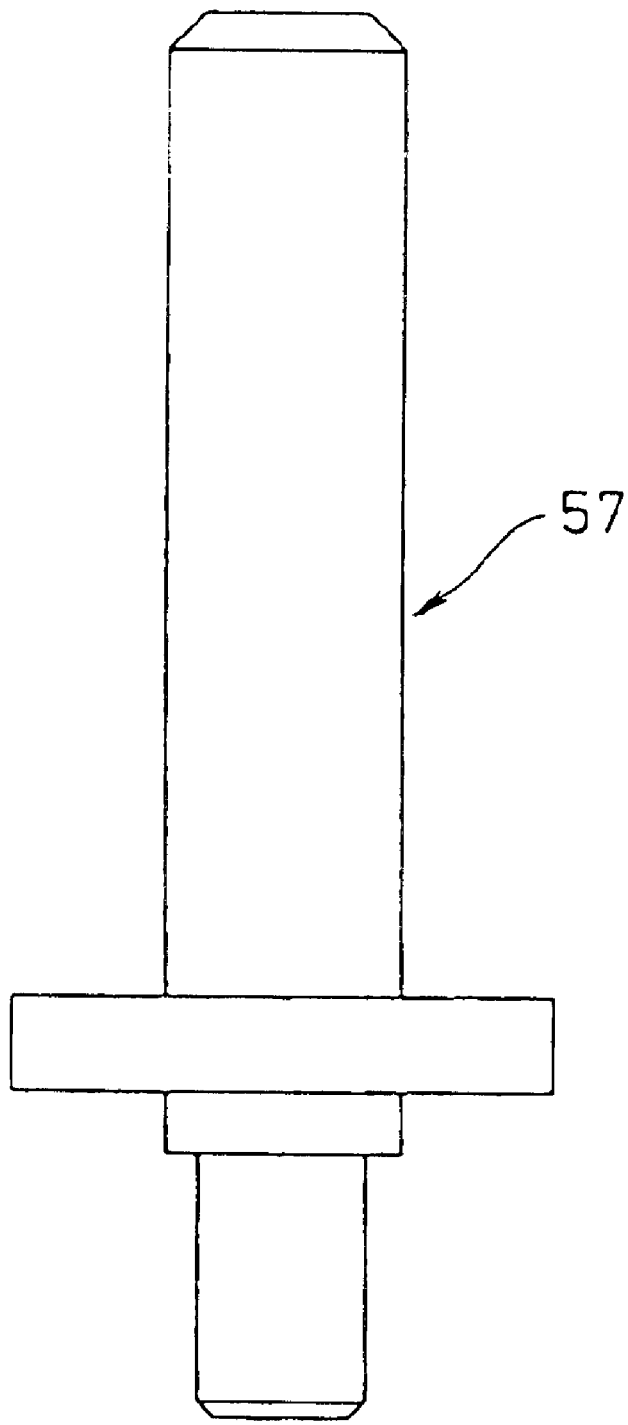
FIG. 17 is an explanatory view of a jig employed in the hammering of the fastener shown in FIG. 16.
Figure 18:
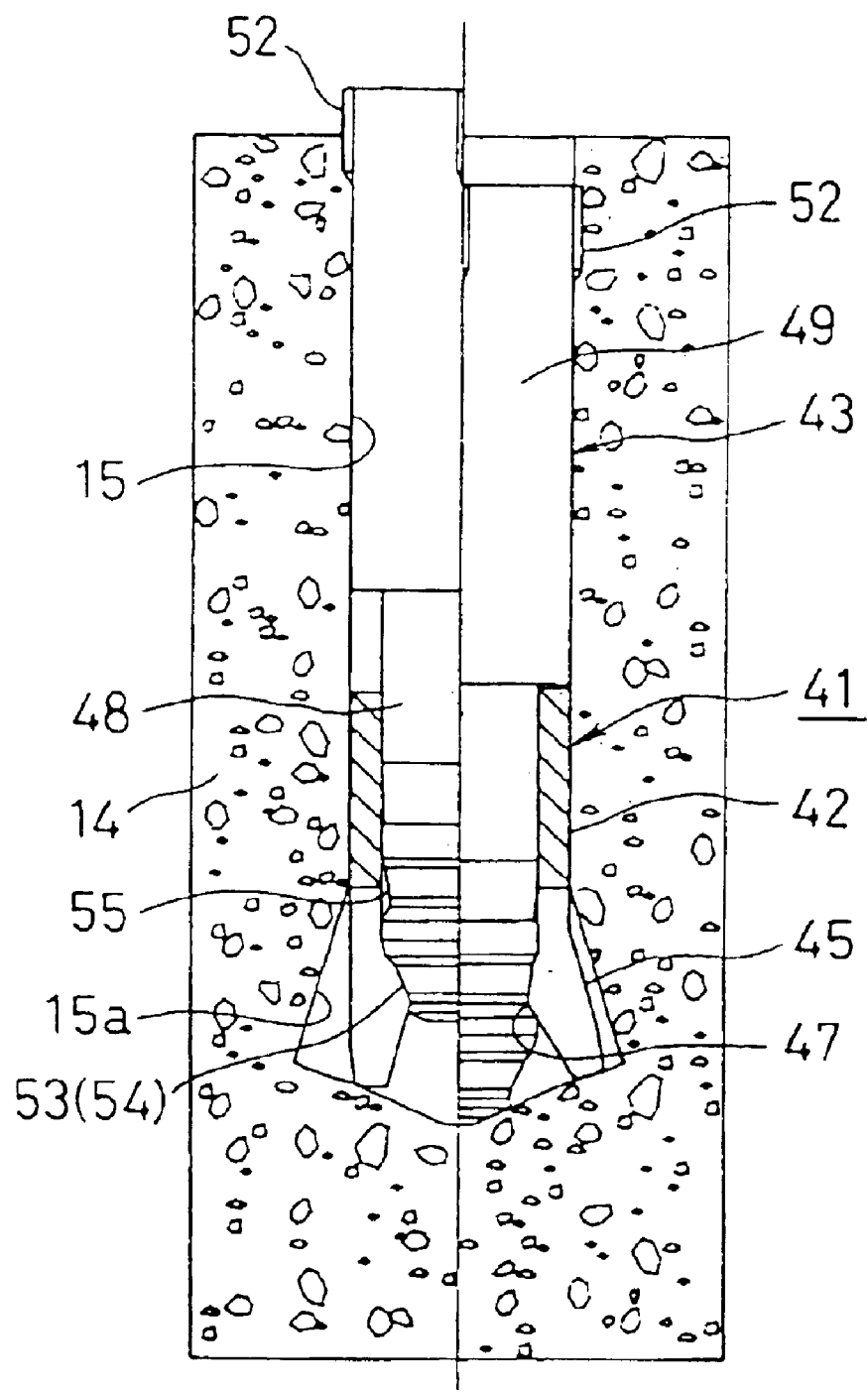
FIG. 18 is a cross-sectional explanatory view showing a hammered condition of the fastener shown in FIG. 16.

FIGS. 15 to 18 are figures showing the preferred embodiment (second embodiment) of the fastener according to the present invention, and show an example of a metal post-installation anchor and of a sleeve hammering type. In FIG. 18, the left half portion thereof shows a non-expanded condition of the expansion portion, and the right half portion thereof shows the expanded condition of the expansion portion.

Figure 15:
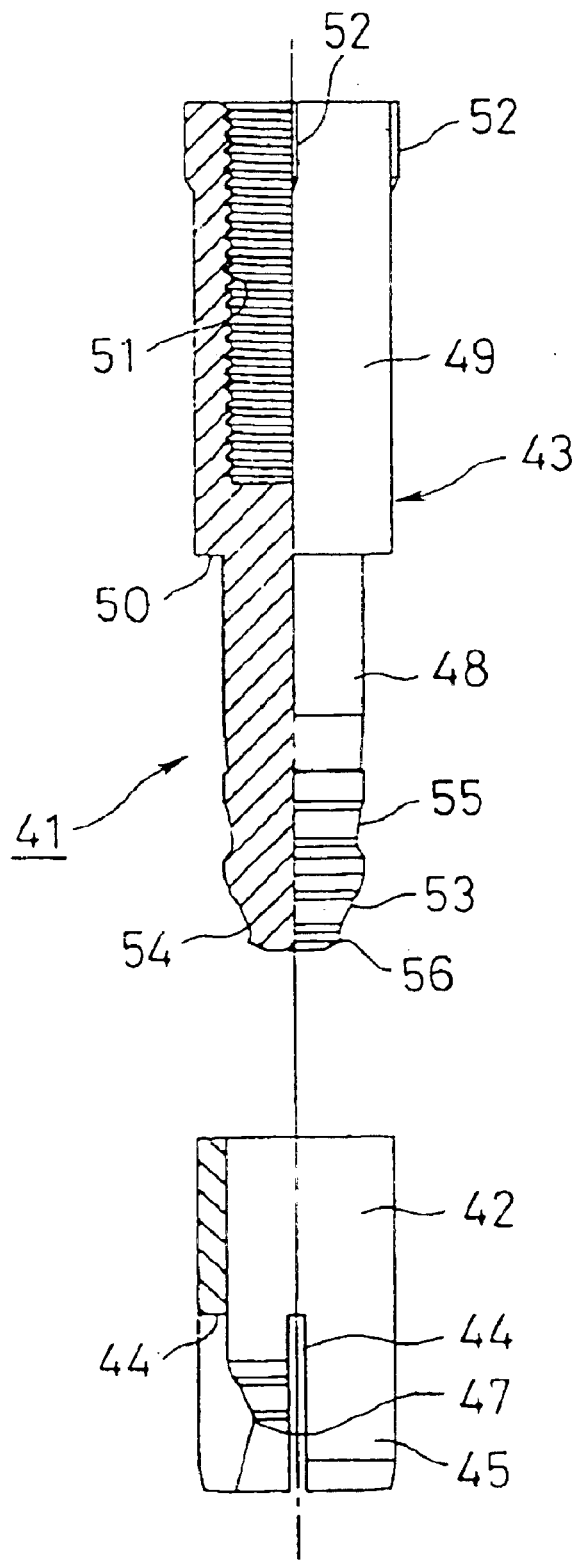
FIG. 15 is a view showing a preferred second embodiment of the fastener according to the present invention and an exploded view showing a sleeve and an anchor main body portion which are shown by a semi-cross section view.

As shown in FIGS. 15 and 16, a fastener 41 is constituted by a sleeve 42 of a hollow cylindrical shape and an anchor main body 43 of the stepped shaft shape, which is press-fitted into the sleeve 42.

The sleeve 42 is formed into a shape having a minimum longitudinal dimension which is minimum and necessary as an expansion portion. Further, a lower end portion of the sleeve 42 is divided into a collet shape having four radially slotted grooves 44 and is formed into an expansion portion 45 expandable in a radial direction. Furthermore, a projecting portion 47 is provided at an inner peripheral surface of the expansion portion 45 so as to partially decrease an inner diameter thereof.

On the other hand, the anchor main body portion 43 is constituted by a plug 48 directly press-fitted into the sleeve 42 as an expansion member and a large diameter shaft portion 49 integral with and extending from the plug 48. Further, a stepped portion 50 is provided between the plug 48 and the larger diameter shaft portion 49 corresponding to the difference of the diameters therebetween. The diameter of the large diameter shaft portion 49 is set to be generally the same as that of the sleeve 42, and a female screw portion 51 is formed on the inner periphery of the larger diameter shaft portion 49. Further, a plurality of ribs 52 are projectingly provided on an outer peripheral surface of the end portion at which the female screw portion 51 of the large diameter shaft portion 49 is opened. The ribs 52 have a function for preventing the anchor main body portion 43 from being rotated when a bolt is screwed to the female screw portion 51 as mentioned later.

The plug 48 integrally formed with the large diameter shaft portion 49 is set to have a longitudinal dimension slightly longer than the sleeve 42. Further, the plug 48 is provided with a recess groove 54 which includes a taper surface 53 at the tip end portion of the plug 48 and a recess groove 55 which is slightly larger in diameter than the recess groove 54 and act as a neck portion. By these portions, the plug 48 is formed into a limbless wooden doll shape or stepped shaft shape. The recess groove 54 is formed into a shape corresponding to the projecting portion 47 at the inner periphery of the expansion portion 45 in the non-expanded condition, and the other recess groove 55 is formed into a shape corresponding to the projection portion 47 at the inner periphery of the expansion portion 45 in the expanded condition. Further, the diameter of the projecting portion 56 at the tip end of the plug 48 is formed slightly greater than the minimum inner diameter at the top portion of the projecting portion 47 at the inner periphery of the expansion portion 45 in the non-expanded condition. As to the relative relationship between the expansion portion 45 of the sleeve 42 and the plug 48, the structure thereof is the same as that explained in the first embodiment.

By press-fitting the plug 48 into the sleeve 42 in order to connect the sleeve 42 and the plug 48 at the anchor main body portion 43 by means of the interference fit connection, in addition that the general inner peripheral surface of the sleeve 42 and the general outer peripheral surface of the plug 48 are put in the interference fitting condition, the recess groove 54 of the tip end of the plug 48 and the projecting portion 47 of the expansion portion 45 are engaged with each other by means of the covexoconcave engagement so as to perform a detach preventing effect due to the relative positioning. Therefore, even if the fastener 41 in the pre-installation condition is put alone, the sleeve 42 and the plug 48 are not separated from each other. Simultaneously, a relative movement stroke S allowed between the sleeve 42 and the steppe portion 50 of the anchor main body portion 43 is set therebetween.

Next, the installation procedure of the fastener 41 will be explained as to a case that a prepared hole 15 of an undercut type is also formed, with reference to FIGS. 17 and 18.

This example shows a case that the sleeve 42 is seated to a bottom wall surface of the prepared hole 15 of the undercut type which is formed in a concrete structure 14 and that the plug hammering force is received by the bottom wall surface.

After the fastener 41 is inserted into the prepared hole 15 from the side of the sleeve 42 as shown in FIG. 18, and the tip end of the sleeve 42 is seated to the bottom wall portion of the prepared hole 15 by weakly applying the hammering strike to the large diameter shaft portion 49 of the anchor main body portion 43 through a hammering shaft (hammering jig) 57 shown in FIG. 17. Further, a hammer main strike is applied to the anchor main body portion 43 to expand the expansion portion 45 of the sleeve 42. Furthermore, the anchor main body portion 43 is hammered until the upper end surface of the large diameter shaft portion 49 becomes slightly lower in height level than the upper wall surface of the concrete structure 14 by a predetermined quantity, so that the ribs 52 at the end portion of the large diameter shaft portion 49 are completely press-fitted into the prepared hole 15 (a condition of the right half portion of FIG. 18).

During the process that the anchor main body portion 43 is hammered, the convexoconcave engagement between the recess groove 54 of the plug 48 and the projecting portion 47 of the expansion portion 45 is gradually disengaged, and according to this gradual disengagement, the expansion portion 45 is expanded into a skirt shape along the taper surface 15a of the prepared hole 15. Then, the sleeve 42 is contacted with the stepped portion 50 of the anchor main body portion 43 so as not to be moved with each other. Simultaneously, the other recess groove 55 of the plug 48 is engaged with the projection portion 47 and therefore the relative positioning between the sleeve 42 and the plug 48 is executed. Therefore, the expansion of the expansion portion 45 is completed by this condition. By the engagement between the recess groove 55 and the projecting portion 47, as is similar to the case of FIGS. 6 and 7, the expansion portion 45 once expanded to the maximum expanded state is slightly returned due to a so-called spring back phenomenon and is put in the condition of the right half portion of FIG. 18. Therefore, a builder can momentarily feel that the recess groove 55 is engaged with the projecting portion 47 as an installation feeling, and the hammering operation of the plug 48 is terminated by obtaining the installation feeling regarded that the expansion portion 45 was expanded by the predetermined quantity. These behaviors are the same as those of the first embodiment previously explained.

Figure 7:
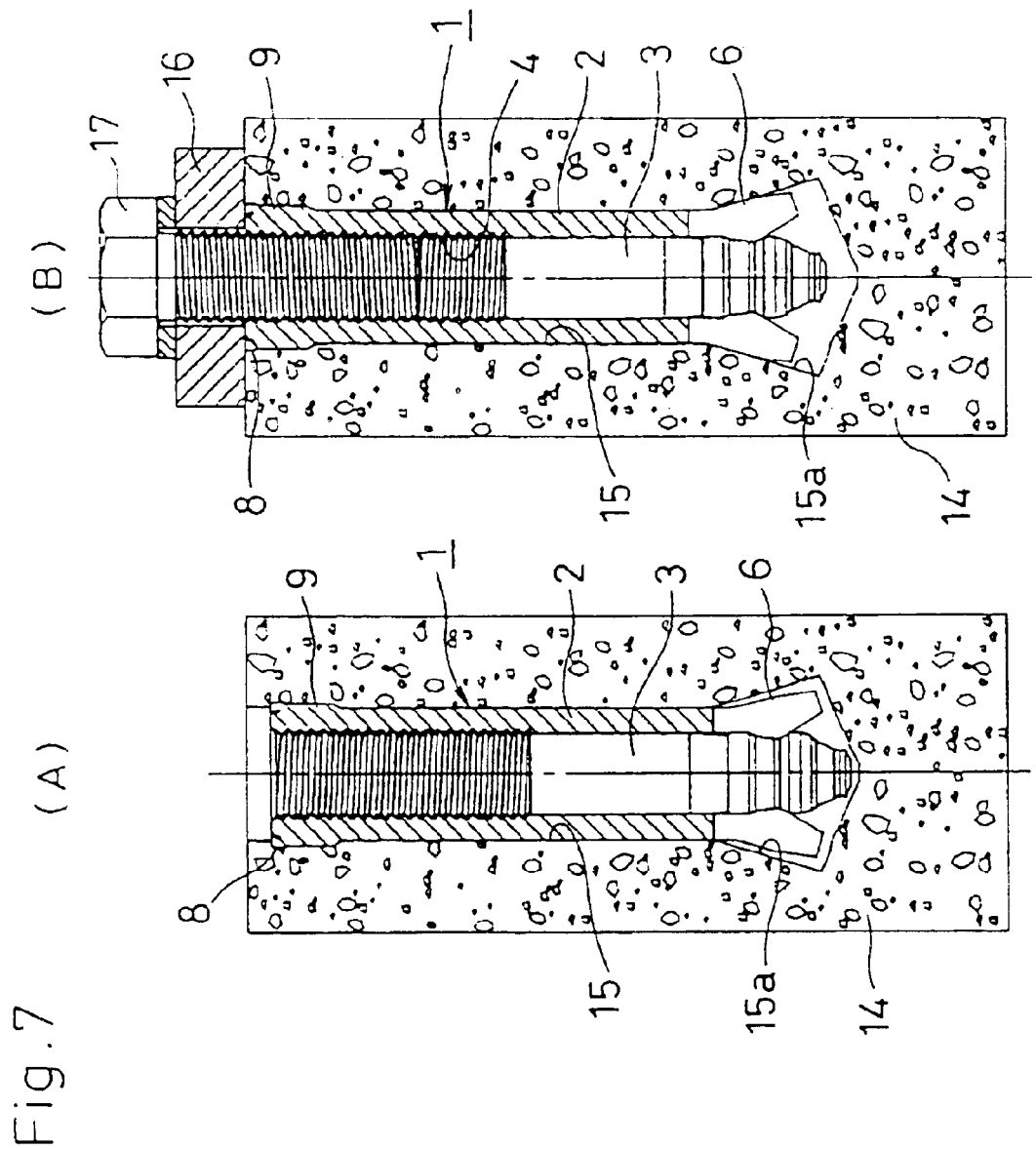
FIG. 7 is an explanatory view for a hammering procedure of the fastener shown in FIG. 2.

During the expansion of the expansion portion 45 is completed by the hammering of the plug 48, a predetermined fixing structure is set to the concrete structure 14, and a bolt inserted to the fixing structure is tightened to the female screw portion 51 of the large diameter shaft portion 49, in the same procedure as that shown in FIG. 7.

In addition to the advantages as same as those of the first embodiment, this embodiment has a merit that the sleeve 42 may be extremely small in longitudinal dimension. That is, the sleeve 42 of the present embodiment may substantially have a function as the expansion portion 45 and therefore may be small. If a sleeve is long, it is necessary to produce the sleeve by means of the follow roll forming. In contrast to this, since the sleeve 42 is short, it is possible to easily produce it by means of the forging press method, and therefore it is possible to decrease the cost of the part.

Figure 19:
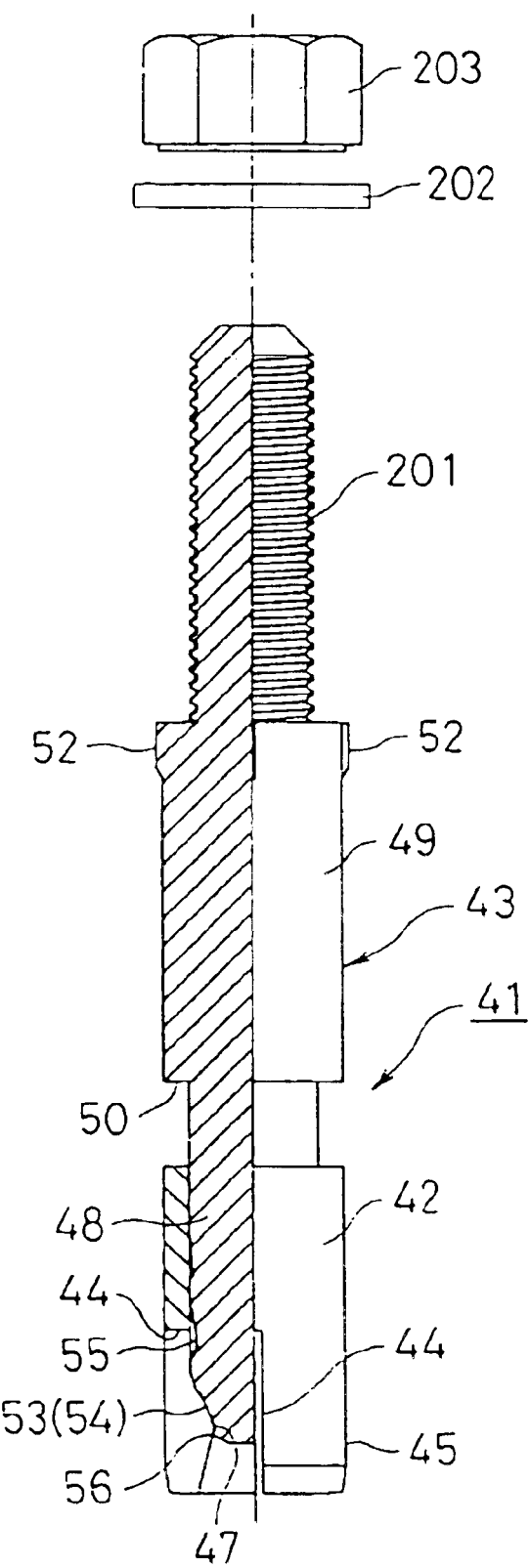
FIG. 19 is a half cross-sectional explanatory view showing a modification of the fastener shown in FIGS. 15 and 16.

FIG. 19 is a modification of the fastener 41 shown in FIGS. 15 to 18. In this modification, a male screw portion 201 instead of the female screw portion 51 of the anchor main body portion 43 is integrally formed with the anchor main body portion 43. The other structure is the same as that shown in FIGS. 15 to 18. A nut 203 is screwed to the male screw portion 201 through a washer 202. This modification performs the functions as same as that shown in FIGS. 15 to 18 does.

Figure 20:
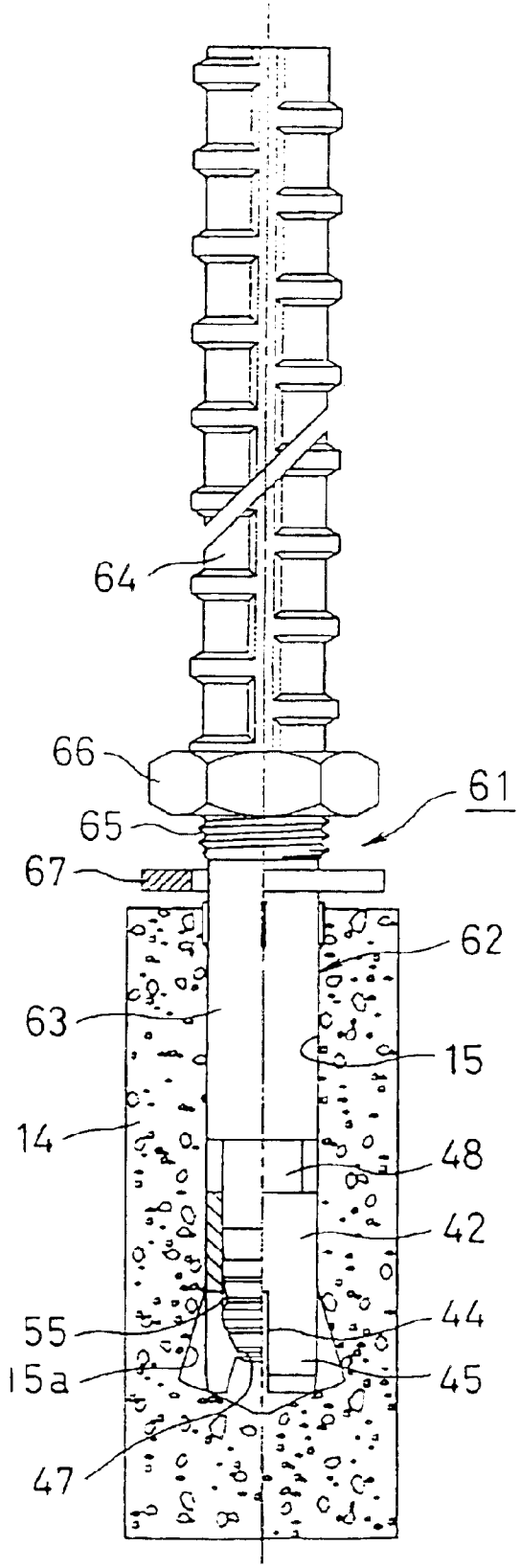
FIG. 20 is a view showing a preferred third embodiment of the fastener according to the present invention and a cross-sectional explanatory view showing a condition in the way of hammering.
Figure 21:
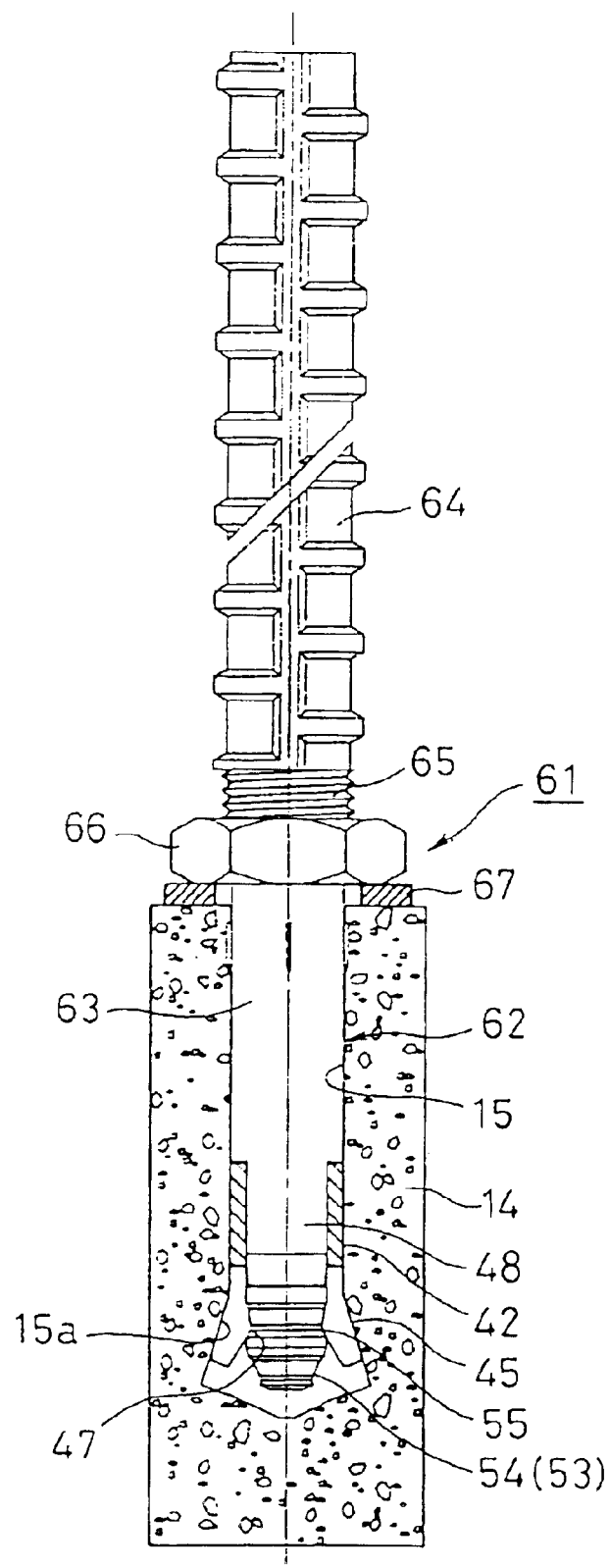
FIG. 21 is a cross-sectional explanatory view showing a completed condition of the hammering of the fastener shown in FIG. 20.
Figure 22:
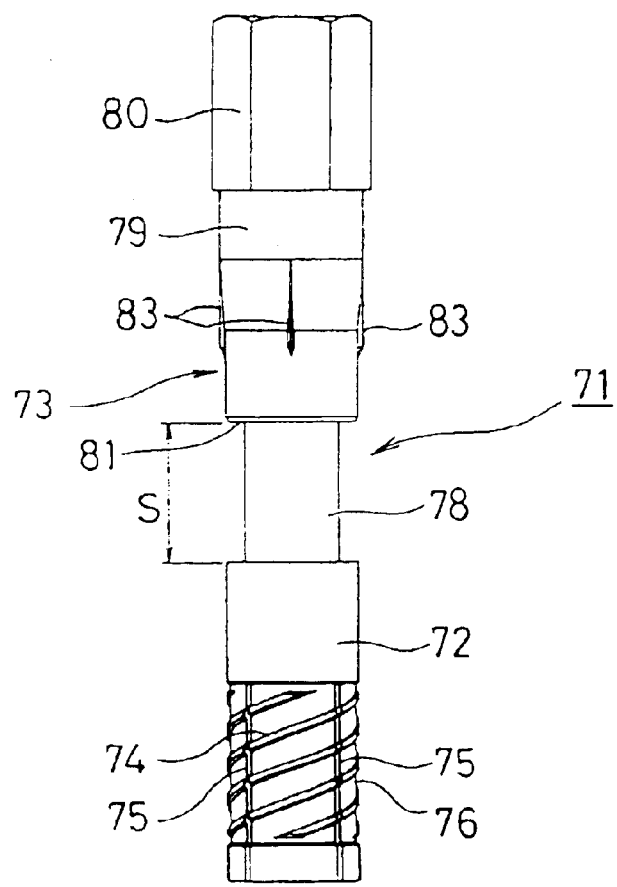
FIG. 22 is an explanatory view showing a preferred fourth embodiment of the fastener according to the present invention.
Figure 23:
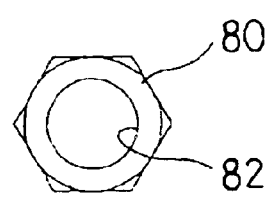
FIG. 23 is a plan explanatory view of FIG. 22.
Figure 24:
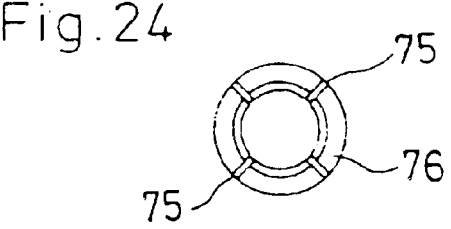
FIG. 24 is a bottom view of FIG. 22.
Figure 25:
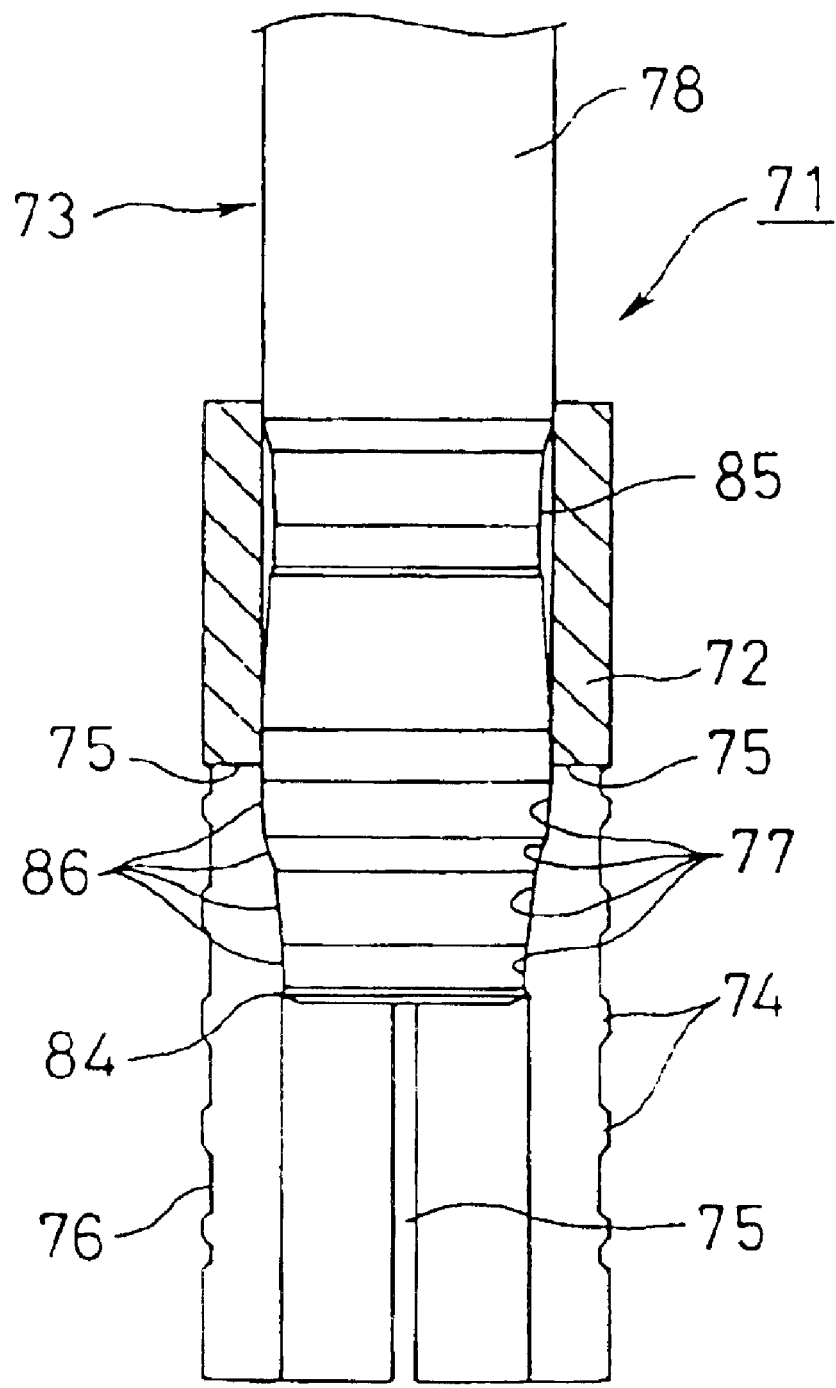
FIG. 25 is an enlarged cross-sectional view of an essential part of FIG. 22.

FIGS. 20 and 21 shows a preferred embodiment (third embodiment) of a fastener 61 according to the invention. and shows an example of a so-called metal installation anchor and of the sleeve hammering type. Herein, parts common with those of the second embodiment shown in FIGS. 15 to 18 are denoted by the same reference numerals.

As shown in FIGS. 20 and 21, a deformed reinforcing bar 64 for reinforce concrete is integrally formed with the large diameter shaft portion 63 of the anchor main body portion 62 instead of the female screw portion 51 shown in FIG. 16. A male screw portion 65 is formed at a boundary portion between the large diameter shaft portion 63 and the deformed reinforcing bar 64. A lock nut 66 is previously screwed to the male screw portion 65.

In the installation of the fastener 61 of the present embodiment, there are the procedure and the behavior from the operation that the anchor main body portion 62 is hammered by hammering strike under the condition that the sleeve 42 is seated on the bottom wall surface of the prepared hole 15 to the operation that the expansion portion 45 of the sleeve 43 is expanded as shown in FIG. 20, which procedure and behavior are the same as those of the second embodiment explained previously.

After the expansion of the expansion portion 45 is completed, the lock nut 66 previously screwed to the male screw portion 65 is tightened through the washer 67. With this operation, the fastener 61 is drawn from the prepared hole 15 by a predetermined quantity in the drawn-out direction, and finally the deformed reinforcement bar 64 of the fastener 61 is strongly fixed to the concrete structure 14 in the form of compressingly tightening the concrete structure 14 by the expansion portion 45 and the lock nut 66. The deformed reinforcement bar is, for example, used as a reinforcing bar for earthquake-resisting and reinforcing the concrete structure 14.

In this embodiment, since the fastener 61 is fixed while having an initial press tightening force due to the tightening of the lock nut 66, it performs a superior resisting force in both the expansion direction and the compression direction.

Figure 26:
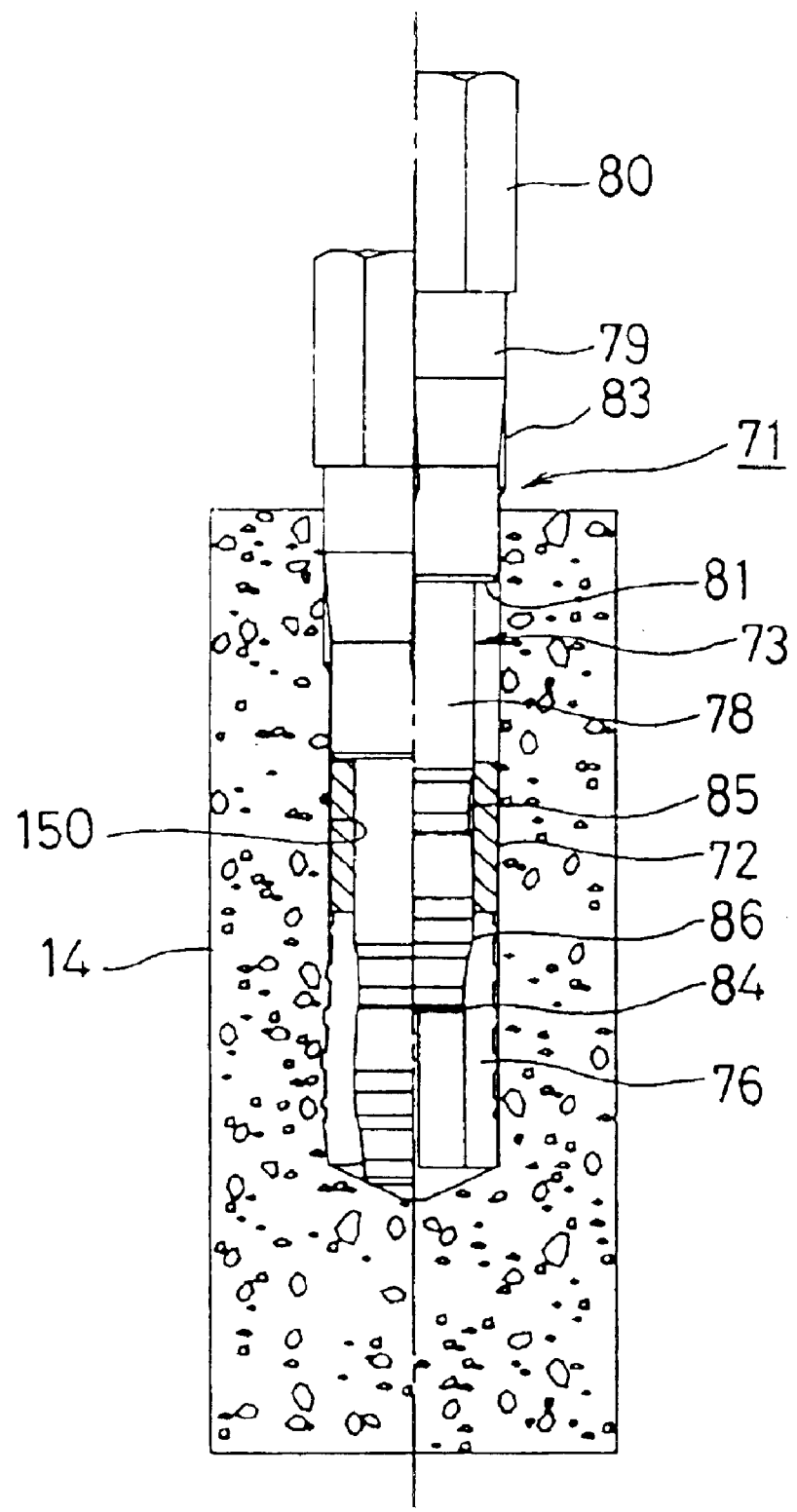
FIG. 26 is a half cross-sectional explanatory view showing a hammering condition of the fastener show in FIG. 22.
Figure 27:
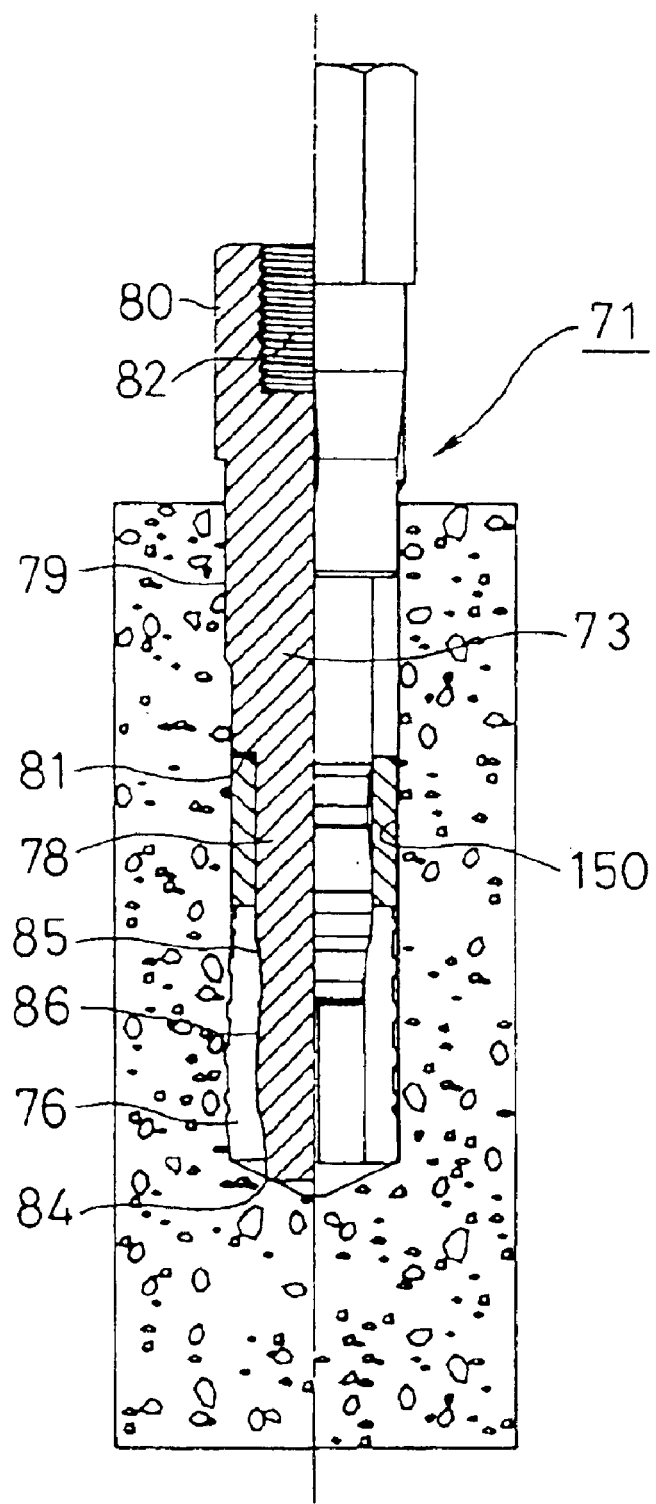
FIG. 27 is a half cross-sectional explanatory view showing a hammering condition of the fastener show in FIG. 22.

FIGS. 22 to 27 shows a preferred embodiment (fourth embodiment) of the fastener according to the invention, and shows an example of a so-called metal-type post-installation anchor and of the sleeve hammering type. More particularly, it shows an example employed in the installation of a hanging bolt. In FIGS. 26 and 27, the right half portion shows the non-expanded condition of the expansion portion, and the left half portion shows the expanded condition of the expansion portion.

As shown in FIGS. 22 to 25, a fastener 71 is constituted by a sleeve 72 of a hollow cylindrical shape and an anchor main body portion 73 of a generally stepped shaft shape, which is press-fitted into the sleeve 72.

The sleeve 72 is formed into a member having a short longitudinal dimension which is necessary and minimum as an expansion portion. A bead portion 74 of a spiral shape is formed at the outer peripheral surface of the sleeve 72. A tip end portion of the sleeve 72 is divided into a collet shape having four radially slotted grooves 75 having a longitudinal dimension which is two-third of the longitudinal dimension of the sleeve and is formed into an expansion portion 76 expandable in the radial direction. An inner peripheral surface of the expansion portion 76 is a simple cylindrical surface, and its inner diameter is set to be slightly smaller than a diameter of a general inner surface of the sleeve. Further, the inner peripheral surface of the expansion portion 76 and the general inner peripheral surface of the sleeve are smoothly continued through a step taper surface 77 constituted by taper surfaces of several steps.

On the other hand, the anchor main body portion 73 is constituted by a plug 78 directly press-fitted into the sleeve 72 as an expanding member, a large diameter shaft portion 79 integrally formed as if the plug 78 extends thereto, and a hexagonal head portion 89 integrally formed with large diameter shaft portion 79 while slightly increasing the diameter and as if the large diameter shaft portion 79 extends thereto. A stepped portion 81 corresponding to a difference between the diameters of the plug 78 and the large diameter shaft portion 79 is provided between the plug 78 and the large diameter shaft portion 79. The diameter of the large diameter shaft portion 79 is set to be generally similar to that of the sleeve 72, and a female screw portion 82 (refer to FIG. 27) is formed at the inner periphery of the head portion 80. Further, a plurality of ribs 83 are projectingly formed on the outer peripheral surface of the large diameter shaft portion 79. The ribs 83 perform a function of preventing the anchor main body portion 73 from being also followingly rotated when the bolt screwed to the female screw portion 82 is tightened as mentioned later.

The plug 78 integrally formed with the large diameter shaft portion 78 has a longitudinal dimension slightly longer than that of the sleeve 72. As enlargedly shown in FIG. 25, a tip end projection 84, which is slightly greater than the minimum inner diameter of the expansion portion 76 of the sleeve 72, is formed at the tip end portion of the plug 78. A neck portion 85 acting as a small diameter portion is formed at a center portion of the plug 78 in the longitudinal direction. Further, a step taper shaft portion 86 of a generally barrel shape, which is constituted by taper surfaces of several steps for smoothly expanding the expansion portion 76, is formed between the tip end projection 84 and the neck portion 85. The shape of the step taper shaft portion 86 is formed into a shape corresponding to the step taper surface 77 of the inner periphery of the expansion portion in the non-expanded condition.

By press-fitting the plug 78 into the sleeve 72 in order to combine the sleeve 72 and the plug 78 of the anchor main body portion 73 by means of the interference fit connection, in addition that the general inner peripheral surface of the sleeve 72 and a part of the step taper shaft portion 86 of the plug 78 are put in the interference fit condition, the step taper shaft portion 86 and the step taper surface 77 are put in the interference fit connection condition. Further, both of them are engaged by the convexoconcave engagement after getting over the tip end projection 84. Therefore, a detach preventing effect is generated due to the relative positioning. The fastener 71 in the pre-installation condition is arranged such that the sleeve 72 and the anchor main body portion 73 are not separated from each other. Simultaneously, a relative movement stroke S allowed between the sleeve 72 and the anchor main body portion 73 is set therebetween.

Accordingly, when the thus arranged fastener 71 is hammered to a prepared hole 150 of a simple cylinder type, the fastener 71 is inserted to the prepared hole 150 until the sleeve 72 reaches the bottom wall surface of the prepared hole 150. Thereafter, a hammer strike is applied to the hexagonal head portion 80 by means of a not-shown dedicated hammering bar, or a strike is directly applied to the head portion 80 by a plastic hammer. That is, the fastener 71 is hammered until the tip end of the plug 78 at the anchor main body section 73 is seated to the bottom wall surface of the prepared hole 150, and until the ribs 83 formed at the outer periphery of the large diameter portion of the anchor main body portion 73 are engaged.

During the hammering process by the hammer strike, the convexoconcave engagement between the step taper surface 77 of the inner periphery of the expansion portion 76 and the step taper shaft portion 86 of the plug 78 is disengaged, and the expansion portion 45 is expanded by the relative movement of the sleeve 72 and the anchor main body portion 73. Then, when the tip end of the plug 78 is seated to the bottom wall surface of the prepared hole 150, the tip end of the sleeve 42 is contacted with the stepped portion 81 of the anchor main body portion 73 so as not to be moved with each other. Therefore, the hammering of the fastener 71 is completed by this condition.

Thereafter, a not-shown hanging bolt is screwed and fixed to the female screw portion 82 of the anchor main body portion 73. In this case, since the ribs 83 formed at the outer periphery of the large diameter shaft portion 79 is engaged with the concrete structure 14, even when the hanging bolt is screwed, the anchor main body portion 73 is not rotated thereby. Further, by executing the tightening operation of the hanging bolt through engaging a spanner with the hexagonal head portion 80 according to necessity, the followed rotation of the anchor main body portion 73 is firmly prevented.

Herein, the striking sound is clearly varied when the tip end of the plug 78 is seat to the bottom wall surface of the prepared hole 150 and when the end surface of the sleeve 72 contacts with the stepped portion 81. Therefore, the confirmation as to the expansion of the expansion portion 76 of the sleeve 72 during the hammering process is executed by this change of the hammering sound, and the hammering is completed thereby.

Further, at the timing that the hammering is completed by the expansion of the expansion portion 76, the step taper shaft portion 86 having a barrel shape at the plug 78 as shown in FIGS. 26 and 27 is completely fitted to the inner periphery of the expanded expansion portion 76 and is substantially engaged again with each other into the convexoconcave engagement. The sleeve 72 expanded and the anchor main body portion 73 are relatively positioned, and therefore even when the force due to the earthquake or mechanical vibration is applied to the fastener, no loosening is generated therebetween.

Furthermore, by absolutely conditioning such that a so-called nominal length from the set position of the rib 83 to the head portion 80 is ensured long in some degree and that the ribs 83 are firmly engaged with the concrete structure 14, even if the depth of the prepared hole 150 is varied, that is, even if the head portion 80 of the anchor main body portion 80 is not completely seated to the concrete structure 14 and if the projection length of the head portion 80 from the concrete structure 14 is varied, there is not problem in mechanical strength (necessary strength). As a result, it becomes unnecessary to strictly control the depth dimension of the prepared hole 150.

FIG. 28 shows a modification of the fastener 71 shown in FIGS. 22 to 27. In this modification, a male screw portion 211 instead of the hexagonal head portion 80 of the anchor main body portion 73 is integrally formed with the anchor main body portion 73. The other structure is the same as that shown in FIGS. 22 to 27. A nut 213 is screwed to the male screw portion 211 through a washer 212. This modification performs the function as same as that of the embodiment shown in FIGS. 22 to 27.

FIGS. 29 to 33 shows further another modification of the fastener 71 shown in FIGS. 22 to 27. In this modification, the longitudinal dimension of the sleeve 72, that is, the length of the sleeve 72 with respect to the overall length of the fastener 71 installed is set to be longer than that of the previous modification. Further, the outer diameter of the sleeve 72 is positively varied in the longitudinal direction. Parts common to those shown in FIGS. 22 to 27 are denoted by same reference numerals.

Figure 29:
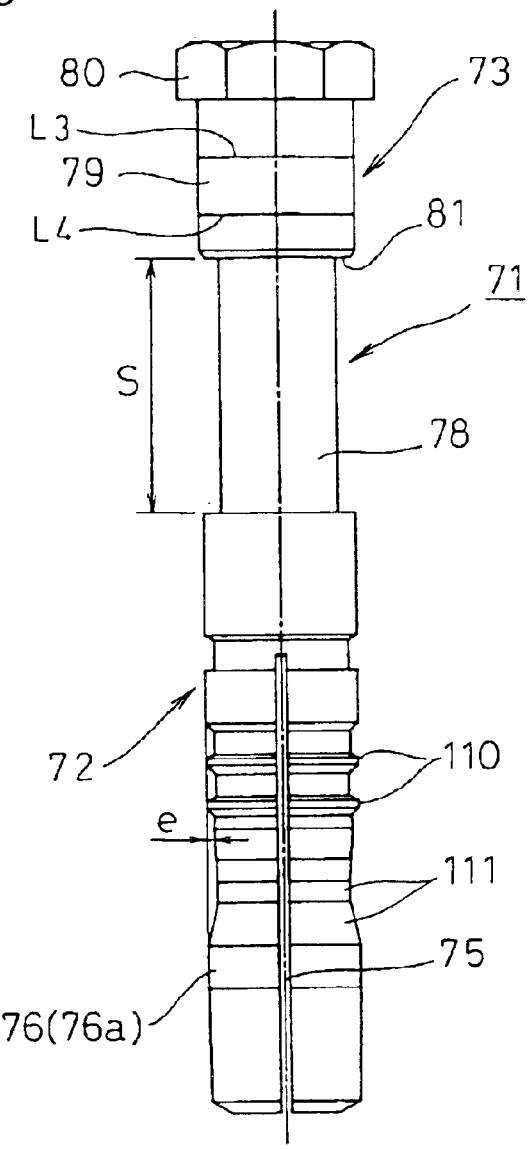
FIG. 29 is an explanatory view showing a further another modification of the fastener shown in FIG. 22.
Figure 30:
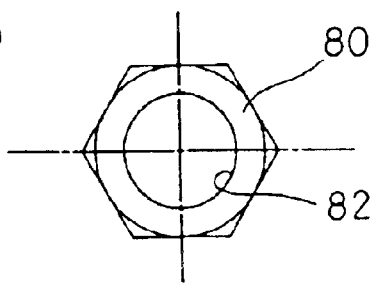
FIG. 30 is a plan explanatory view of FIG. 29.
Figure 31:
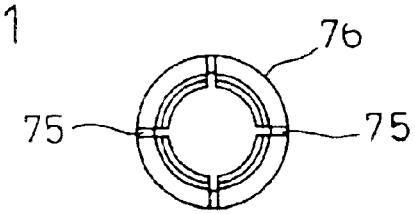
FIG. 31 is a bottom view of FIG. 29.
Figure 32:
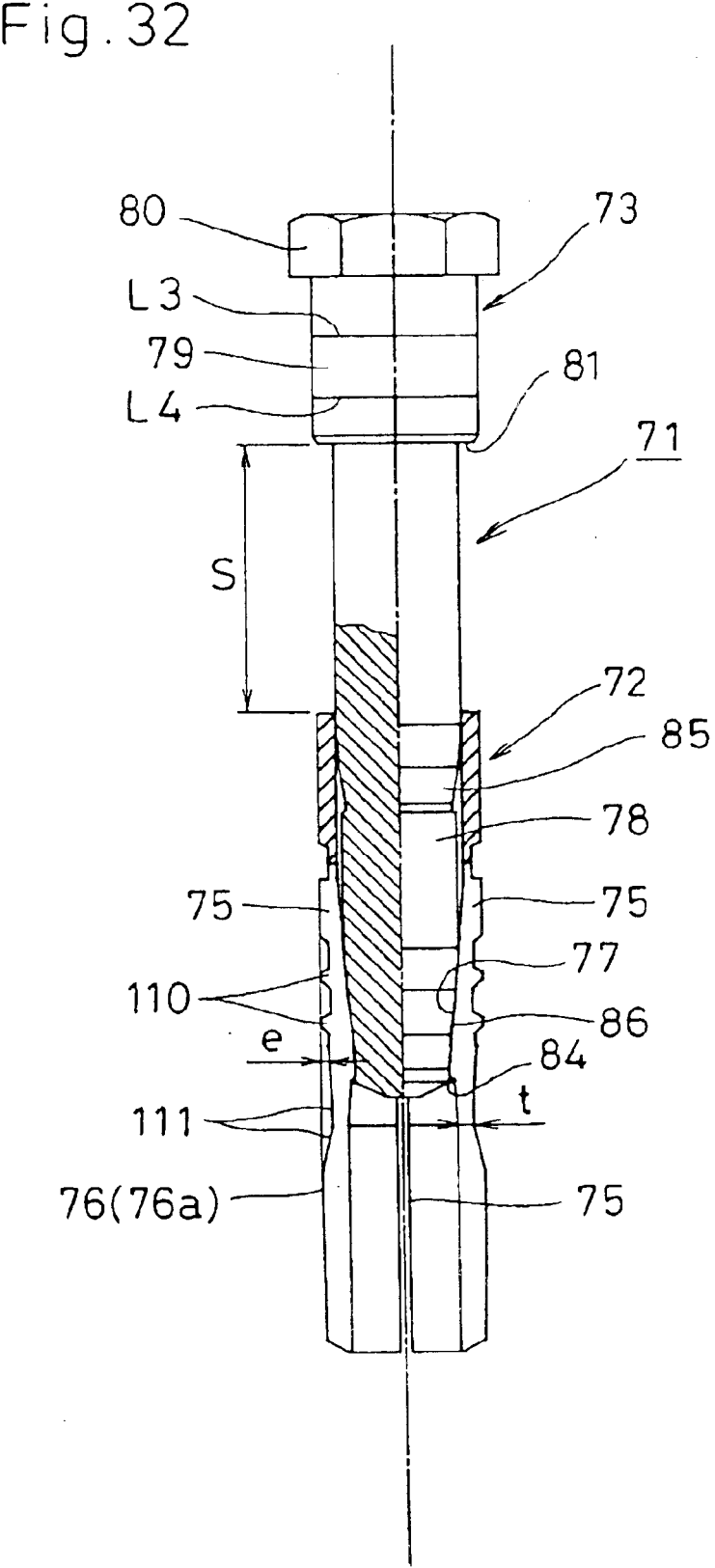
FIG. 32 is a cross-sectional explanatory view of the fastener shown in FIG. 29.

More specifically, as shown in FIGS. 29 and 32, the outer diameter dimension at the longitudinal center portion of the expansion portion 76 of the sleeve 72 is positively set to be slightly smaller than the upper and lower portion thereof by a predetermined quantity e so as to be formed into a stepped shaft shape as a whole. Two annular bead portions 110 are formed at the small diameter portion, and a part lower than the bead portion 110 is continued to the a general portion 76a of the expansion portion 75 through a taper shaft portion 111. With this arrangement, the thickness dimension t becomes smallest at a part corresponding to the taper shaft portion 11 of the expansion portion 76, as is clear from FIGS. 32 and 33.

Figure 33:
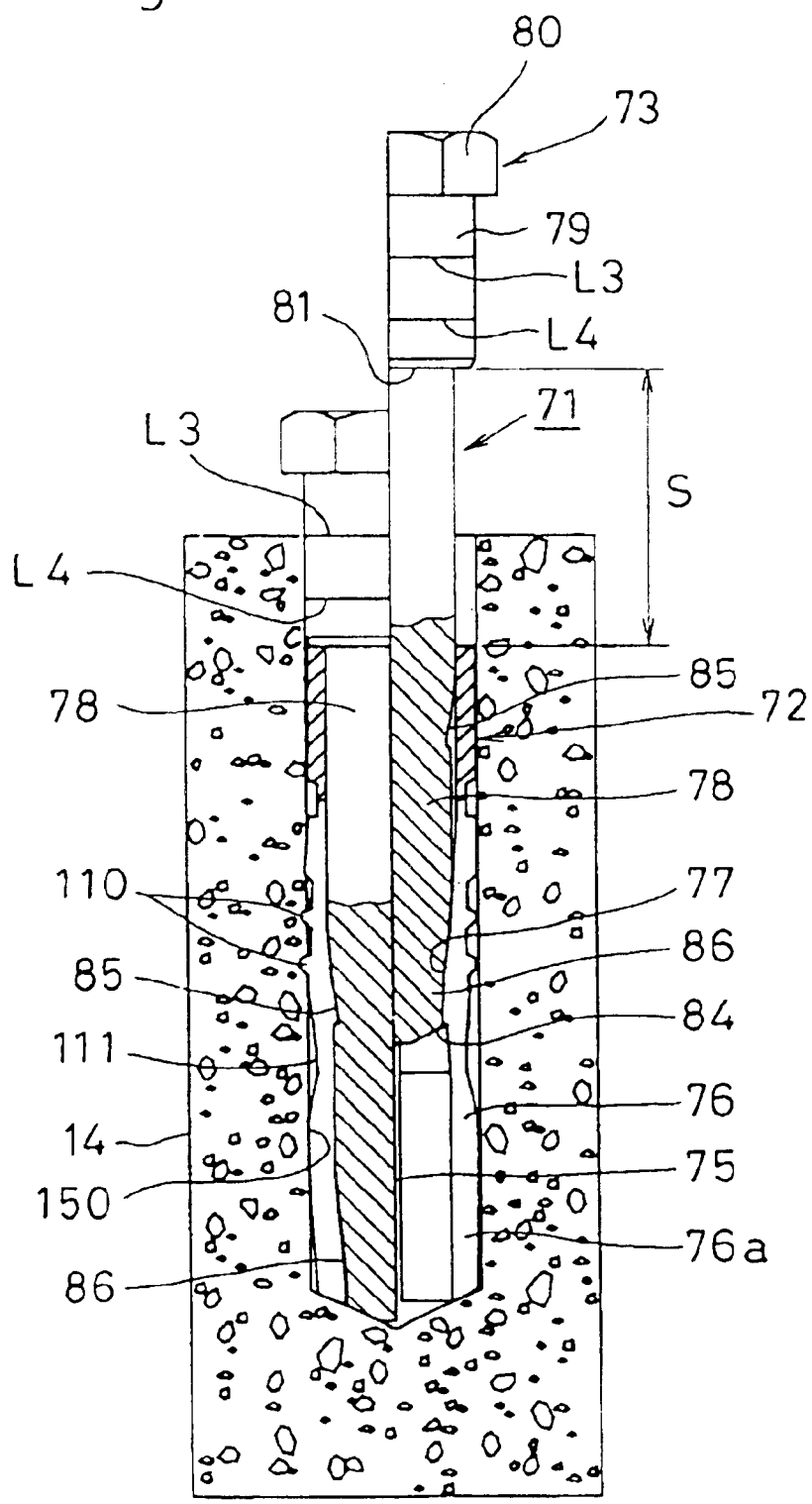
FIG. 33 is a half cross-sectional explanatory view showing the hammering condition of the fastener show in FIG. 29.

Accordingly, in this modification, during the process that the expansion portion 76 is expanded according to the relative movement between the sleeve 72 seated to the bottom wall surface of the prepared hole 150 and the anchor main body portion 73 as shown in FIG. 33, when the step taper shaft portion 86 of the plug 78 is detached from the step taper surface 77 of the expansion portion 76, a part corresponding to the bead portion 111 of the expansion portion 76 is particularly largely expanded to outside and is anchored to the hole wall surface of the prepared hole 150. Simultaneously, as a reaction force thereof, a force for diametrically decreasing a part lower than the part corresponding to the bead portion 111 of the expansion portion 76 is generated.

When the step taper shaft portion 86 of the plug 78 passes through a part corresponding to the taper shaft portion 111 lower than the bead portion 110, since the part corresponding to the taper shaft portion 111 is set to become smallest in the thickness t and in the outer diameter dimension, the part corresponding to the taper shaft portion 11 is plastically deformed to the outside by the passing-through of the step taper shaft portion 86 of the plug 78, but a clearance is kept with respect to the hole wall surface of the prepared hole 150.

Thereafter, the step taper shaft portion 86 of the plug 78 is pushed into the general portion 76a located lower than the part corresponding to the taper shaft portion 111 of the expansion portion 76 after passing through the part. The general portion 76a is expanded to the outside and is engaged with the hole wall surface of the prepared hole 150. Simultaneously, as a reaction force thereof, a force for diametrically decreasing a lowest end portion of the general portion 76a is generated.

When the tip end of the plug 78 is seated at the hole bottom surface of the prepared hole 150, the end surface of the plug 78 simultaneously contacts with the stepped portion 81 of the anchor main body portion 73, and therefore the relative movement therebetween is prevented. The hammering of the fastener 1 is completed thereby. In this condition, although the whole outer peripheral surface of the expansion portion 76 is not engaged with the hole wall surface as is different from the type shown in FIGS. 26 and 27, the upper and lower two portions sandwiching at least the taper shaft portion 111 are engaged with the hole wall surface with a large engagement force. Therefore, it is possible to obtain the anchor effect as same as or larger than that of the fastener shown in FIGS. 26 and 27. Further, the barrel-shaped step taper shaft portion 86 of the plug 78 is completely fitted to the inner periphery of the expanded expansion portion 76 and is substantially engaged again with each other into the convexoconcave engagement. The sleeve 72 expanded and the anchor main body portion 73 are relatively positioned, and therefore even when the force due to the earthquake or mechanical vibration is applied to the fastener, no loosening is generated therebetween.

In this modification, since there are not provided the ribs 83 shown in FIGS. 26 and 27, upper and lower scales L1 and L2 are previously marked on the large diameter shaft portion 79 of the anchor main body portion 73 instead of the provision of the ribs so that it is possible to control the hammered depth of the anchor main body portion 73 within the tolerance through the visual observation.

Figure 34:
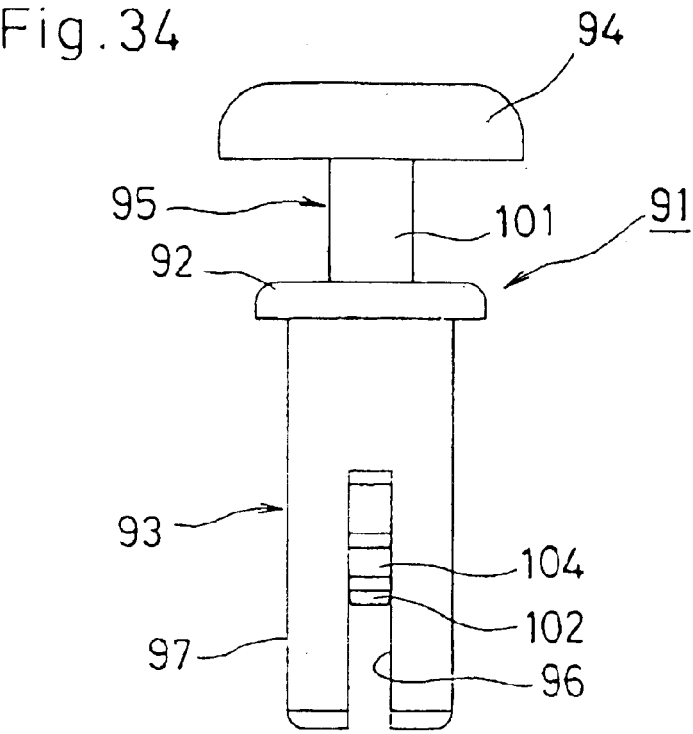
FIG. 34 is an explanatory view showing a preferred fifth embodiment of the fastener according to the present invention.
Figure 35:
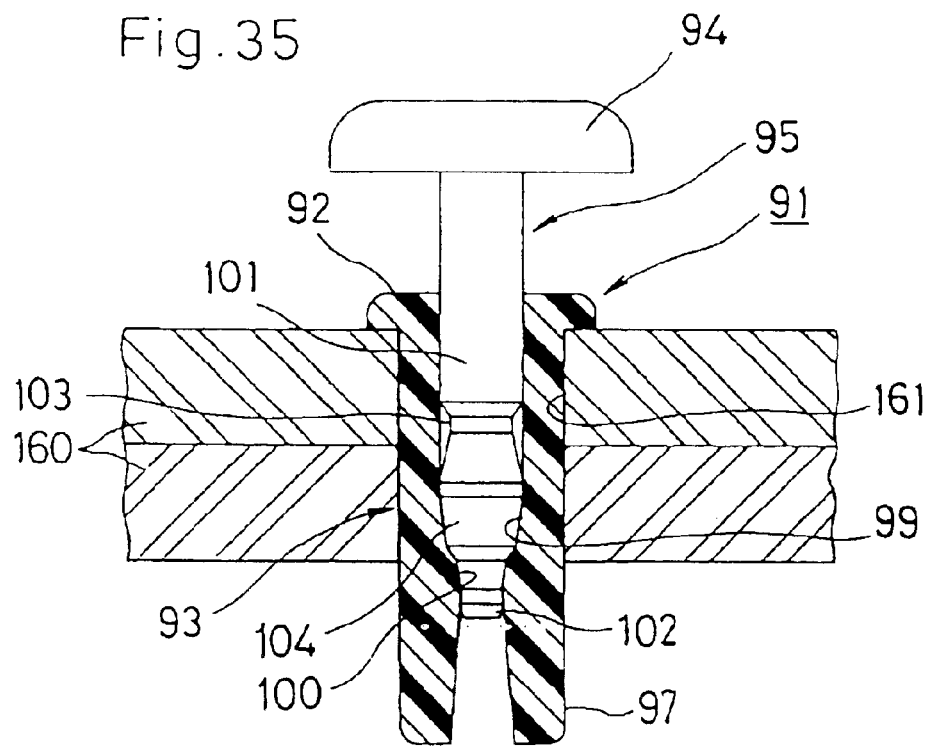
FIG. 35 is a cross-sectional explanatory view of the hammering condition of the fastener shown in FIG. 34.
Figure 36:
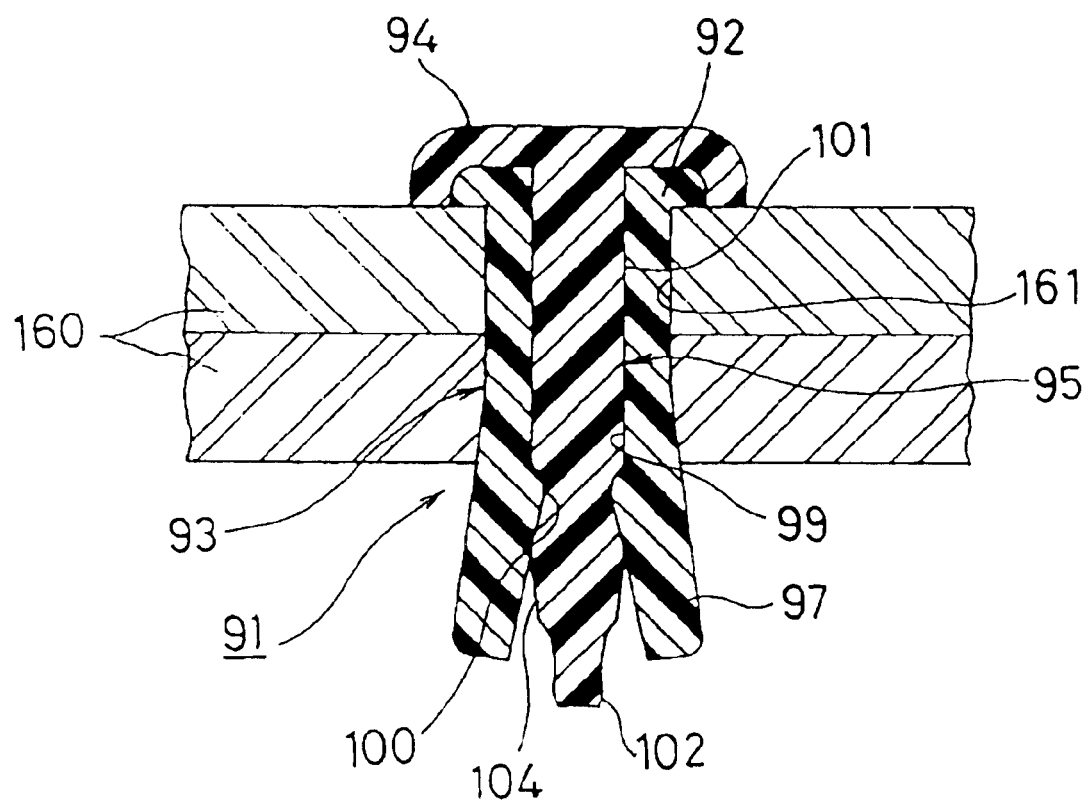
FIG. 36 is a cross-sectional explanatory view at the hammering completed time of the fastener shown in FIG. 34.
Figure 37:
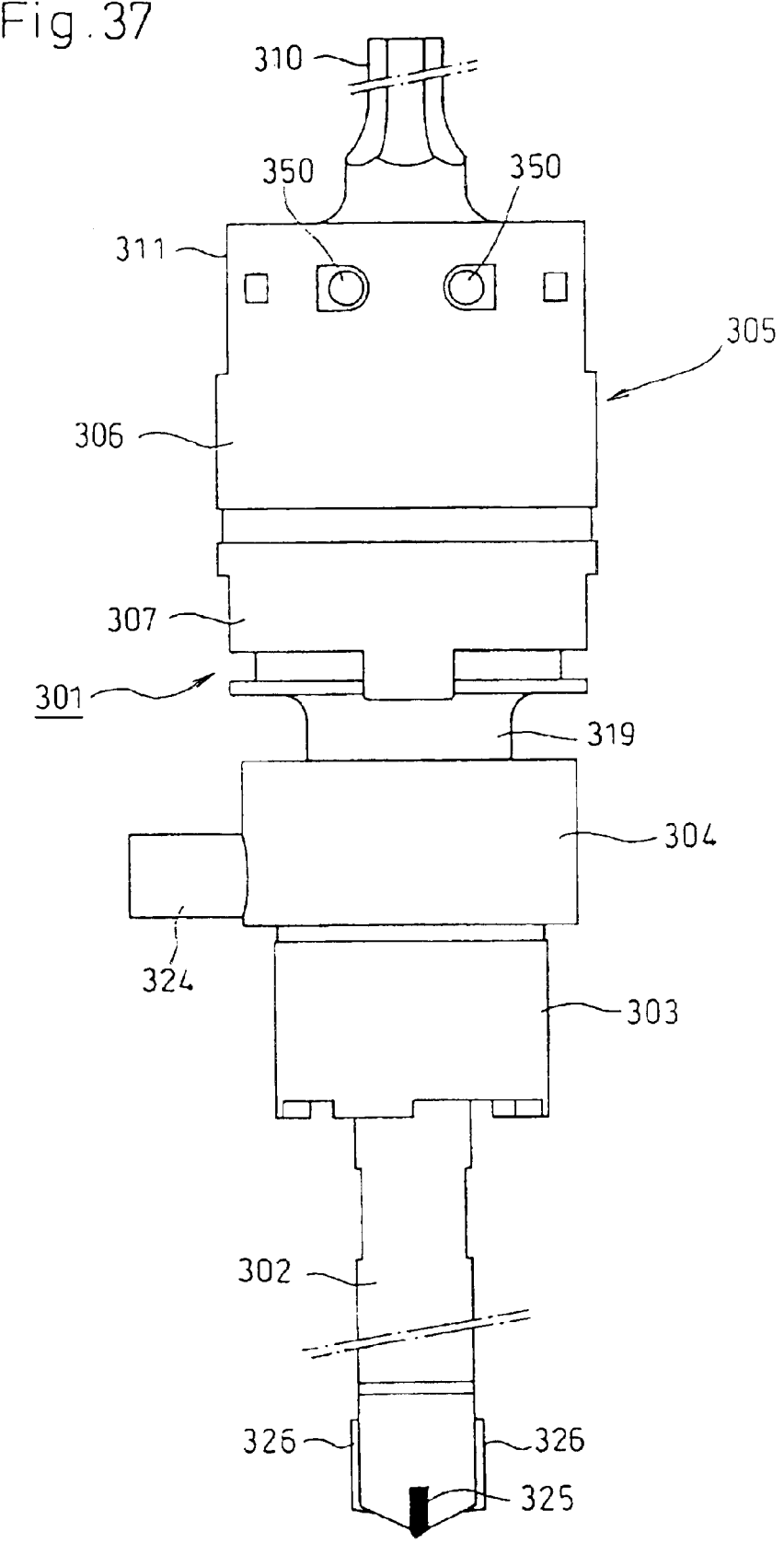
FIG. 37 is a front view showing a preferred first embodiment of a drill bit for working an undercut hole according to the present invention.
Figure 38:
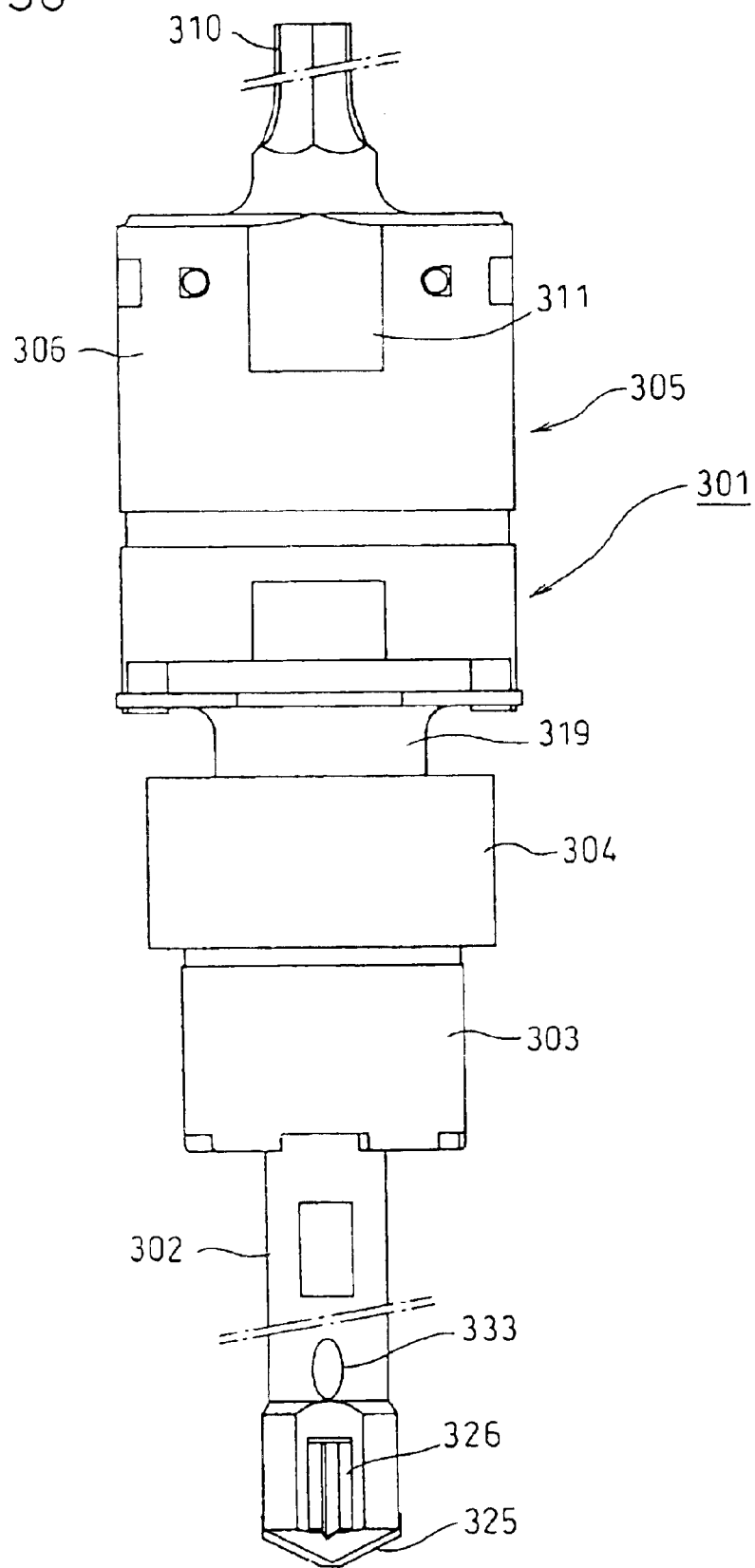
FIG. 38 is a right side view of FIG. 37.

FIGS. 34 to 36 shows a preferred embodiment (fifth embodiment) of the fastener according to the invention, and shows a so-called resin-type post-installation anchor or resin rivet.

As shown in FIGS. 34 and 35, a fastener 91 is constituted by a hollow cylindrical sleeve 93 having a circular head portion 92 and a stepped shaft shape or fungiform plug 95, which has a head portion 94 and is press-fitted into the sleeve 93. Both are made of thermoplastic resin such as nylon.

A tip end portion of the sleeve 93 is divided into a collet shape having four radially slotted grooves 75 having a longitudinal dimension which is a half of the longitudinal dimension of the sleeve and is formed into an expansion portion 97 expandable in the radial direction. In contrast that the general inner peripheral surface of the sleeve 93 is a simple cylindrical surface, an inner peripheral surface of the expansion portion 97 has a step taper surface 99 which is continuous to a general inner peripheral surface and is gradually decreased in diameter toward the tip end. Further, the inner peripheral surface is formed into a taper hole shape gradually and smoothly increased in diameter at a portion between a throat portion 100, which is a minimum diameter portion of the step taper surface 99, and the further tip end side.

On the other hand, the plug 95 is set so that a shaft portion 101 thereof is slightly greater in length than the sleeve 93. As shown in FIG. 36, the plug 95 is provided at its tip end portion with a tip end projection 102 which is slightly greater in diameter than a throat portion 100 of the minimum diameter in the expansion portion 97 of the sleeve 93, and is provided at the longitudinal center portion of the shaft portion 101 with a neck portion 103 of a small diameter portion. Further, there is provided a barrel-shaped step taper shaft portion 104 constituted by several taper surfaces for smoothly expanding the expansion portion 97 between the tip end projection 102 and the neck portion 103. The shape of the step taper shaft portion 104 corresponds to a shape of the step taper surface 99 of the inner periphery of the non-extended expansion portion 97. The shape of the neck portion 103 corresponds to a shape of the throat portion 100 at the inner periphery of the expansion portion 97 expanded as shown in FIG. 36.

By press-fitting the plug 95 into the sleeve 72 form the direction of the head portion 92 in order to combine the sleeve 93 and the plug 95 by the press-fit connection, in addition that the step taper shaft portion 104 and the general shaft portion in the shaft portion of the plug 95 are press-fitted to the general inner peripheral surface of the sleeve 93, the step taper shaft portion 104 is fitted with the step taper surface 99 of the sleeve 93, and simultaneously the tip end projection 102 of the plug 95 rides over and is engaged with the throat portion 100. As a result, the step taper shaft portion 104 and the tip end projection 102 of the plug 95 are engaged with the step taper surface 99 and the throat portion 100 of the sleeve 93 by the convexoconcave engagement. Therefore, a detaching preventing effect is generated due to the relative positioning. The fastener 91 in the pre-installation is arranged such that the sleeve 93 and the plug 95 are not separated from each other.

The installation procedure of the thus arranged resin fastener 91 is executed as follows, as shown in FIG. 35. The sleeve 93 of the fastener 91 is inserted to a prepared hole 161 previously formed at a structure 160 to be combined. Under a condition that the expansion portion 97 of the sleeve 93 projects from a back surface of the structure 160 by a predetermined quantity and that the head portion 92 of the sleeve 93 is seated on the structure 160, the plug 95 is hammered to the sleeve 93 until the tip end portion of the plug 95 projects from the end portion of the expansion portion of the sleeve 93, in order to overlap the head portion 92 of the sleeve 93 and the head portion 94 of the plug 95.

At this time, as shown in FIG. 36, the convexoconcave engagement between the step taper shaft portion 104 of the plug 95 and the step taper surface 99 of the sleeve 93 is disengaged by the hammering of the plug 95, and the expansion portion 97 is expanded into a skirt shape. Since the neck portion 103 of the plug 95 is engaged with the throat portion 97 at the inner periphery of the expansion portion 97 by the convexoconcave engagement and since the installation feeling due to this convexoconcave engagement is obtained, it is confirmed from the installation feeling that the expansion portion 97 is expanded by a predetermined quantity. Simultaneously, by the convexoconcave engagement between the sleeve 93 and the plug 95, both of them are relatively positioned. Therefore, a loosening preventing effect between the sleeve 93 and the plug 95 installed (expanded) is generated so as to sufficiently endure the vibrations and the like.

On the other hand, when it is desired to disengage the connection of the fastener which has been once installed, the plug 95 may be drawn out from the prepared hole 161 together with the sleeve 93 by hammering the plug 95 in the direction opposite to the installation direction to cancel the expansion of the expansion portion 97.

To enable the disassembly in opposite to the installation is the merit of the resin fastener 91 having a self recovery property of material. Particularly, if it is employed in fixing of a circuit board for electric products or installation of vehicular interiors, it is effective to execute recycle of separately recovering a specific parts in the disassembly of spent products.

FIGS. 37 to 55 are figures showing a preferred first embodiment of a drill bit for working an undercut hole in accordance with the present invention, and correspond to the invention. This embodiment shows an example of a drill bit preferable to form a prepared hole to a concrete structure in the installation of a post-installation anchor of the undercut type.

As shown in FIGS. 37 to 40, a drill bit 301 is generally constituted by a hollow cylindrical cutter body 302 having two kinds of cutter blades 325 and 326 as mentioned later, a stopper sleeve 303 and a dust collecting adapter 304 respectively installed to the cutter body 302, and a shank body 305 supporting the cutter body 302.

The shank body 305 is formed by a main body 306 of a cup-shape and a coupling sleeve 307 of a double cylindrical shape. By screwing a female screw portion 308 formed at the inner periphery of the main body 306 and a male screw portion 309 formed at the outer periphery of the coupling sleeve 307 with each other, the main body 306 and the coupling sleeve 307 are detachably connected (refer to FIG. 48). At an upper end surface of the main body 306, a hexagonal shank portion 310, which is directly supported to a rotating section of a not-shown drilling machine, is integrally formed. At an outer peripheral surface of the main body 306, a width across flat portion 311 is formed. Since the male screw portion 313 at the upper end of the cutter body 302 is screwed with respect to the male screw portion 312, the cutter body 302 is detachably supported to the shank body 305.

The stopper sleeve 303 and the dust collecting adapter 304 are adjacently disposed through a spacer 314, and these stopper sleeve 303 and dust correcting adapter 304 are restricted in position along the axial direction by the stepped portion 315 of the cutter body 302 and the spacer 315a. However, they are relatively movable in the axial direction within a restricted range and are relatively rotatable.

Figure 39:
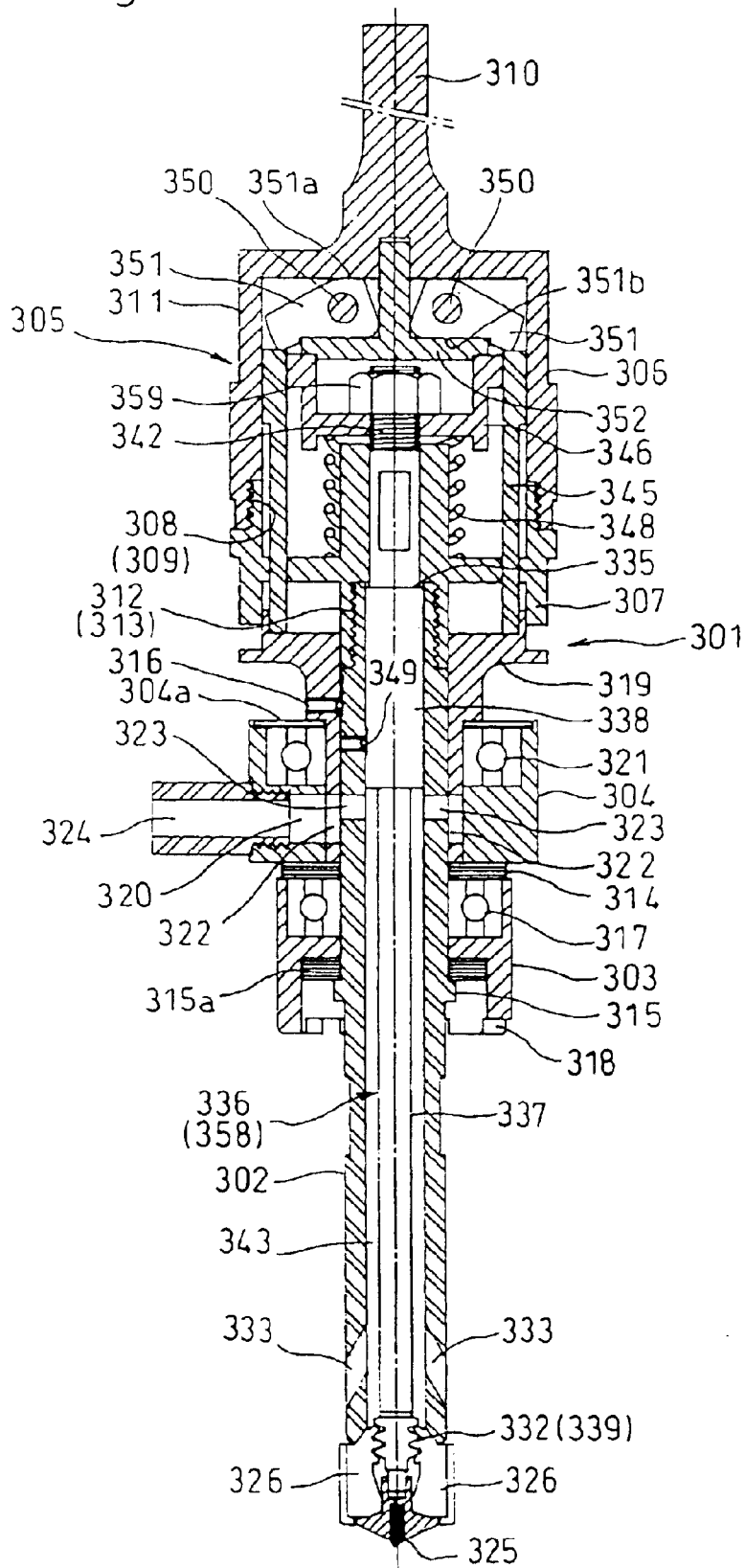
FIG. 39 is a whole cross-sectional view of FIG. 37.
Figure 40:
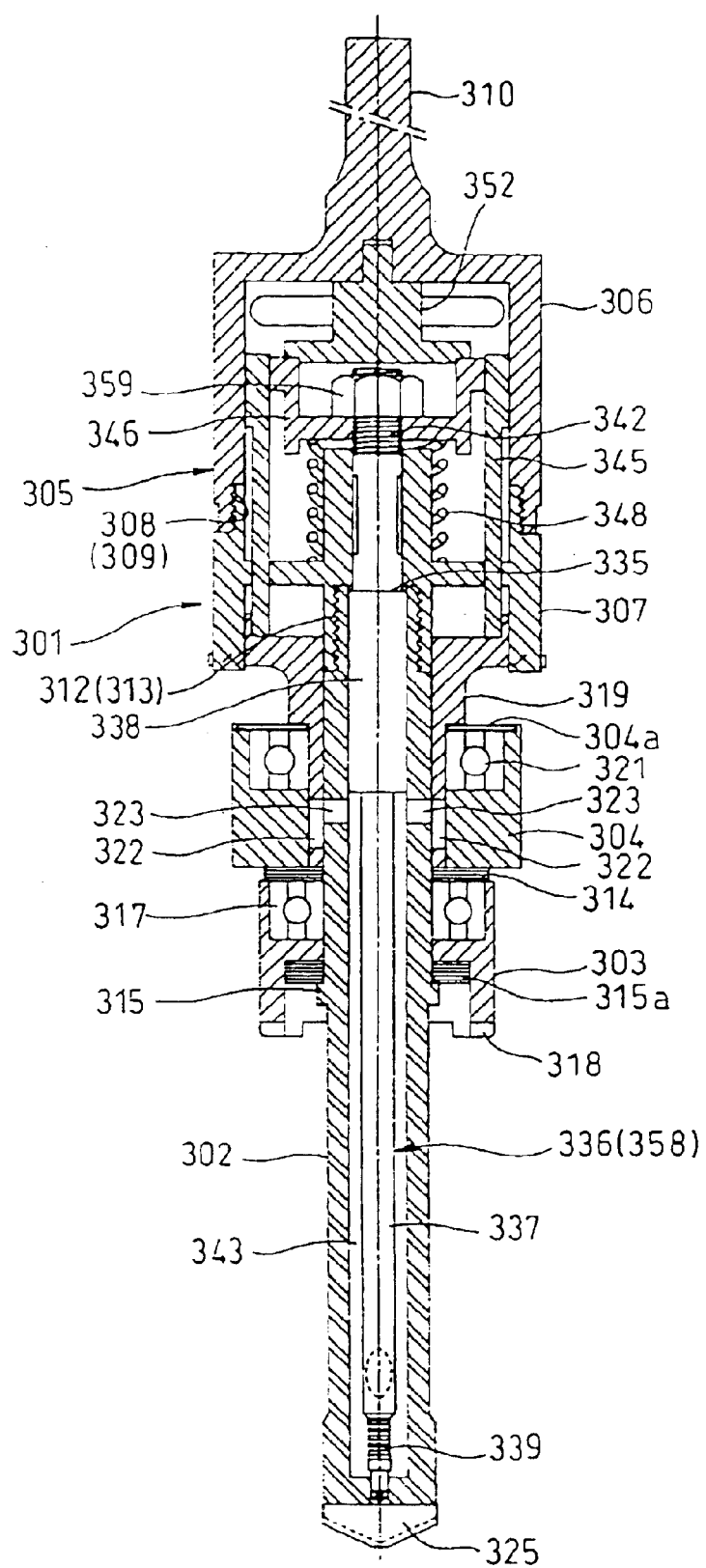
FIG. 40 is a whole cross-sectional view of FIG. 38.
Figure 41:
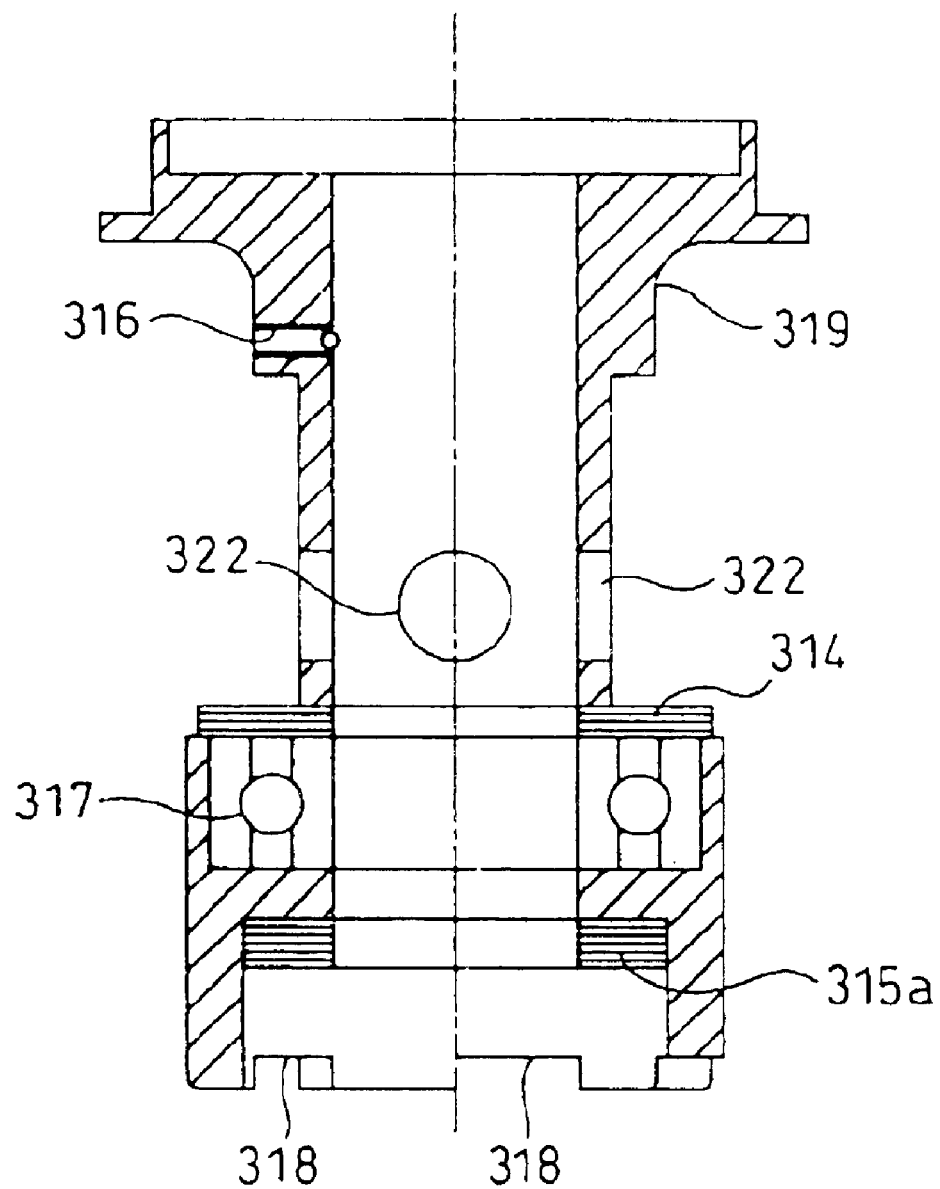
FIG. 41 is an explanatory view showing a relationship between a stopper sleeve and a collar shown in FIG. 39.

More specifically, as shown in FIGS. 39 and 40, the stopper sleeve 303 is supported to the cutter body 302 through a ball bearing 317 so as to be relatively movable to the cutter body 302 and to be relatively movable in the axial direction. A convexoconcave surface 318 of a rectangular saw-tooth shape is formed at the lower end portion thereof as shown in FIG. 41. When the stopper sleeve 303 is set at a lowering limit position limited by the stepped portion 315, a distance from the convexoconcave surface 318 to the tip end of the cutter body 302 is previously controlled according to the hole depth to be formed at a predetermined concrete structure (refer to FIG. 53). When the hole depth machined by the cutter body 302 as mentioned later becomes a predetermined depth, the convexoconcave surface 318 contacts with the concrete structure, and the stopper sleeve 303 together with the dust collecting adapter 304 is relatively and vertically moved with respect to the cutter body 302. The upper surface of the ball bearing 317 is covered with a cover 304a.

A single hole 320, to which a discharge port 324 is connected, is formed at the dust collecting adapter 304, and a collar 319 is installed to the dust collecting adapter 304. Simultaneously, the collar 319 is slidably installed to an inner cylinder portion of the coupling sleeve 307, and a ball bearing 321 is disposed between the collar 319 and the dust collecting adapter 304. With this arrangement, the collar 319 and the dust collecting adapter 304 are relatively rotated, and the dust collecting adapter 304 and the collar 319 are integrally slid when the dust collecting adapter 304 together with the stopper sleeve 303 relatively moves in the axial direction of the cutter body 302.

At a part of the collar 319 and the cutter body 302 located in the dust collecting adapter 304, that is, at a part corresponding to the hole 320, communication holes 322 and 323 are formed at four positions on the circumferential direction by 90° phase, and the communication holes 322 and 323 are communicated with each other. With this arrangement, even if the collar 319 and the cutter body 302 are relatively rotated with respect to the dust collecting adapter 304, the hole 320 is intermittently communicated with the dust collecting passage 343 of the cutter body 302 through the communication holes 322 and 323 and is connected to a not-shown dust collector through a not-shown flexible tube connected to the discharge port 324. A stopper screw 316 acts as a detent of the collar 319 and the cutter body 302.

Figure 42:
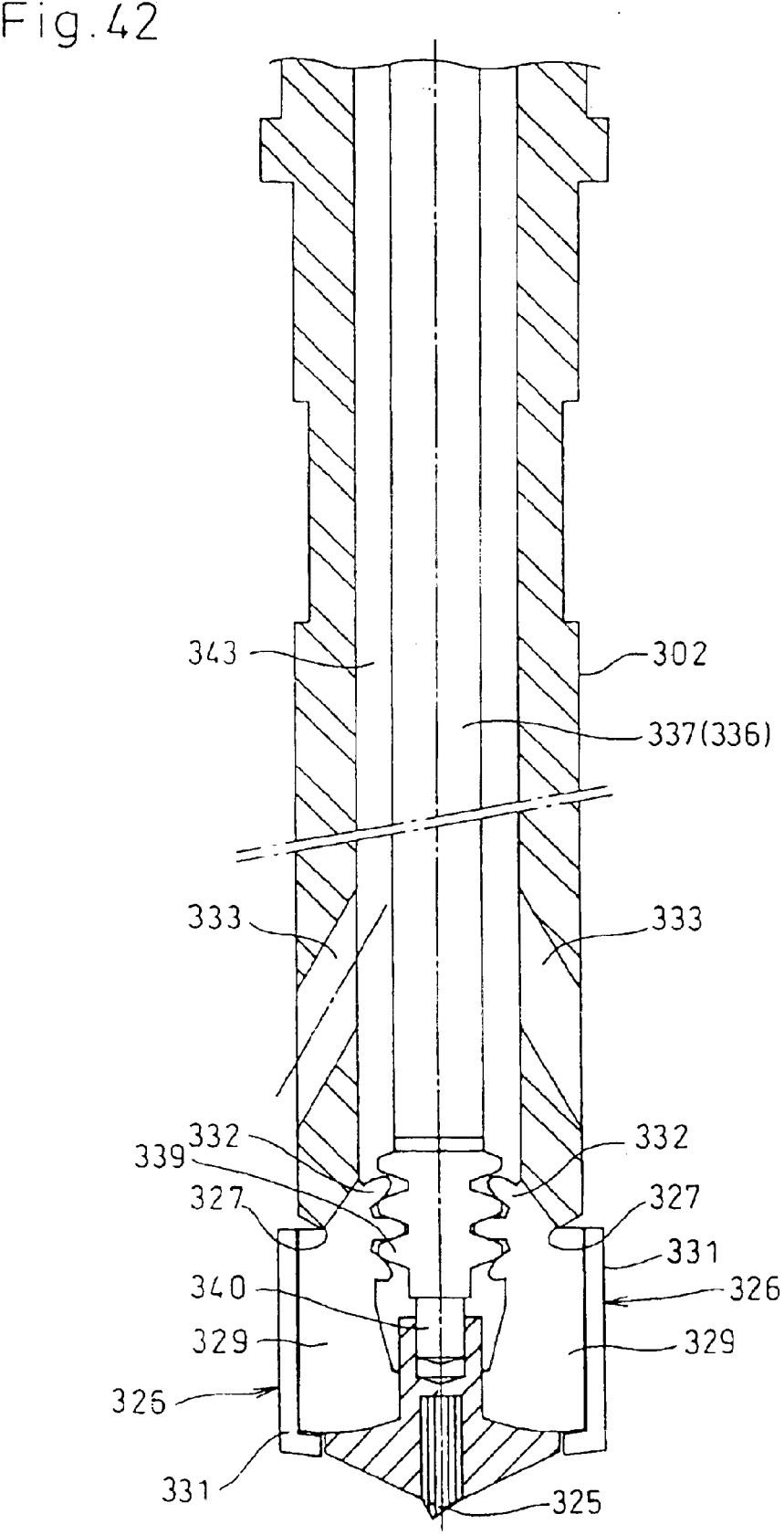
FIG. 42 is an enlarged view of an essential part of a cutter body tip end shown in FIG. 39.
Figure 43:
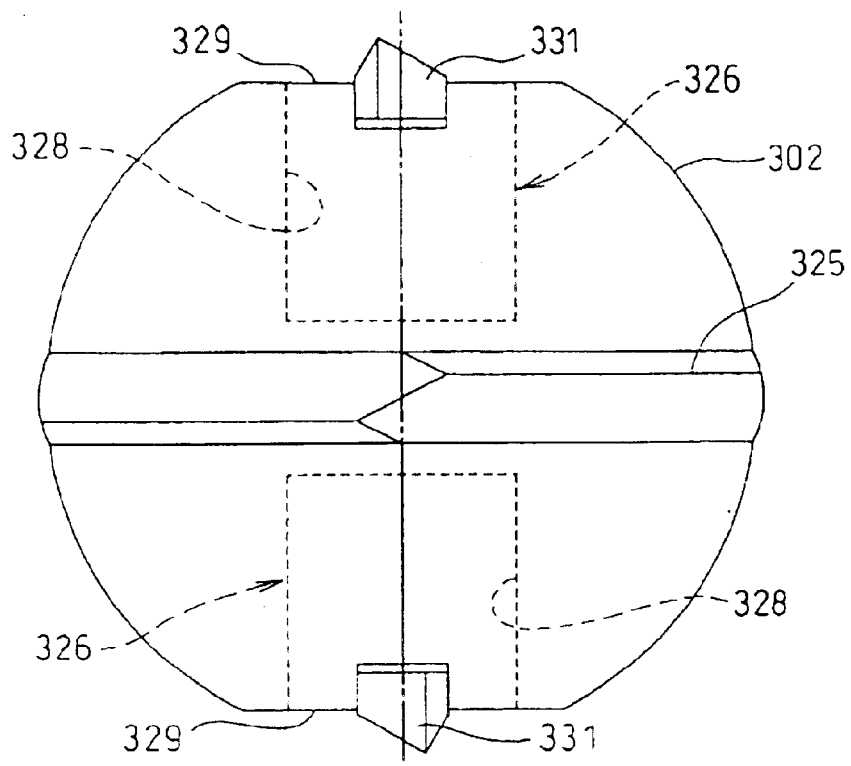
FIG. 43 is a bottom view of FIG. 38.
Figure 44:
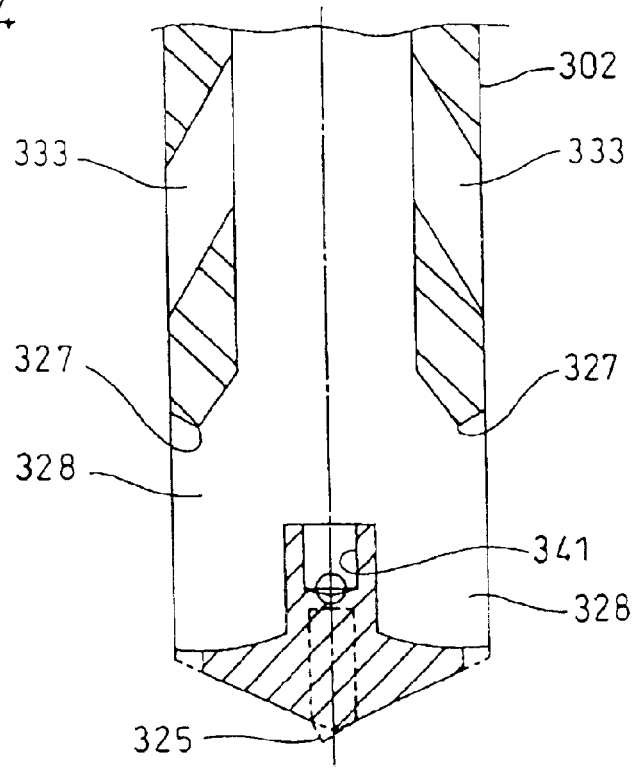
FIG. 44 is an explanatory view showing a detached condition of a cutter blades for undercut working from the cutter body of FIG. 42.
Figure 45:
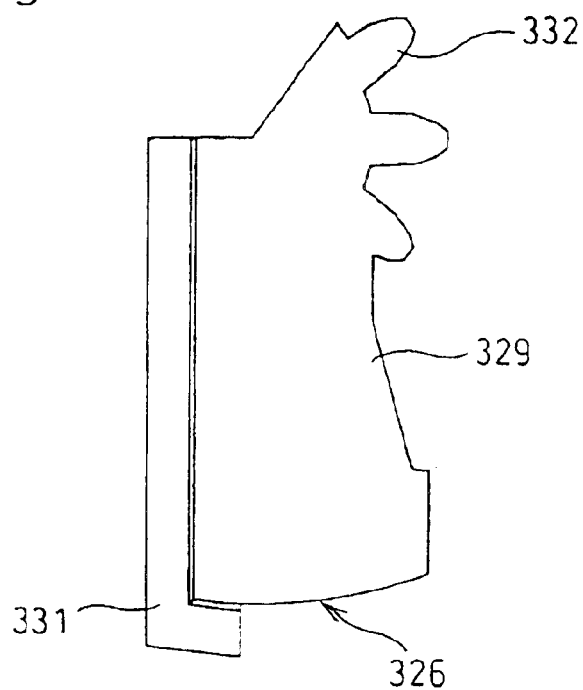
FIG. 45 is an explanatory view of a cutter blade for undercut working alone.
Figure 46:
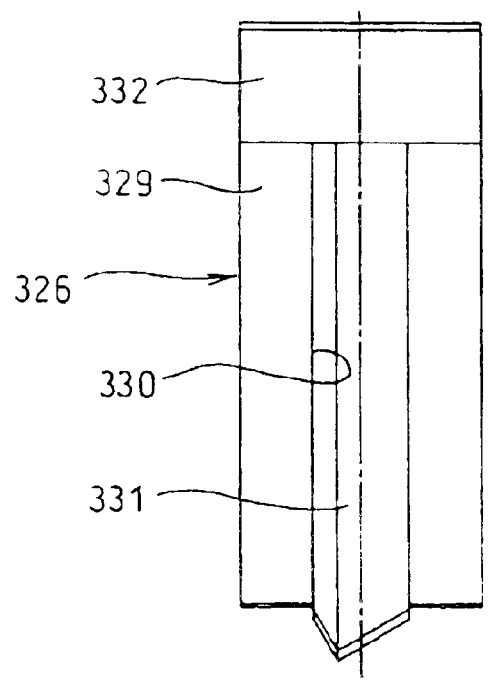
FIG. 46 is a left side view of FIG. 45.
Figure 47:
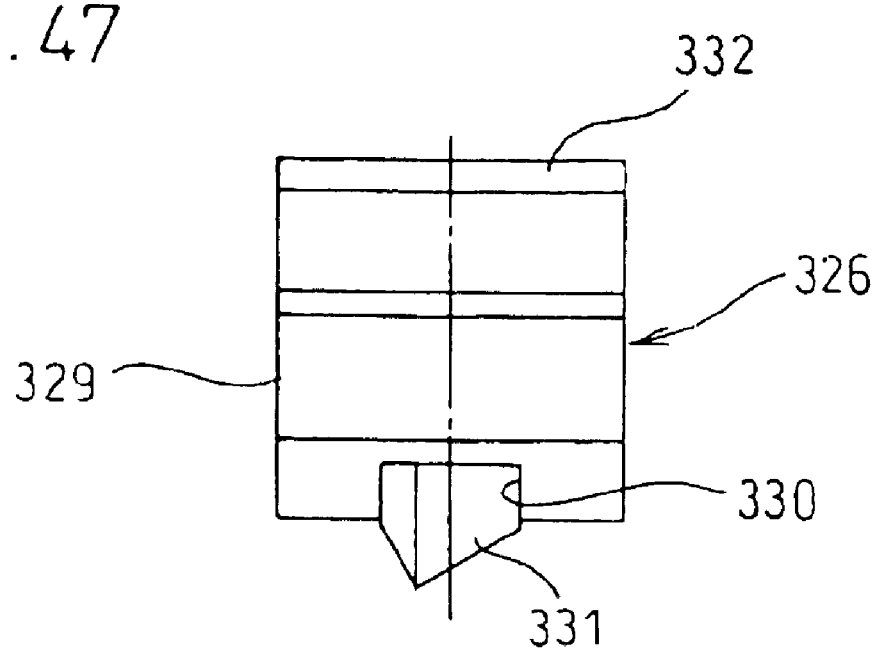
FIG. 47 is a plan view of FIG. 46.

A cutter blade 325 for working a straight hole is attached to the tip end of the cutter body 302 by means of brazing so as to traverse the cutter body 302 in the diametrical direction. Further, movable cutter brakes 326 for undercut working are installed to positions opposite with each other through the cutter blade 325 for working a straight hole, that is, to the positions offset by 90° phase with respect to the cutter blade 325 for working the straight hole. That is, as shown in FIGS. 42 to 44, rectangular blade receiving grooves 328 having fulcrum top portions 327 of a relative sharp shape are openedly formed at the outer peripheral surface of the lower end portion of the cutter body 302 so as to penetrate the inner peripheral surface of the cutter body 302. The cutter blades 326 for working an undercut are installed to the fulcrum top portions 327 acting as a swing center and are swingably disposed in these blade receiving groove 328 so as to have a relationship of the bilateral symmetry. Each of the cutter blades 326 is, as shown in FIGS. 45 to 47, constituted by forming a tip receiving groove 330 to a tip holder 329 of a prism shape and by fixing a tip 331 made of hard metal to the receiving groove 330 by means of brazing. A sector gear 332 is integrally formed at an inner surface of each tip holder 329. Further, the tip 331 has cutting blades at portions corresponding to the tip end surface and the outer peripheral surface of the cutter body 302, respectively.

The sector gear 332 is meshed with a rack portion 339 of a control rod 336 installed in the cutter body 302 as mentioned later. The cutter blades 326 for working an undercut swings between a housing position P1 and a diameter increasing position P2 shown in FIG. 53 according to the slide displacement of the control rod 336. When each cutter blade 326 is positioned at the housing position P1, the cutting blade at the outer peripheral surface of each tip 331 is set so as to be located on a general cylindrical surface of the cuter body 302.

Dust collecting ports 333 are obliquely opened at the outer peripheral surface of the tip end portion of the cutter body 302 while penetrating inner and outer peripheries of the cutter body 302. The dust collecting ports 333 are communicated with a dust collecting passage as mentioned later.

The control rod 336 is, as shown in FIGS. 39 and 40, installed in the cutter body 302 so as to be connected to a sholder portion 335 steppedly formed at the upper end of the cutter body 302. The control rod 336 is formed into a stepped shaft shape by a small diameter shaft portion 337 and a large diameter shaft portion 338 on the small diameter shaft portion 337. As shown in FIG. 42, the rack portion 339 is provided at the tip end of the small diameter shaft portion 337 except for a width across flat portion. Further, a guide shaft portion 340 having an extremely small diameter is provided at the tip end of the rack portion 339. The rack portion 339 is meshed with the sector gear 332 of each cutter blade 326 for undercut work, and the guide shaft portion 340 is slidably engaged to a guide hole 341 at the tip end of the cutter body 302. On the other hand, a male screw portion 342 is provided at the upper end of the large diameter shaft portion 338. The male screw portion 342 projects to a position upper than the coupling sleeve 307. The male screw portion 342 is screwed with a female screw portion 346a of an intermediate sleeve 346 mentioned later and is pressingly fixed by means of a lock nut 359.

A dust collecting passage 343 is provided between the small diameter shaft portion 337 of the control rod 336 and the cutter body 302, and the dust collecting passage 343 is communicated with the dust collecting ports 333 mentioned above, and is able to be communicated with a hole 320 of the dust collecting adapter 304 through communication passages 322 and 323 provided in the cutter body 302.

Figure 48:
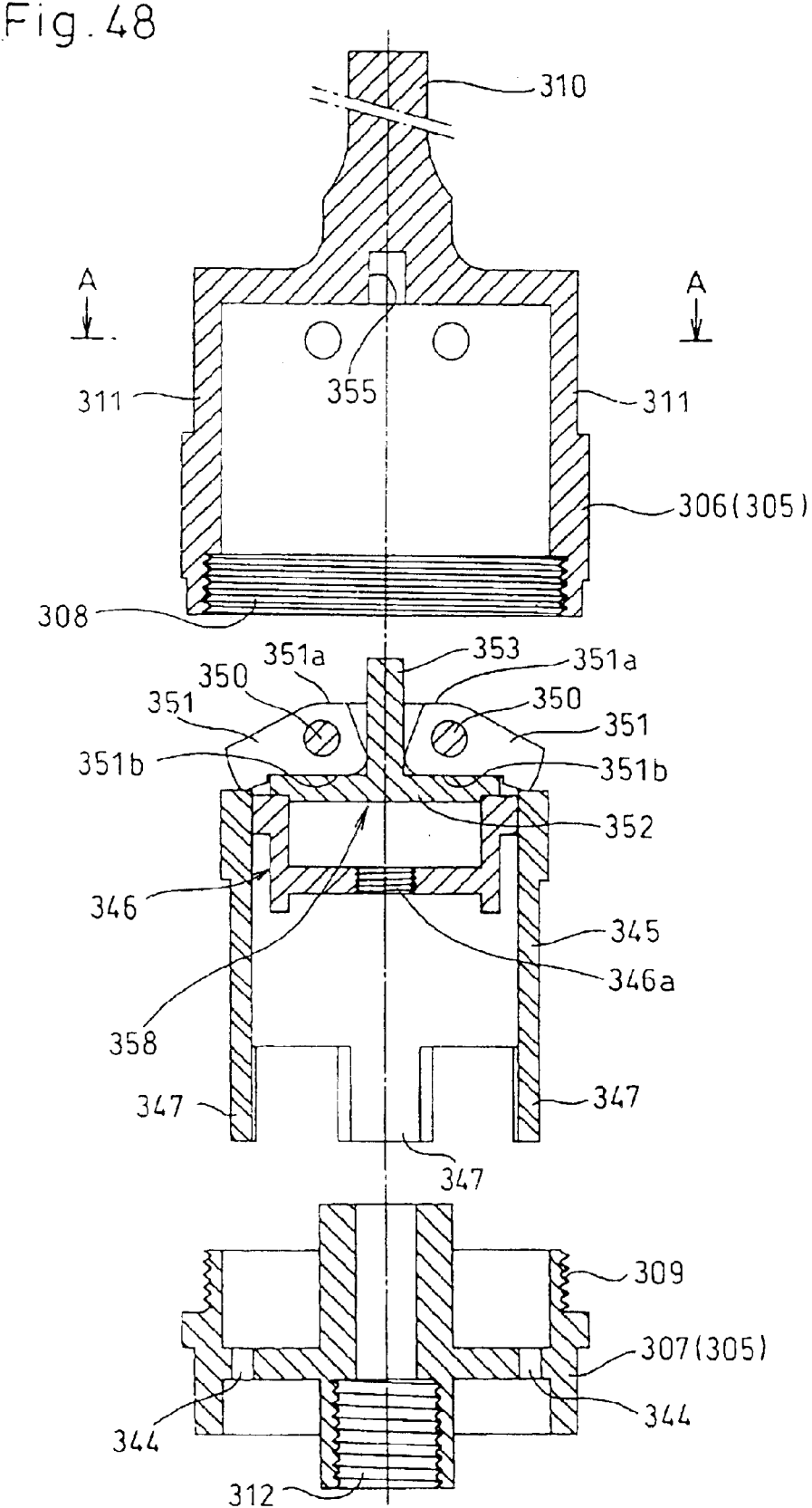
FIG. 48 is an exploded view of the shank body shown in FIG. 39.
Figure 49:
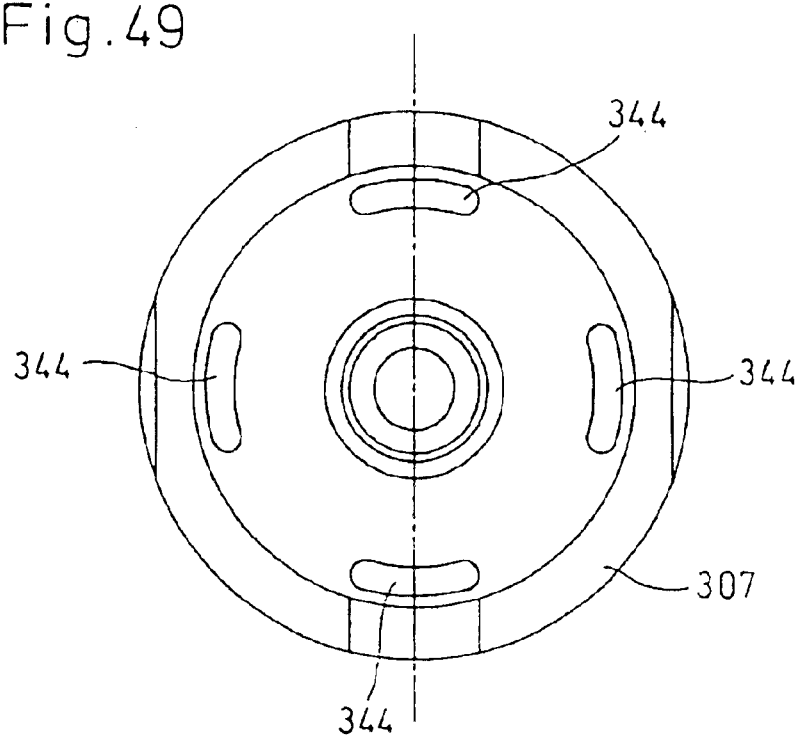
FIG. 49 is a plan view of the coupling sleeve shown in FIG. 48.

A plurality of guile holes 334 of an ellipse shape are provided at the bottom wall portion of the coupling sleeve 307 forming the shank body 305 shown in FIGS. 39 and 40, at equal intervals as shown in FIGS. 48 and 49. A cam follower sleeve 345 engaged with the guide holes 344 is slidably installed in the main body 306, and a cup-shaped intermediate sleeve 346 is slidably installed in the cam follower sleeve 345.

More specifically, a plurality of projection portions 347 are formed at the lower end of the cam follower sleeve 345 into a comb shape. By the engagement of these projection portions 347 with the guide holes 344 of the coupling sleeve 307, the relative rotation therebetween is prevented and the relative movement between the shank body 305 and the cam follower sleeve 345 in the axial direction is allowed. Further, the upper end surface of the cam follower sleeve 345 is pressingly contacted with an end portion of cam levers 351 acting as a cam member. A compression coil spring 348 is installed between the intermediate sleeve 346 and the coupling sleeve 307, and always biases the cutter body 302 and the control rod 336 upward. Simultaneously, the cutter body 302 and the control rod 336 are restricted in rotation therebetween by a set screw 349.

Figure 50:
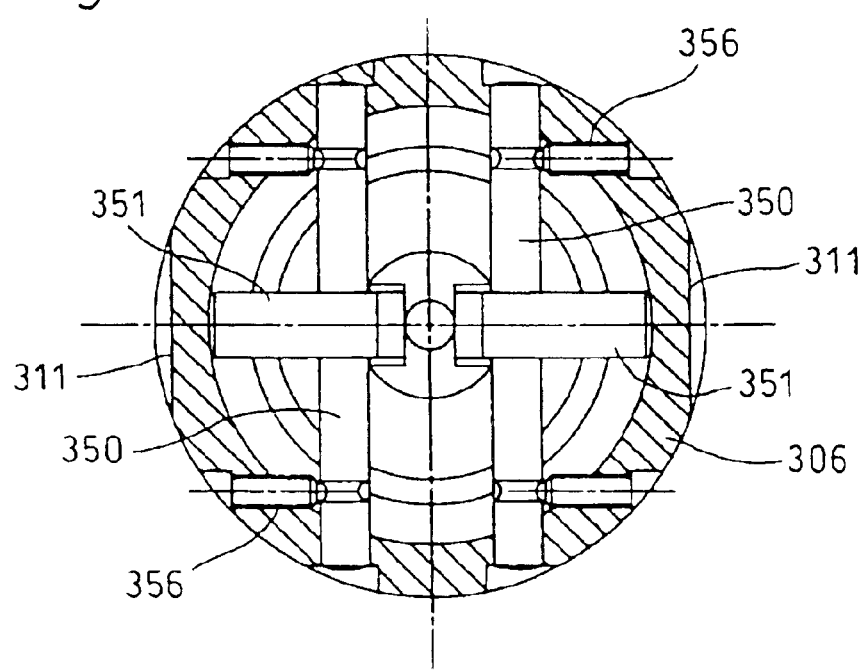
FIG. 50 is a cross-sectional explanatory view at a cross-section corresponding to the line A—A of FIG. 48.
Figure 51:
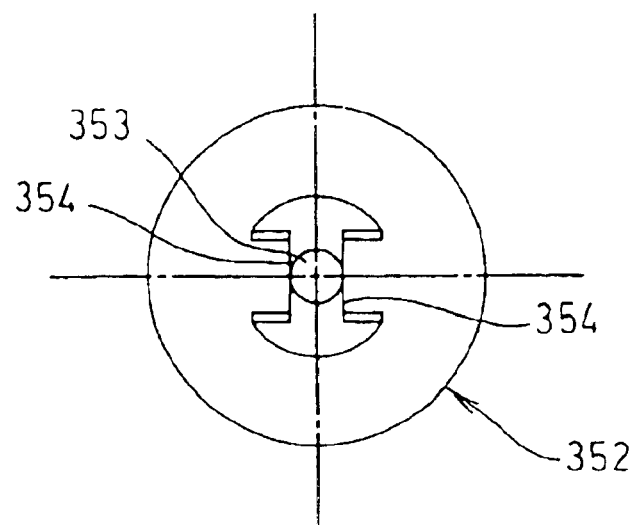
FIG. 51 is a plan view of the cam follower plate shown in FIG. 48.
Figure 52:
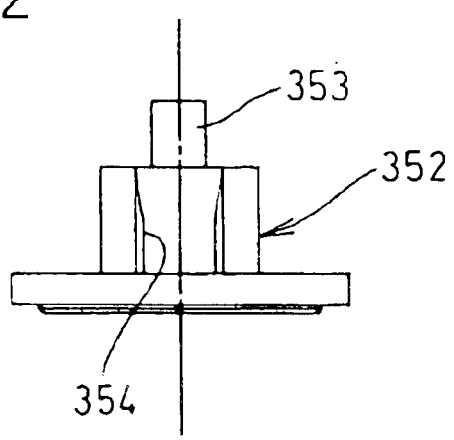
FIG. 52 is a right side view of FIG. 51.

Parallel two shafts 350 are traversed on the inner lower surface of the main body 306 forming the coupling sleeve 307 and the shank body 305, as shown in FIGS. 48 and 50 in addition to FIG. 39. Each of cam levers 351 is swingably installed to each of shafts 350. A cam follower plate 352 used in common with both cam levers 351 is disposed under the cam levers 351 so as to be engaged with the upper surface of the intermediate plate 346. Cam guide grooves 354 are formed at a root portion of a shaft portion 353 of the cam follower plate 352, as shown in FIGS. 51 and 52. The shaft portion 353 is engaged with a center hole 355 of the main body 306 and receives each cam lever 351 in each cam guide groove 354 so as to be position each cam lever 351 in the axial direction with respect to the shaft 350.

Parallel stopper surfaces 351a and 351b are formed at upper and lower surface of each cam lever 351, and these stopper surfaces 351a and 351b are always in contact with an inner and lower surface of the main body 306 and the cam follower plate 352, so that the condition thereof is maintained by themselves. Accordingly, the cam follower sleeve 345, the cam lever 351, the cam follower plate 352, the intermediate sleeve 346 and the control rod 336 which are the plurality of elements received in the shank body 305, constitute a cutter blade control means 358 for increasing a diameter of the cutter blades for undercut work at the cutter body 302 according to the relative displacement in the axial direction between the cutter body 302 and the stopper sleeve 303 as mentioned later.

Next, there will be explained the procedure in the case that a hole working is executed by using the drill bit 301 arranged hereinabove, with reference to FIGS. 53 to 55.

Figure 53:
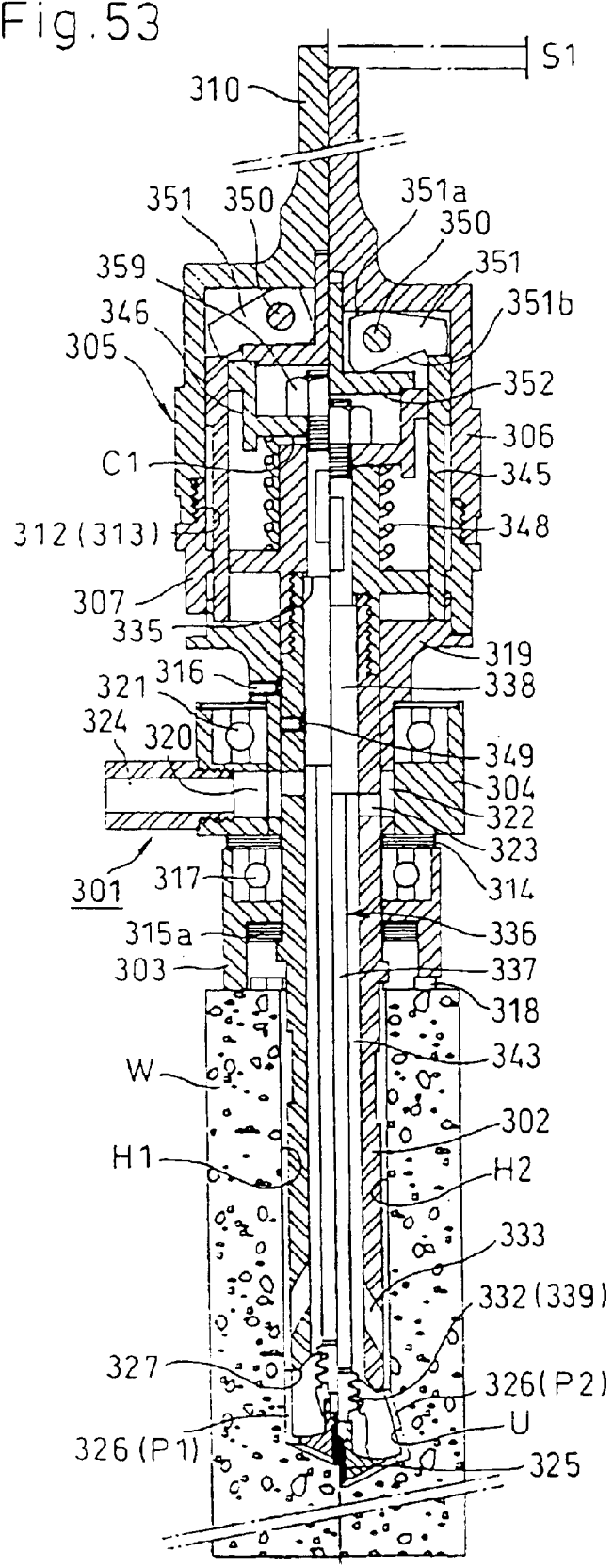
FIG. 53 is an operation explanatory view during the drilling by the drill bit shown in FIGS. 39 and 40.
Figure 54:
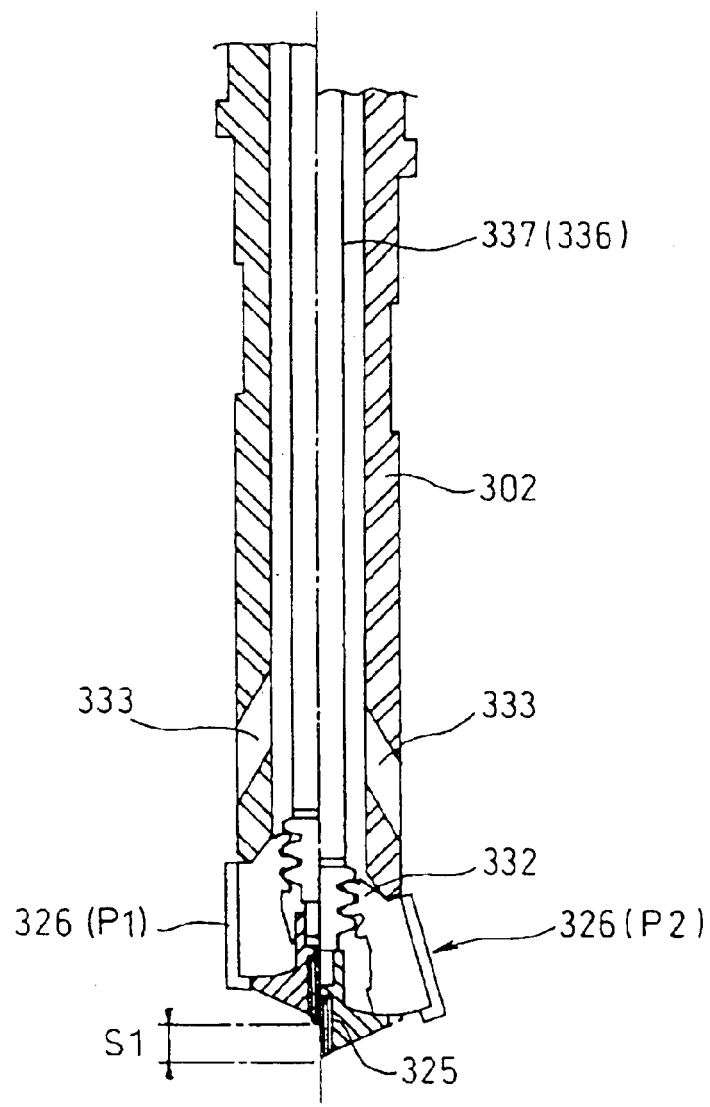
FIG. 54 is an enlarged view of an essential part of FIG. 52.
Figure 55:
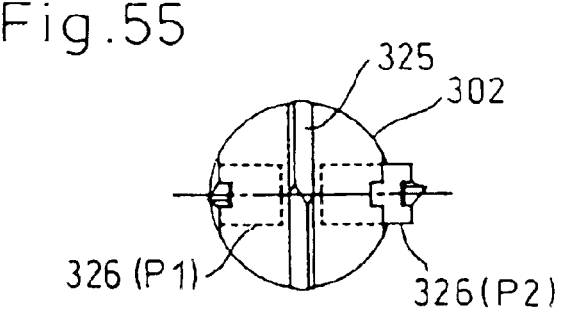
FIG. 55 is a bottom view of FIG. 54.
Figure 56:
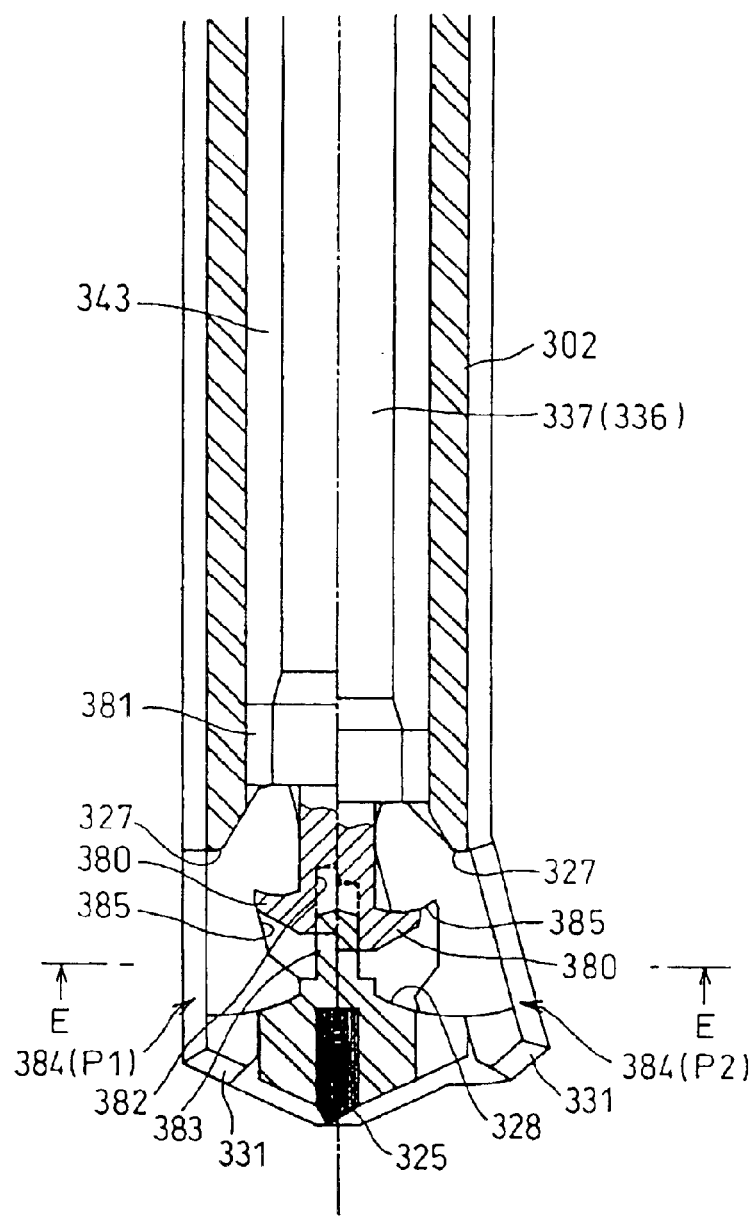
FIG. 56 is an enlarged cross-sectional view of an essential part showing a modification of the drill bit for undercut working shown in FIG. 42.
Figure 57:
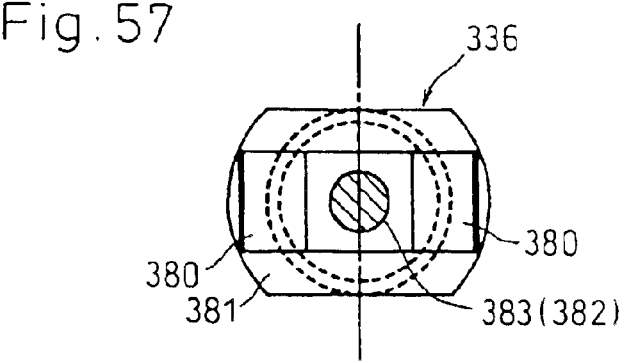
FIG. 57 is a view as viewed from the line E–E of the control rod shown in FIG. 56.
Figure 58:
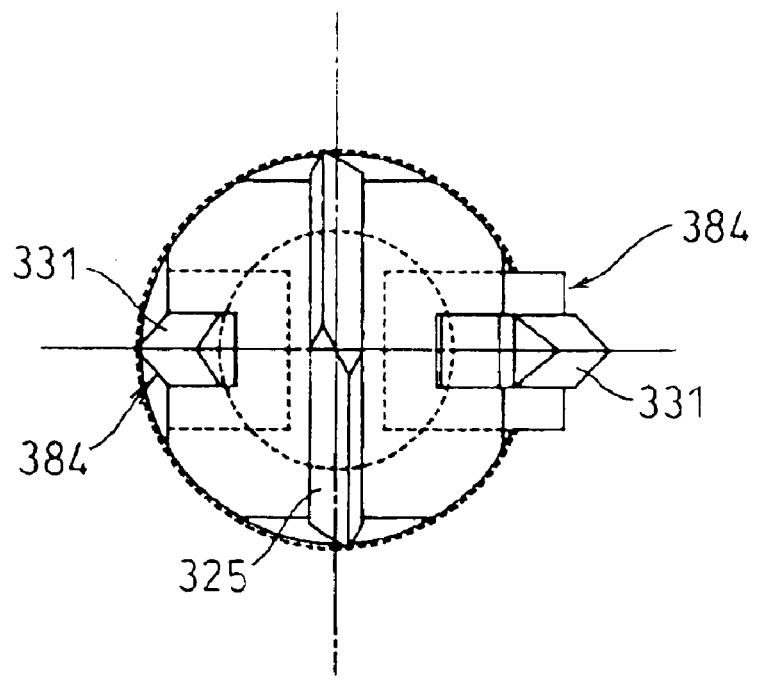
FIG. 58 is a bottom view of FIG. 56.

First, in the condition that the drill bit 301 is merely installed to a rotating section of a not-shown drilling machine and no load is not transmitted to the cutter body 302, the condition shown by a left half portion in FIGS. 53 to 55 are maintained. That is, since the biasing force directing upward of the compression coil spring 348 is applied to the intermediate sleeve 346 received in the shank body 305, the shaft portion 353 of the cam follower plate 352 is put in a so-called bottom pushing condition with respect to the center hole 355 of the main body 306 (refer to FIG. 48), and a pulling-up force is applied from the control rod 336 and the cutter body 302 steppedly connected with the control rod 336 at the shoulder portion to the shank body 305. As a result, the condition of the left half portion in FIG. 53 is maintained, and simultaneously the cutter blades 326 for undercut work is stayed in the housing position P1. At this time, a small clearance C1 is ensured between the cam follower plate 346 and an upper end surface of the inner cylinder portion of the coupling sleeve 307.

When the hole working is started by rotating the drill bit 301 and pressing the tip end of the cutter body 302 to concrete structure W, the hole working is gradually proceeded by the cutter blade 325 for straight-hole working, and a straight hole H1 having a diameter of the maximum diameter of the cutter blade 325 is worked. At this time, since the cutter blades 326 for undercut working are put in the housing position P1, they do not relate the working of the straight hole H1 directly and merely act as a guide for hole working direction. Since the dust collecting force by a not-shown dust collector is applied to the dust collecting passage 343 through the hole of the dust collecting adapter 304 and the communication passages 322 and 323, chips generated by working the straight hole H1 are rapidly discharged to the dust collector through the dust collector port 333 provided at the top end portion of the cutter body 302. Further, since the dust collecting adapter 304 is relatively rotatable with respect to the cutter body 302 and smoothly allows the rotation of the cutter body 302 rotated, the existence of the dust collecting adapter 304 never prevents the hole working.

Furthermore, the pressing force of the drill bit 301 for hole working is transmitted from the main body 306 forming the shank body 305 to the cutter body 302 connected to the coupling sleeve 307 and the cylinder portion of the coupling sleeve 307 by means of the screw portions 312 and 313. Simultaneously, the reaction force from the hole bottom portion of the straight hole H1 is inputted from the shank body 305 to the drilling machine in the completely inverse route of the above mentioned route, and finally loaded to a builder. Therefore, the cutter body 302 and the control rod 336 are never relatively moved during the hole working of the straight hole H1.

Then, when the depth of the straight hole H1 reaches the predetermined depth, the stopper sleeve 303 contacts with the upper surface of the concrete structure W. If the drill bit 301 is pressed continuously after the stopper sleeve 303 is contacted with the concrete structure, the stopper sleeve 303 together with the dust collecting adapter 304 and the collar 319 upwardly moves with respect to the cutter body 302. The cam follower sleeve 345 also moves upward according to the upward movement of the collar 319, and the cam follower sleeve 345 pushes up the end portion of each cam lever 351 in press contact with the cam follower sleeve 345 and swings the cam levers 351. By swinging the cam levers 351, the stopper surfaces 351a and 351b at the upper and lower surface of the cam levers 351 are gradually separated from the inner lower surface of the main body 306 and the cam follower sleeve 352. According to a stroke by the cam profile, the control rod 336 is pushed down with respect to the cutter body 302 through the cam follower plate 352 and the intermediate sleeve 346. The relative movement stroke between the control rod 336 and the cutter body 302 is absorbed by the previously mentioned clearance C1 between the intermediate sleeve 346 and the inner cylinder portion of the coupling sleeve 307.

By receiving the relative displacement between the cutter body 302 and the control rod 336, each cutter blade 326 for undercut working is swung on the fulcrum top portion 327 due to the engagement between the rack portion 339 and the sector gear 326, and gradually projects from the housing position P1 to the enlarged position H1 as shown by the right half portion in FIGS. 53 to 55. By this operation, the depth of the straight hole H1 reached the predetermined depth is further increased, and a portion near the bottom hole portion of the straight hole H1 is increased in diameter by the cutter blades 326 for undercut working and is formed into a taper shape.

That is, it is considered that the left half portions of FIGS. 53 to 55 show a condition that the stopper sleeve 303 is just in contact with the concrete structure W, and that the right half portions show a moment that the cutter blades 326 have completely projected to the enlarged position P2 and the undercut working has just finished. During the process that the straight hole H1 reached the predetermined depth is further deeply holed by pressing the cutter body 302 by the stroke S1, the near portion of the hole bottom portion is increased in diameter into an undercut shape as a taper shaped undercut portion U, and the undercut hole H2 having the undercut portion U is formed.

In other words, the undercut working is executed by absorbing the relative movement between the stopper sleeve 303 in contact with the concrete structure W and the cutter body 302 at the shank body 305 and by excessively pressing the control rod 336 by the amount of the cam profile (at most clearance C1) of each cam lever 351 as compared with the cutter body 302.

In order to return the cutter blades 326 for undercut working from the enlarge position P2 to the housing position P1 after the undercut working, the drill bit 301 is slowly drawn up in the same time that the pressing force applied to the drill bit 301 is cancelled. Thereupon the control rod 336 is pushed up through the intermediate sleeve 346 due to the biasing force of the compression coil spring 348, and simultaneously the force is applied to the direction that each cam lever 351 is returned to the initial position. Therefore, each cutter blade 326 for undercut working is gradually returned to the housing position P1, and further the stopper sleeve 303 and the dust collecting adapter 304 are relatively pushed down with respect to the cutter body 302. As a result, it becomes possible to smoothly remove the drill bit 301 from the undercut hole H2 worked.

With the drill bit 301 of the present embodiment, the undercut portion U is autonomously worked by executing the working of the straight hole H1 as is similar to the usual drill holing operation, and by continuously applying the pressing force after the depth of the straight hole H1 becomes the predetermined depth. Therefore, the required undercut hole H2 is worked with a feeling completely the same as that of the usual drill holing operation and by one step without complex movement of the drill bit 301.

FIGS. 56 to 59 show a modification of the drill bit 301. As is clear from the comparison with FIG. 42, the connectional relationship between the small diameter shaft portion 337 of a part of the control rod 336 and cutter blades 384 is different from that of the previous embodiment.

As shown in FIGS. 56 to 59, a pair of right and left hooks 380 are projectedly formed at the lower end of the small diameter shaft portion 337 of the control rod 336, and a flange portion 381 of a width across flat shape is integrally formed at the position upper than the hooks 380. A cylindrical surface of the flange portion 381 is in contact with an inner periphery of the cutter body 302. The control rod 336 is vertically movably guided with respect to the cutter body 302 through the flange portion 381 acting as a guide portion. A guide hole 382 is formed at a lower end surface of the small diameter shaft portion 337 providing the hooks 380, and a boss portion 383, which projects from the a bottom wall of the blade receiving groove 328 (refer to FIG. 44) in the cutter body 302 is slidably engaged with the guide hole 382 so as to perform the guiding effect mentioned above.

Figure 59:
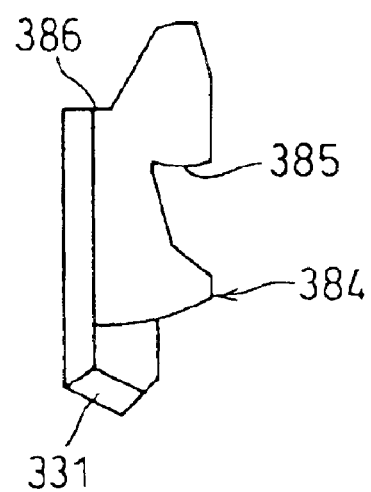
FIG. 59 is an explanatory view of a cutter blade shown in FIG. 56.

On the other hand, a cutout groove 385 engagable with the hook 380 is formed at each cutter blade 384 for undercut working which is received in the brake receiving groove 328, as shown in FIG. 59, and the cutter blades 384 for the undercut working are supported by engaging the cutout grooves 385 with the hooks 380. That is, as is clear from FIG. 56, by contacting the upper end of each cutter blade 384 for undercut working with the lower surface of the flange portion 381, by connecting the hook 380 and the cutout grooves 385, and by connecting the fulcrum top portion 327 of the cutter body 302 with a shoulder portion 386 (refer to FIG. 59) of the cutter blades 384 for undercut working, the cutter blades 384 for undercut working are swingably supported on the fulcrum tope portion 327 acting as a swing center. As is clear from the same figure, a contact portion between the flange portion 381 and the upper end of each cutter blade 384 for undercut working, a contact portion between the hook 380 and the cutout groove 385, and the fulcrum top portion 327 and the shoulder portion 386 are arranged into a curved-face contact. Therefore, the cutter blades 384 for undercut working are smoothly swung according to the displacement of the control rod 336.

Accordingly, in this modification, by pushing down the control rod 336 in the condition that the cutter blades 384 for undercut working is located at the housing position P1, each cutter blade 384 is swung on the fulcrum top portion 327 acting as a swing center and projects to the enlarged position P2 as shown in the right half portion of the same figure. Further, by raising up the control rod 336 with respect to the cutter body 302, the cutter blades 384 for undercut working are swung in the inverse direction to the above mentioned direction and are returned to the housing position P1 shown in the left half portion in the same figure. Therefore, this modification performs the function as same as that shown in FIG. 42.

FIGS. 60 to 64 show a preferred second embodiment of the drill bit for undercut working according to the present invention, and correspond to the claims 3 and 4. This embodiment is different from the drill bit 301 of the previous embodiment in view that no dust collecting adapter is provided since the forced dust collecting of the chips by means of the dust collecting machine shown in the previous embodiment is not executed and that instead of this, a cutter body having a spiral shaped groove is adopted so as to discharge the chips by the spiral feeding operation of the groove portion according to the rotation of the cutter body. Parts common to those of the first embodiment are denoted by the same reference numerals.

Figure 60:
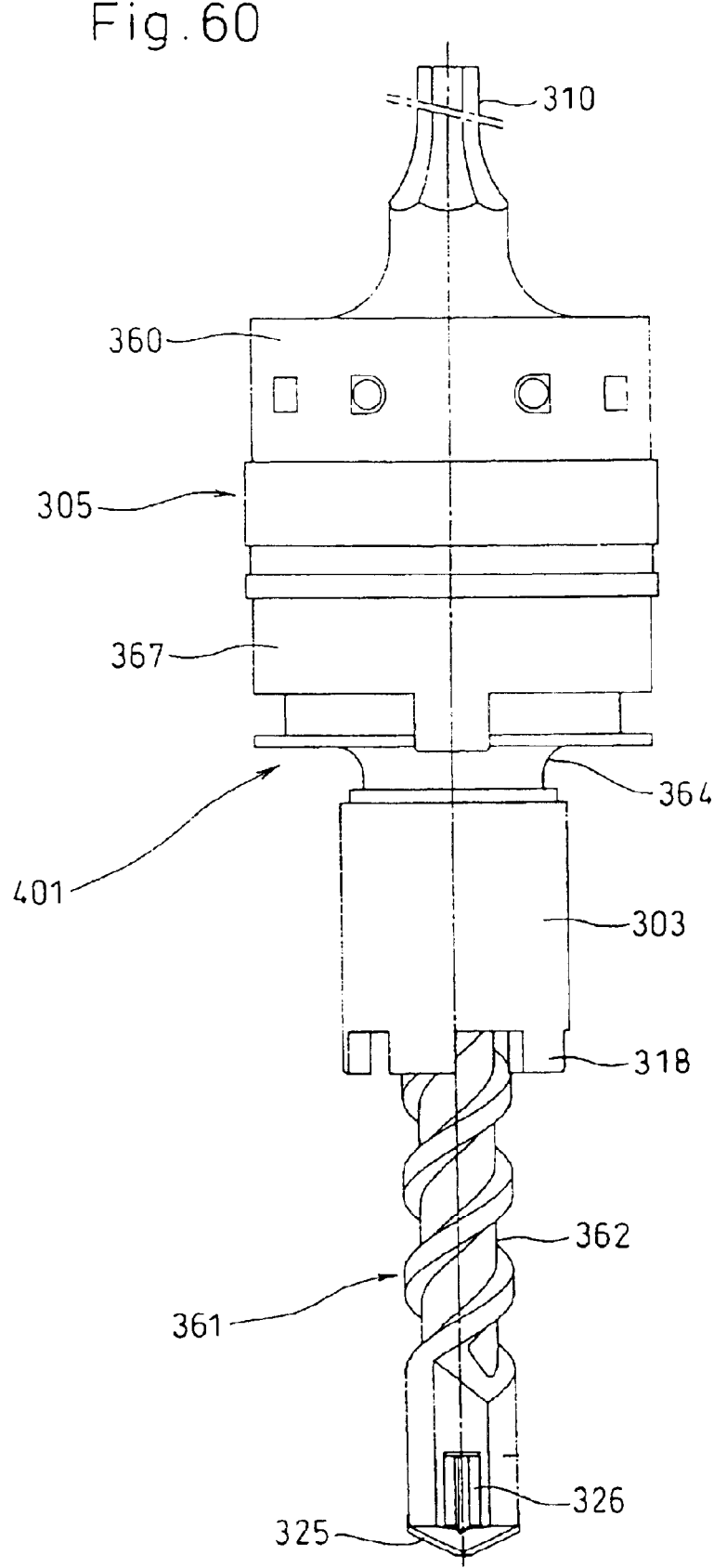
FIG. 60 is a front view showing a preferred second embodiment of the drill bit for working undercut hole according to the present invention.
Figure 61:
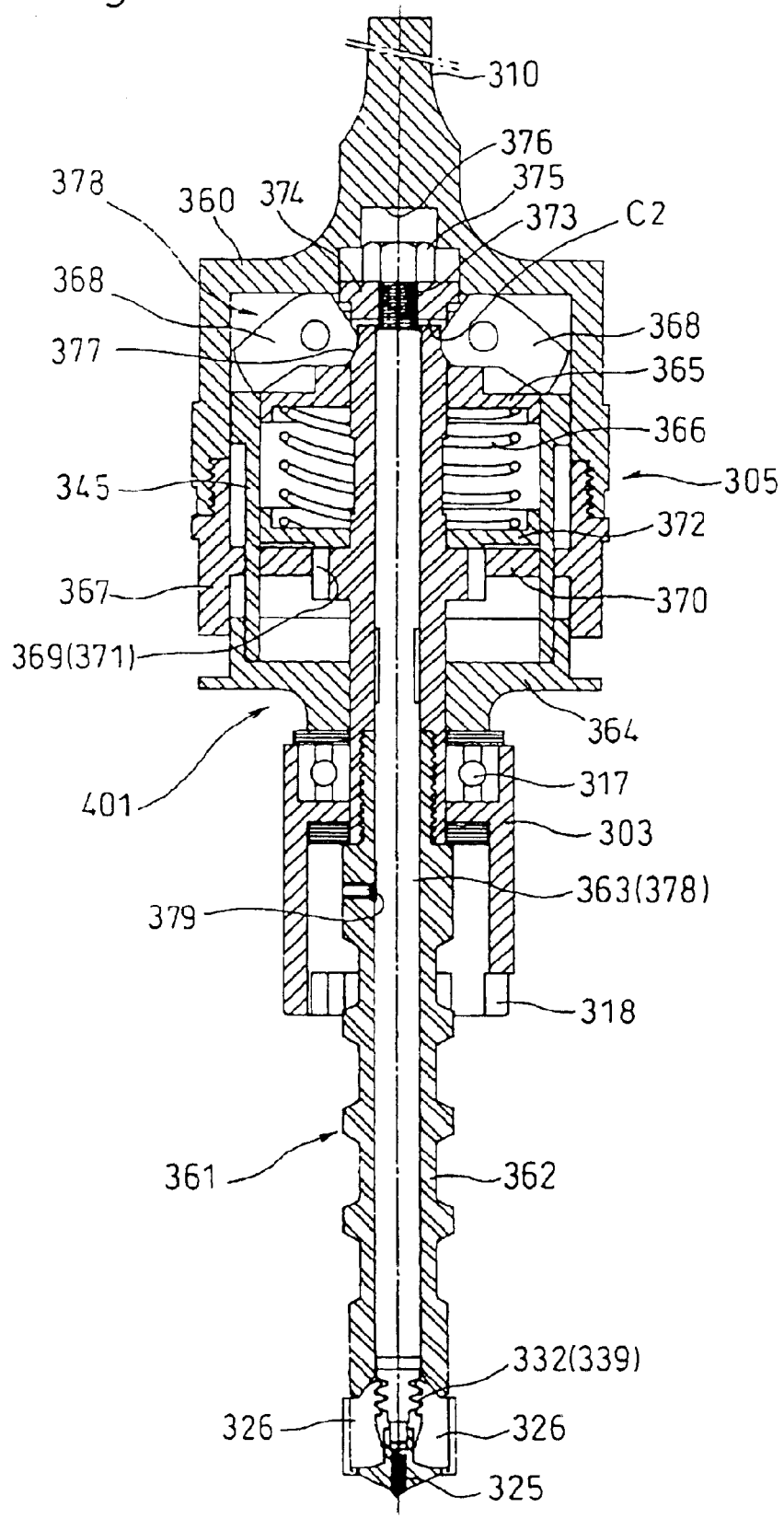
FIG. 61 is a whole cross-sectional view of FIG. 60.

As shown in FIGS. 60 and 61, the drill bit 401 is constituted by a cutter body 361 provided with a spiral groove portion positioned at an outer cylinder surface, a control rod 363 slidably installed in the cutter body 361, a stopper sleeve 303 installed to the cutter body 361 so as to be relatively rotatable and relatively movable in the axial direction, and a shank body 305 which is constituted by a body 360 and a coupling sleeve 367 and vertically movably supports the cutter body 361. Except that the stopper sleeve 303 and the collar 364 are adjacently disposed, the interrelationship of the shank body 305 to the collar 364, the cam follower sleeve 345, the cam follower plate 365, the compression coil spring 366 and the cam lever 368 is basically the same as that of the drill bit of the first embodiment. Further, the interrelationship between the cutter blades 325 for straight hole working at the tip end of the cutter body 361 and the cutter blades 326 for undercut working, and the diameter increasing structure due to the engagement between the rack portion 339 at the tip end of the control rod 363 and the sector gear 332 of the cutter blades 326 are basically the same as that of the drill bit 301 of the first embodiment.

A spline 369 is formed at an inner periphery of the coupling sleeve 367 formed at the shank body 305, and a spline 371 is similarly formed at the flange portion 370 integrally formed with the cutter body 361. Since these splines 369 and 371 are engaged with each other, the relation movement between the shank body 305 and the cutter body 361 in the axial direction is allowed and the torque transmission between the shank body 305 and the cutter body 361 is smoothly executed. A spring seat 372 is disposed on the flange portion 370, and a compression coil spring 366 is disposed between the spring seat 372 and the cam follower plate 365.

A stopper 374 is screwed with a male screw portion 373 at the upper end of the control rod 363 so as to ensure a predetermined clearance C2 between the upper end surface of the cutter body 361, and is compressingly tightened by the lock nut 375. Therefore, these stopper 374 and the lock nut 375 are engageable with a stepped center hole 376 of the main body 360. A cutout groove 377 is formed at an upper periphery of the cutter body 361, and a cam lever 368 is connected to the cutout groove 377, so that the shank body 305 and the cutter body are locked with each other to substantially prevent the relative movement between the shank body 305 and the cutter body 361.

As is clear from the above explanation, the cam follower sleeve 345, the cam lever 368, the cam follower plate 365, the stopper 374 and the control rod 363 of the plurality of elements received in the shank body 305 constitute a cutter blade control means 378 for increasing a diameter of the cutter blades 326 for undercut working set at the tip end of the cutter body 361 as mentioned later.

The cutter body 361 and the control rod 363 are allowed in the relative displacement by the clearance C2 and are prevented in the relative rotation by means of the stop screw 378.

Figure 62:
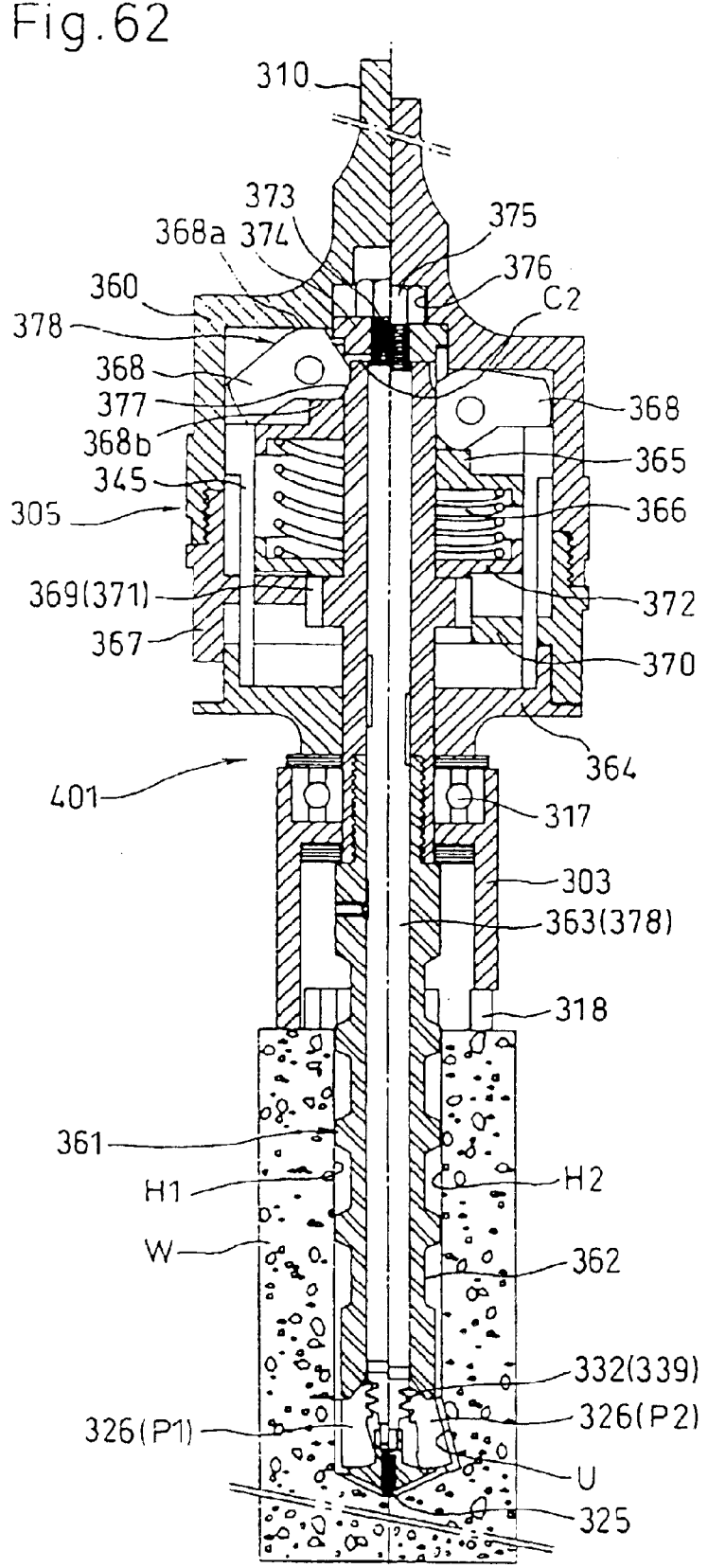
FIG. 62 is an operation explanatory view during the drilling by the drill bit shown in FIGS. 60 and 61.
Figure 63:
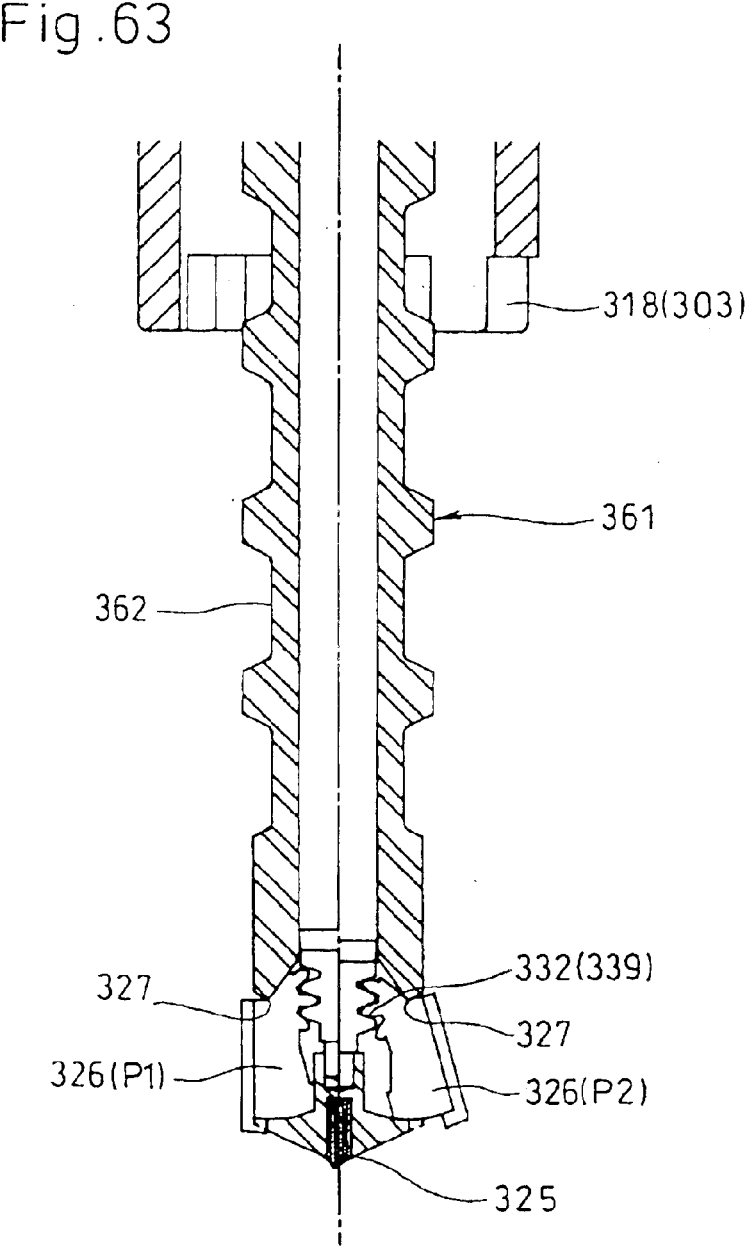
FIG. 63 is an enlarged view of an essential part of FIG. 62.
Figure 64:
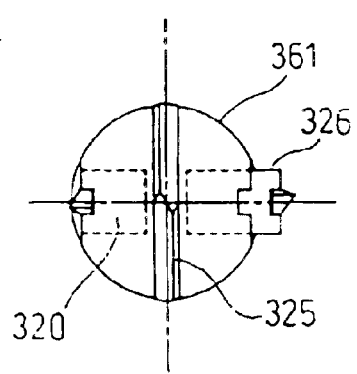
FIG. 64 is a bottom view of FIG. 63.
Figure 65:
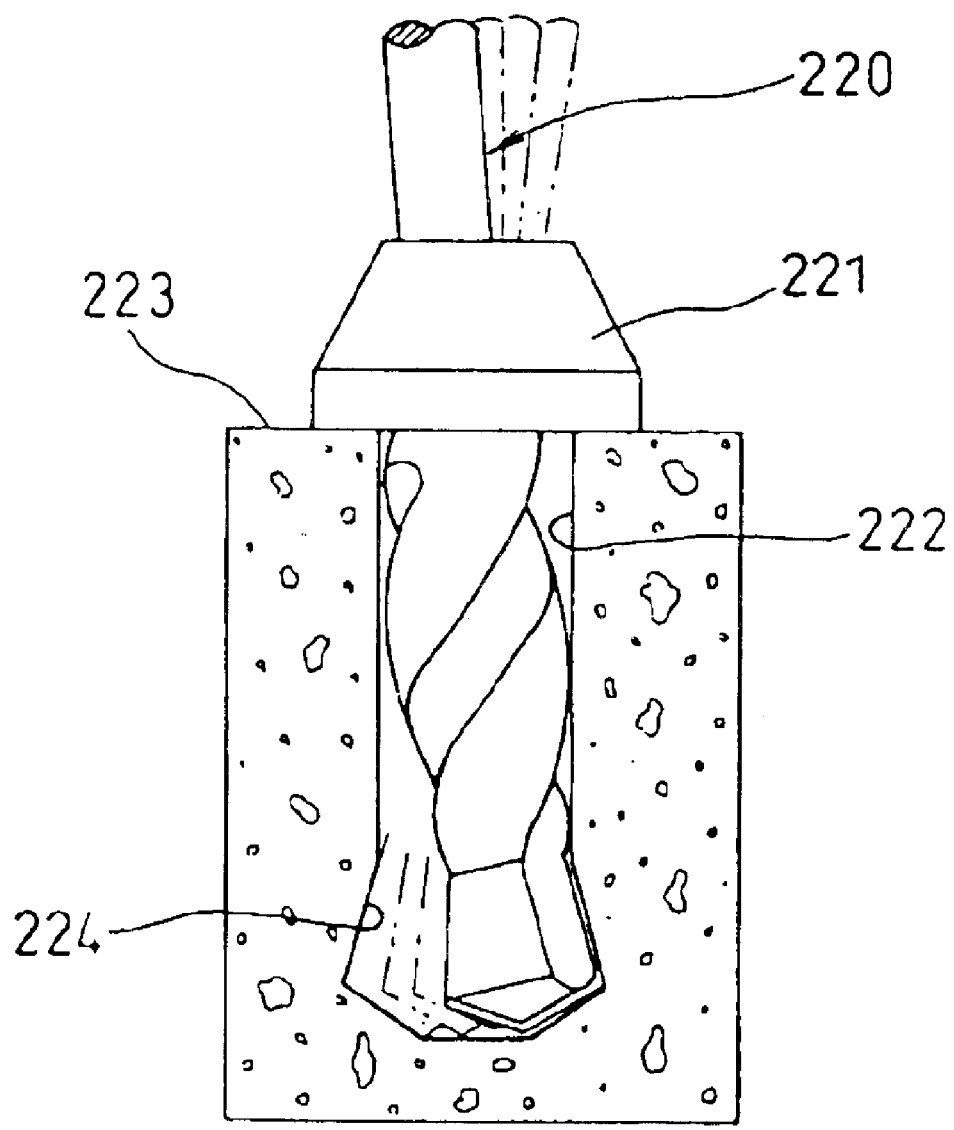
FIG. 65 is an explanatory view showing a working pattern of a conventional undercut hole.
Figure 66:
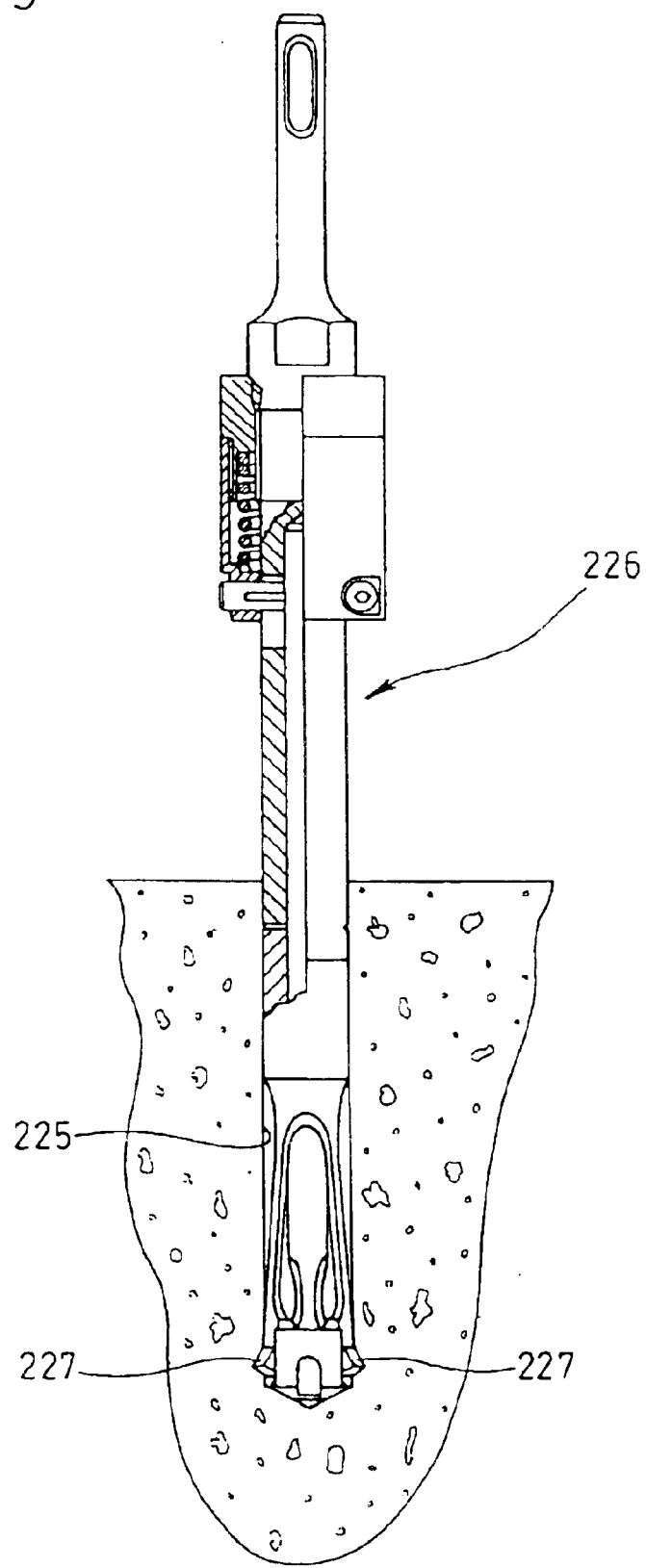
FIG. 66 is an explanatory view showing a working pattern of another conventional undercut hole.

Accordingly, with the drill bit 401 of the present embodiment, under the condition that the drill bit 401 is merely installed to a rotating part of a not-shown drill machine and no load is applied to the cutter body 361, a condition of the left half portion shown in FIGS. 62 to 64 is maintained by itself.

That is, since an upwardly directing biasing force of the compression coil spring 366 is applied to the cam follow plate 365 received in the shank body 305, the stopper surfaces 368a and 368b vertically parallel with each other of the cam lever 368 are in press contact with an inner and lower surface of the main body 360 and the upper surface of the cam follower plate 365, respectively. Substantially, the cam lever 368 is connected to the cutout groove 377 of the upper end of the cam follower plate 365, and is sandwiched between the main body 360 and the cam follower plate 365. As a result, the relative movement between the shank body 305 and the cutter body 361 is prevented. With this, the condition of the left half portion of FIGS. 62 to 64 are maintained, and simultaneously the cutter blades 326 for undercut working are supported in the housing position P1. At this time, a small clearance C3 is ensured between the stopper 374 and the upper end surface of the cutter body 361.

When the holing operation is started by pressing the tip end of the cutter body 361 to the concrete structure W at the same time of rotating the drill bit 401, the cutter blade 325 for straight hole working set at the tip end of the cutter body 361 gradually holes, and the straight hole H1 having the diameter equal to the maximum diameter of the cutter blade 325 is worked. At this time, the rotation torque of the shank body 305 is transmitted to the cutter body 362 through the inner periphery of the coupling sleeve 367 through the spline engagement portions 369 and 371, and simultaneously the chips generated by the working of the straight hole H1 are discharged to an opening end of the straight hole H1 during the working by the spiral operation of the groove portion 362.

Further, the pressing force of the drill bit 401 for hole working is transmitted from the main body 360 forming the shank body 305 to the cam lever 368 and the cutter body connected with the cam lever 368 through the cutout groove 377, and simultaneously the reaction force of the hole bottom portion of the straight hole H1 formed is inversely inputted from the shank body 305 to the drilling machine and is finally received by the builder. Therefore, during the holing operation for the straight hole H1, there causes no relative movement between the shank body 305 and the cutter body 361 and no relative movement between the cutter body 361 and the control rod 368.

Then, when the depth of the straight hole H1 formed becomes the predetermined depth, the stopper sleeve 303 is contacted with the upper surface of the concrete structure W. That is, it is considered that the condition at the moment that the stopper sleeve 303 is contacted with the concrete structure W corresponds the left half portion shown in FIGS. 62 to 64, and that the condition that the undercut working is completed by further pressing the drill bit 401 after the contact to the concrete structure W corresponds to the right half portion of the same figures. By continuously pressing the drill bit 401 even after being contacted with the concrete structure W, the stopper sleeve 303 together with the collar 364 is upwardly moved with respect to the cutter body 361. According to the upward movement of the collar 364, the cam follower sleeve 345 is also upwardly moved, and the cam follower sleeve 303 pushes the end portion of each cam lever 368 in press contact therewith and swings each cam lever 368. By the swing of the cam levers 368, the cam levers 368 are detached from the cutout grooves 377 of the cutter body 361 and are put in the unlocked condition. This enables the relative movement between the shank body 305 and the cutter body 361.

Hereinafter, the cutter body 361 is merely rotated at the position keeping the predetermined depth of the straight hole H1, and the pressing stroke of the drill bit 401 is absorbed by the relative downward movement of the shank body 305 to the cutter body 361 and the stopper sleeve 303. Even if the shank body 305 is downwardly moved with respect to the cutter body 361, the spline engagement portions 369 and 371 for the inner periphery of the coupling sleeve 367 and the flange portion 370 of the cutter body 361 are still engaged. Therefore, the torque transmission is smoothly executed from the shank body 305 to the cutter body 361.

By downwardly moving the shank body 305 with respect to the cutter body as mentioned above, the stopper 374 of the upper end of the cutter body 361 and the lock nut 375 are gradually pressed with respect to the center hole 376 of the main body 360, and these stopper 374 and lock nut 375 are soon put in the bottom pressing condition. Then, the pressing stroke of the drill bit 401 after the depth of the straight hole reaches the predetermined depth is absorbed by the relative movement between the cutter body 361 and the shank body 305, and the main body 360 directly presses down the control rod 363 by the clearance C2 for seating the stopper 374 and the lock nut 375 with respect to the center hole 376.

By receiving the relative displacement between the cutter body 361 and the control rod 363, each cutter blade 326 for undercut working is swung on the fulcrum top portion 327 acting as a rotation center due to the engagement between the rack portion 339 and the sector gear 332, and gradually projects from the housing position P1 to the enlarging position P2. With this, the near portion of the hole bottom portion of the straight hole H1 reached the predetermined depth is enlarged into a taper shape by means of the cutter blades 326 for undercut working and is formed into the undercut portion U. The pressing down of the control rod 363 with respect to the cutter body 361 is completed at the time that the stopper 374 is contacted with the upper end surface of the cutter body 361 as shown by the right half portion in FIG. 62.

Herein, the reason for executing the undercut working while staying the cutter body 361 at the position of the predetermined depth if the depth of the straight hole H1 reaches the predetermined depth is that in the case that the undercut working is executed together with the working of the straight hole H as is similar to the operation of the drill bit 301 of the first embodiment, the chips cut out by the cutter blade 325 for straight hole working are jammed between the cutter blades 326 for the undercut working operating for the undercut working since no dust collecting by a dust collecting making is executed, and there is a possibility that the cutter blades 326 cannot be returned to the housing position P1 again after the undercut working.

In order to return the cutter blades 326 for the undercut working from the enlarged position P2 to the housing position P1 after the undercut working, by slowly drawing up the drill bit 401 while canceling the pressing force applied to the drill bit 401, the control rod 363 is drawn up by the clearance C2 with respect to the cutter body 361 due to the biasing force of the compression coil spring 366, and each cutter blade 326 for the undercut working is gradually returned to the housing position P1. Simultaneously, the force of the compression coil spring 366 is applied in the direction for returning each cam lever 368 to the initial position. Therefore, the cam levers 368 and the cam follower sleeve 345 are returned to the initial position and the shank body 305 and the cutter body 345 are returned to the condition of the left half portion in FIG. 62 by the relative movement therebetween. With this condition, it becomes possible to smoothly remove the drill bit 401 from the undercut hole H2 worked.

With the drill bit 401 of the present embodiment, it is of course certain that the necessary undercut hole H2 can be worked by one step without executing the complex motion of the drill bit 401, with the feeling as same as that in the normal drill holing operation as is similar to the drill bit 301 of the first embodiment. Further, it is arranged such that the undercut working is executed by the cutter blades 326 for the undercut working while keeping the cutter body 361 at the predetermined depth position if once the depth of the straight hole H1 reaches the predetermined depth. Therefore, even if the forcible dust collecting by the dust collecting machine is not employed, the undercut working can be accurately executed at the portion near the hole bottom portion of the straight hole.

What is claimed is:

1. A drill bit which is installed at a rotating portion of a drilling machine and finishes an undercut type hole by enlarging a portion near a hole bottom portion into a taper shape when a straight hole is drilled to a structure of a drill object by a rotating motion of the drill bit and when a depth of the drilled hole reaches a predetermined depth, the drill bit for working an undercut hole being characterized to comprise a cutter body providing at least a cutter blade for straight hole working at its tip end, a cutter blade for undercut working that is installed at a tip end portion of the cutter body so as to be swingable and projectable in the diametrical direction and that enlarges a portion near a hole bottom portion of a straight hole into a taper shape by projecting into the diametrical direction through swinging motion, a stopper sleeve that is installed to the cutter body so as to be relatively rotatable and relatively movable in the axial direction and that is contacted with a structure when a drilled depth of a straight hole to the structure becomes a predetermined depth, a shank body supporting the cutter body so as not to be relatively rotatable, a cutter blade control means for projecting the cutter blade for undercut working into an enlarged direction of the cutter body according to a relative displacement in the axial direction between the cutter body and the stopper sleeve when the stopper sleeve is further pressed after the stopper sleeve is contacted with the structure, wherein the cutter blade control means is constituted by a sector gear formed at an end portion position of the cutter blade for undercut working which portion is always positioned in the cutter body, a control rod slidably installed in the cutter body, a rack portion engaged with the sector gear being formed at a tip end portion of the control rod, and a cam member that is received in the shank body and directly transmits a drilling press force applied to the shank body to the cutter body when drilling the straight hole, the cam member pressingly controlling the control rod excessive to the cutter body by a predetermined quantity by transmitting the drilling press force to the cutter body, by absorbing the relative displacement between the cutter body and the stopper sleeve, and by being swingably displaced after the stopper sleeve is contacted with the structure.

2. The drill bit for undercut hole working as claimed in claim 1 being characterized in that a dust collecting port for collecting chips is openingly formed at the tip end portion of the cutter body and is communicated with a dust collecting passage separately formed between the cutter body and the control rod, and further in that the dust collecting passage together with the stopper sleeve is connected to a dust collecting machine through a dust collecting adapter installed to the cutter body so as to be relatively rotatable.

3. A drill bit which is installed at a rotating portion of a drilling machine and finishes an undercut type hole by enlarging a portion near a hole bottom portion into a taper shape when a straight hole is drilled to a structure of a drill object by a rotating motion of the drill bit and when a depth of the drilled hole reaches a predetermined depth, the drill bit for working an undercut hole being characterized to comprise a cutter body providing at least a cutter blade for straight hole working at its tip end, a cutter blade for undercut working that is installed at a tip end portion of the cutter body so as to be swingable and projectable in the diametrical direction and that enlarges a portion near a hole bottom portion of a straight hole into a taper shape by projecting into the diametrical direction through swinging motion, a stopper sleeve that is installed to the cutter body so as to be relatively rotatable and relatively movable in the axial direction and that is contacted with a structure when a drilled depth of a straight hole to the structure becomes a predetermined depth, a shank body supporting the cutter body so as not to be relatively rotatable, a cutter blade control means for projecting the cutter blade for undercut working into an enlarged direction of the cutter body according to a relative displacement in the axial direction between the cutter body and the stopper sleeve when the stopper sleeve is further pressed after the stopper sleeve is contacted with the structure, wherein the cutter blade control means is constituted by a sector gear formed at an end portion position of the cutter blade for undercut working which portion is always positioned in the cutter body, a control rod slidably installed in the cutter body, a rack portion engaged with the sector gear being formed at a tip end portion of the control rod, a cam member that is received ion the shank body and directly transmits a drilling press force applied to the shank body to the cutter body when drilling the straight hole, the cam member allowing the shank body to directly pressingly controlling the control rod by a predetermined quantity by transmitting the drilling press force to the cutter body, by absorbing the relative displacement between the cutter body and the stopper sleeve, and by being swingably displaced after the stopper sleeve is contacted with the structure.

4. The drill bit for undercut hole working as claimed in claim 3, being characterized in that the cutter body is provided at its cylindrical outer peripheral surface with a spiral groove portion.

* * * * *